United States Patent [19]

McCuller

[11] Patent Number: 5,821,471
[45] Date of Patent: Oct. 13, 1998

[54] ACOUSTIC SYSTEM

[76] Inventor: Mark A. McCuller, 34255 Cronin Terrace, Fremont, Calif. 94555

[21] Appl. No.: 565,119

[22] Filed: Nov. 30, 1995

[51] Int. Cl.⁶ ...................................................... H05K 5/00
[52] U.S. Cl. ............................................ 181/156; 181/199
[58] Field of Search ..................................... 181/148, 151, 181/152, 156, 199; 381/88, 90, 158, 159, 160

[56] References Cited

U.S. PATENT DOCUMENTS

| | | |
|---|---|---|
| 2,031,500 | 2/1936 | Olney . |
| 2,277,525 | 3/1942 | Mercurius ............................ 181/156 X |
| 4,128,738 | 12/1978 | Gallery .................................. 181/156 X |
| 4,168,761 | 9/1979 | Pappanikolaou ........................ 181/156 |
| 4,398,619 | 8/1983 | Daniel ..................................... 181/156 |
| 4,549,631 | 10/1985 | Bose . |
| 4,628,528 | 12/1986 | Bose et al. . |
| 4,924,962 | 5/1990 | Terai et al. ........................... 181/199 X |
| 5,170,435 | 12/1992 | Rosen et al. . |
| 5,197,103 | 3/1993 | Hayakawa ........................... 181/156 X |
| 5,373,564 | 12/1994 | Spear et al. .......................... 181/199 X |

OTHER PUBLICATIONS

Advertisement by Bose Corporation for "Wave radio", in Popular Science Magazine, Jul. 1996 issue.

Primary Examiner—Khanh Dang
Attorney, Agent, or Firm—Samuel Kassatly

[57] ABSTRACT

The present acoustic system produces sounds over a broad range of frequencies, and includes an enclosure, a speaker acoustically connected to the enclosure, for generating, almost simultaneously, two sounds, a forward sound, and a rearward sound. It further includes a waveguide enclosed at least partly within the enclosure, and acoustically connected to the speaker, for defining an acoustic path along which the rearward sound travels. The waveguide includes a plurality of inner panels that are positioned inside the enclosure for optimizing the length of the travel path. The inner panels and the enclosure define a plurality of inner passageways having generally similar cross-sectional surface areas, and a plurality of inner openings, for causing a selective cancellation of sounds at predetermined frequencies, while preserving sounds at other frequencies.

19 Claims, 58 Drawing Sheets

Loudspeaker Impedance

Frequency Response

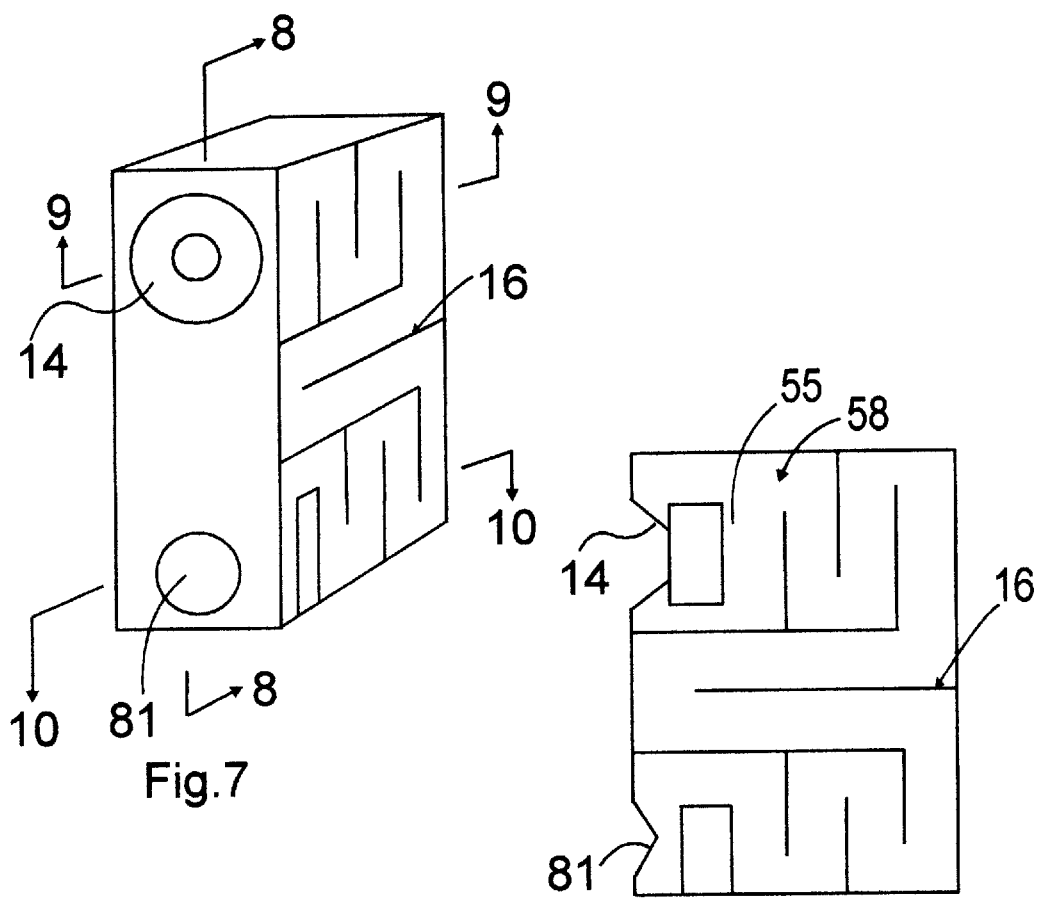
Fig. 7
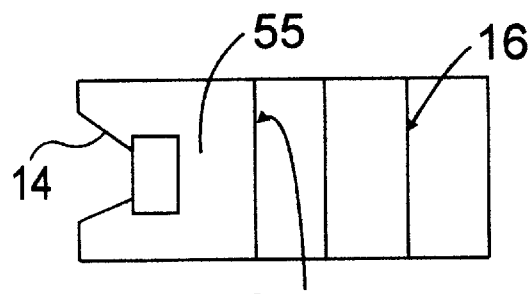
Fig. 8
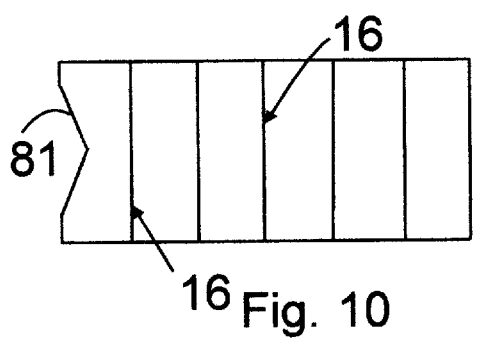
Fig. 9
Fig. 10

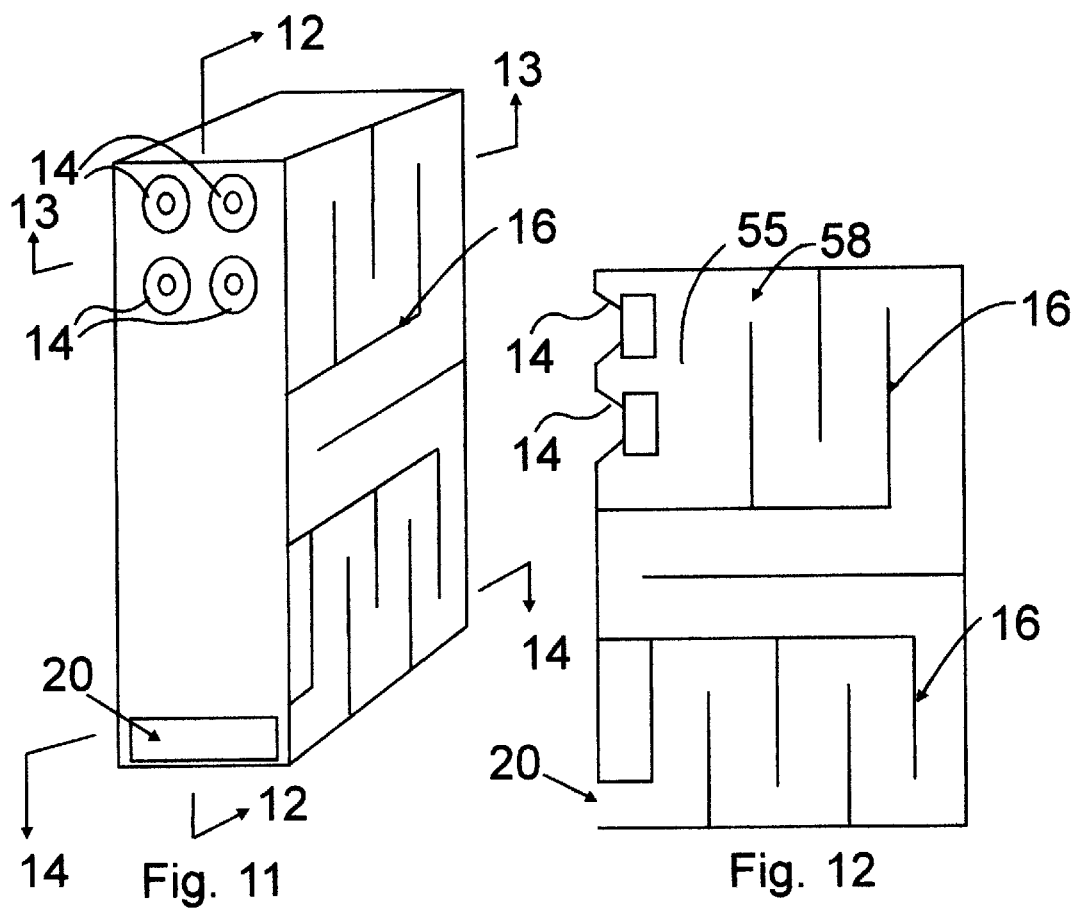
Fig. 11
Fig. 12
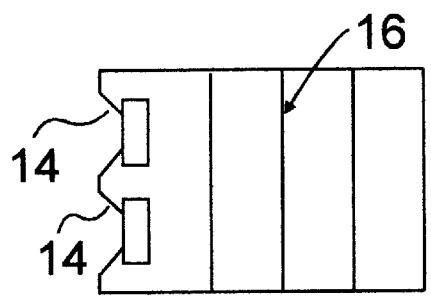
Fig. 13
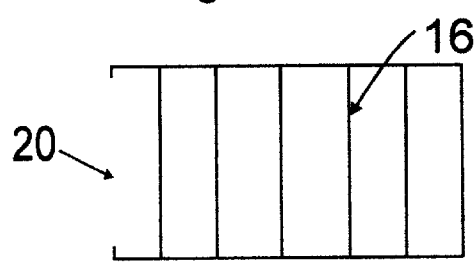
Fig. 14

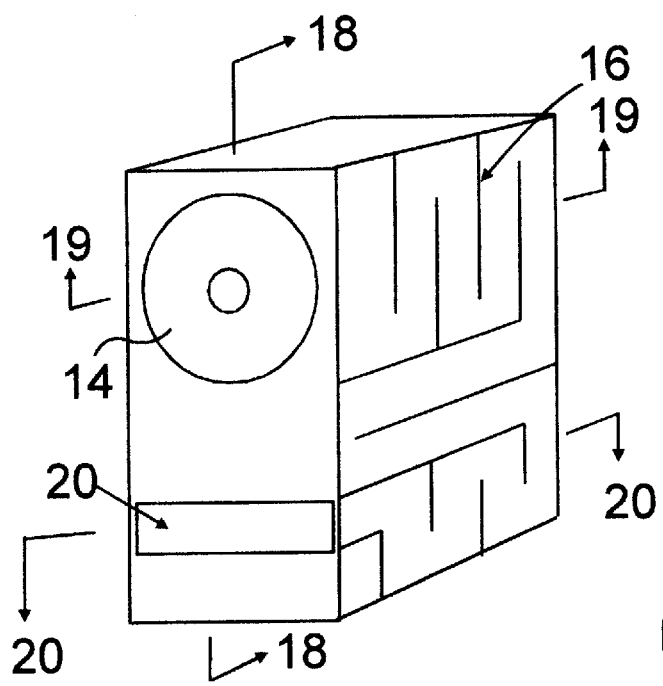
Fig. 17
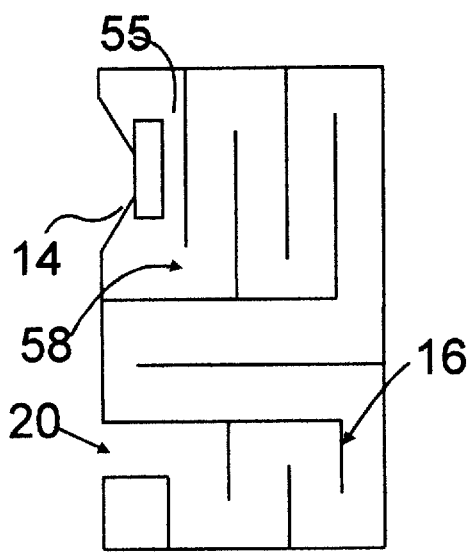
Fig. 18
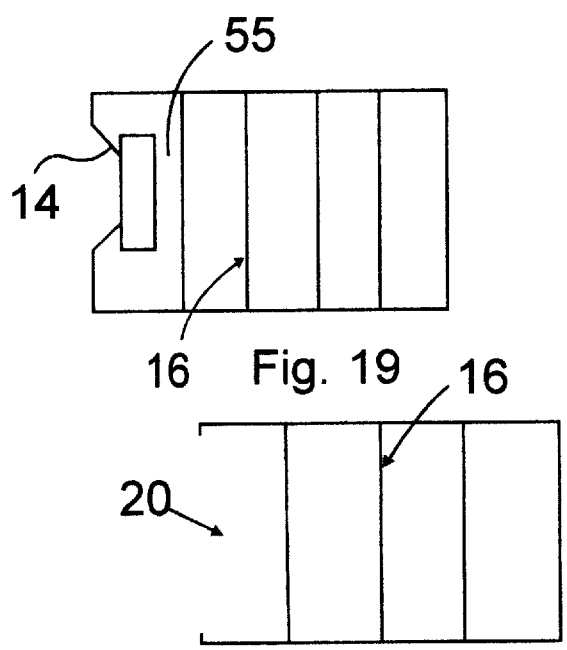
Fig. 19
Fig. 20

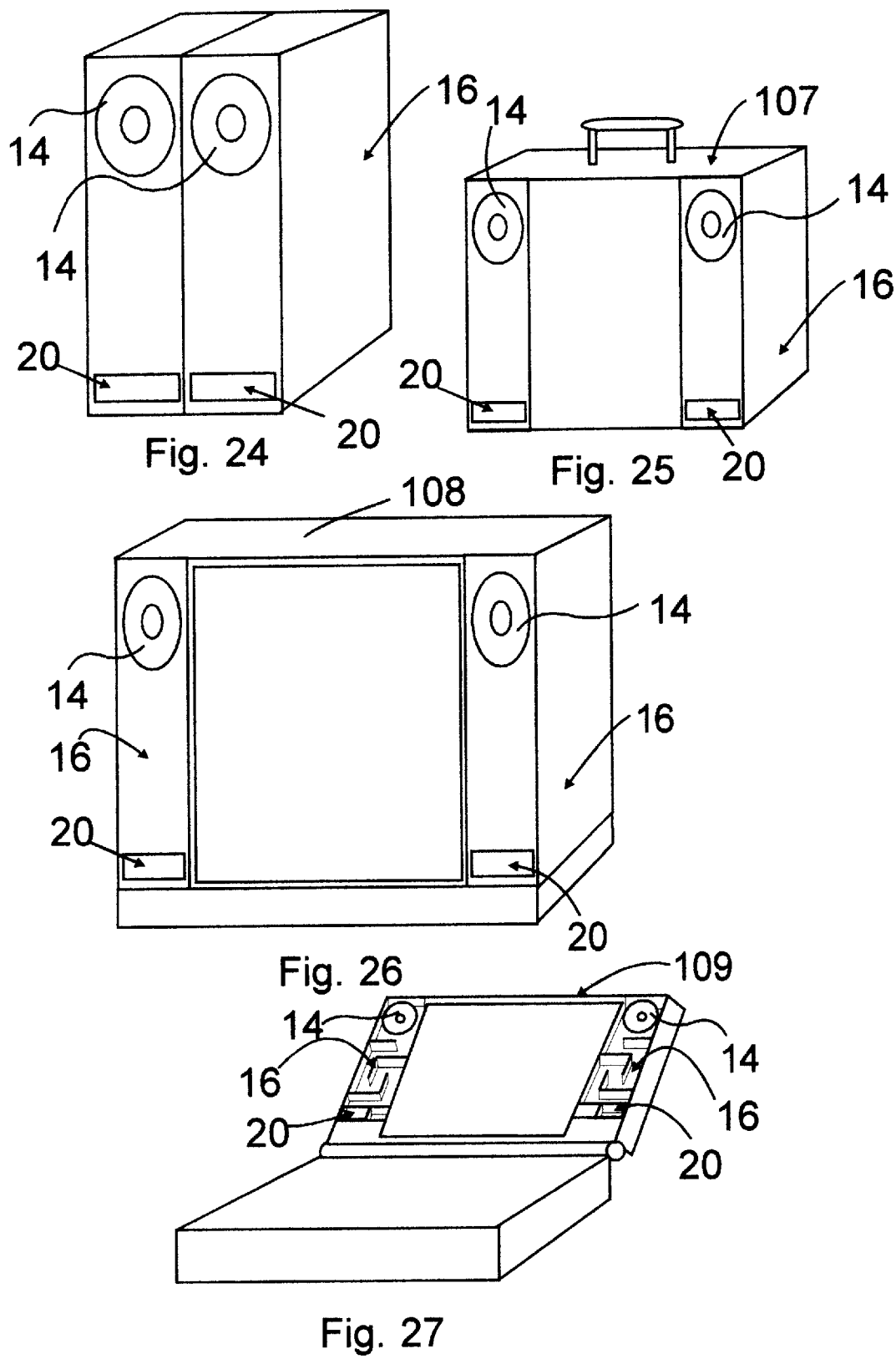

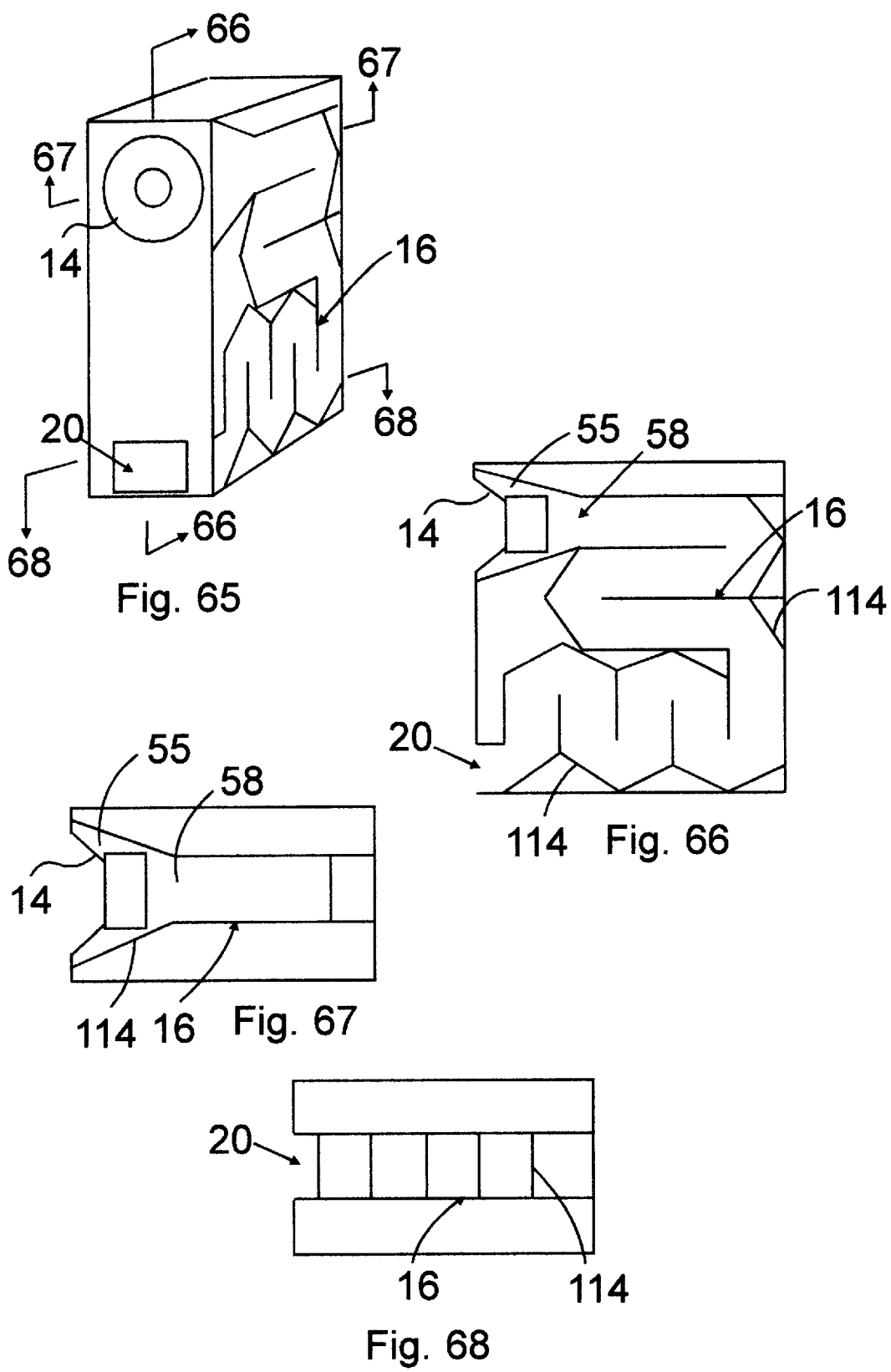

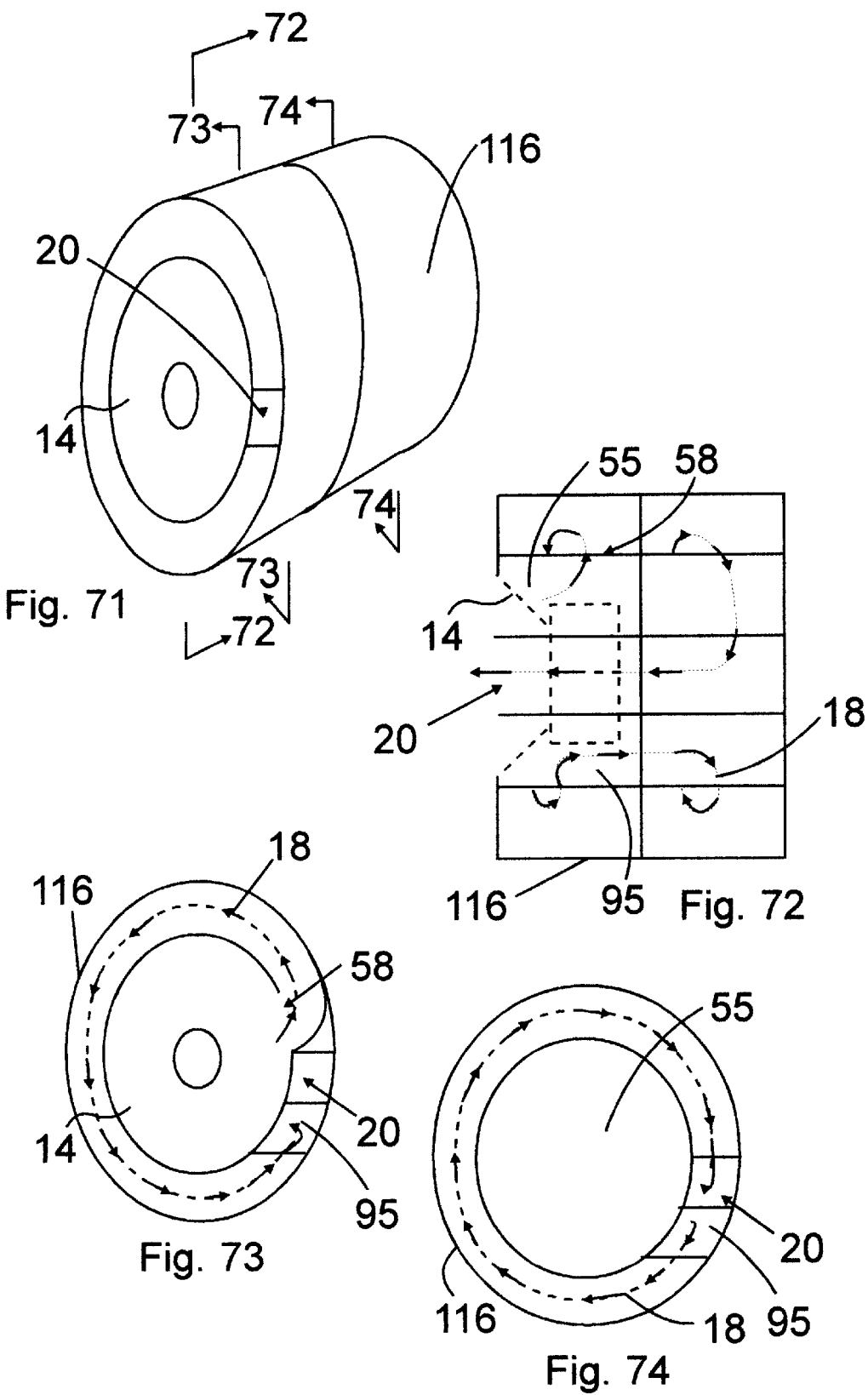

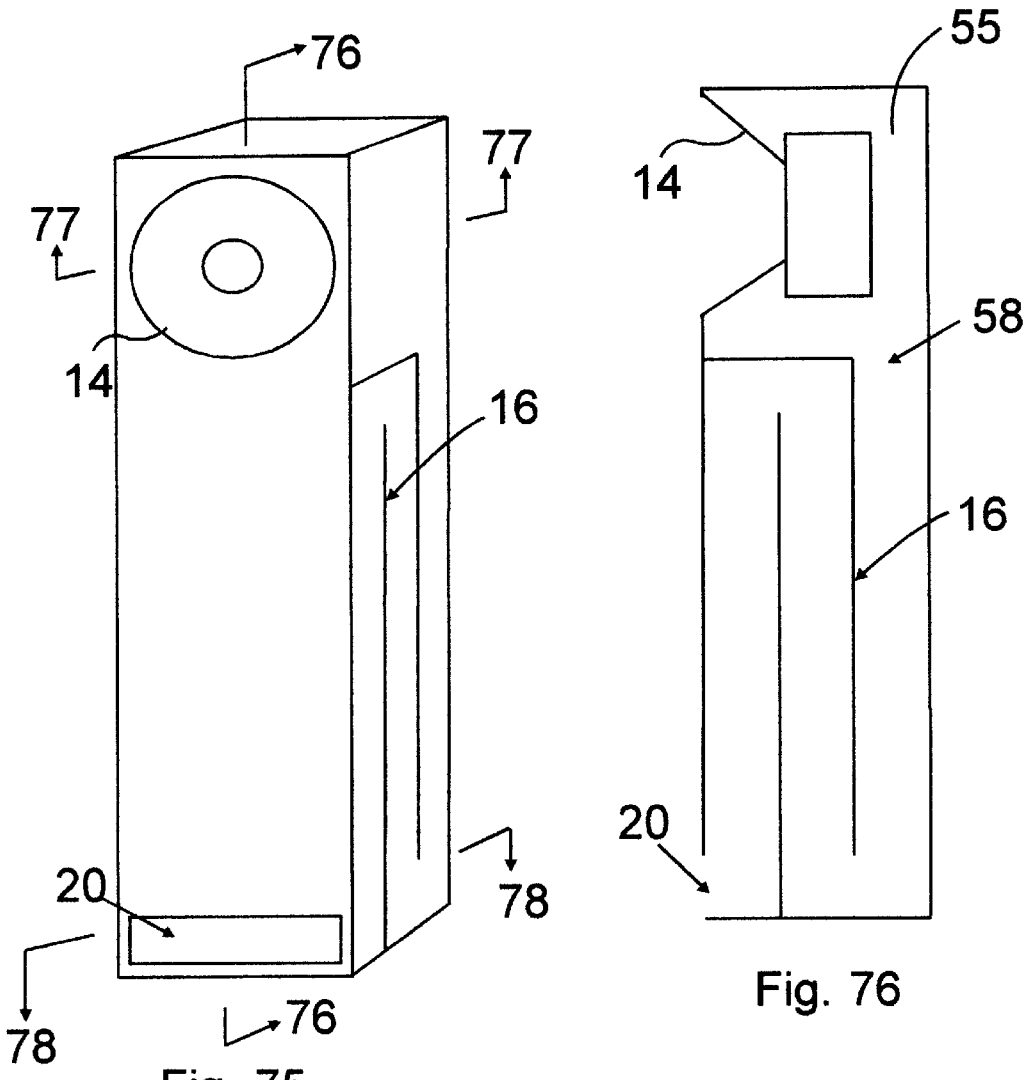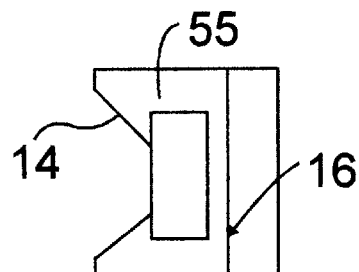
Fig. 75
Fig. 76
Fig. 77
Fig. 78

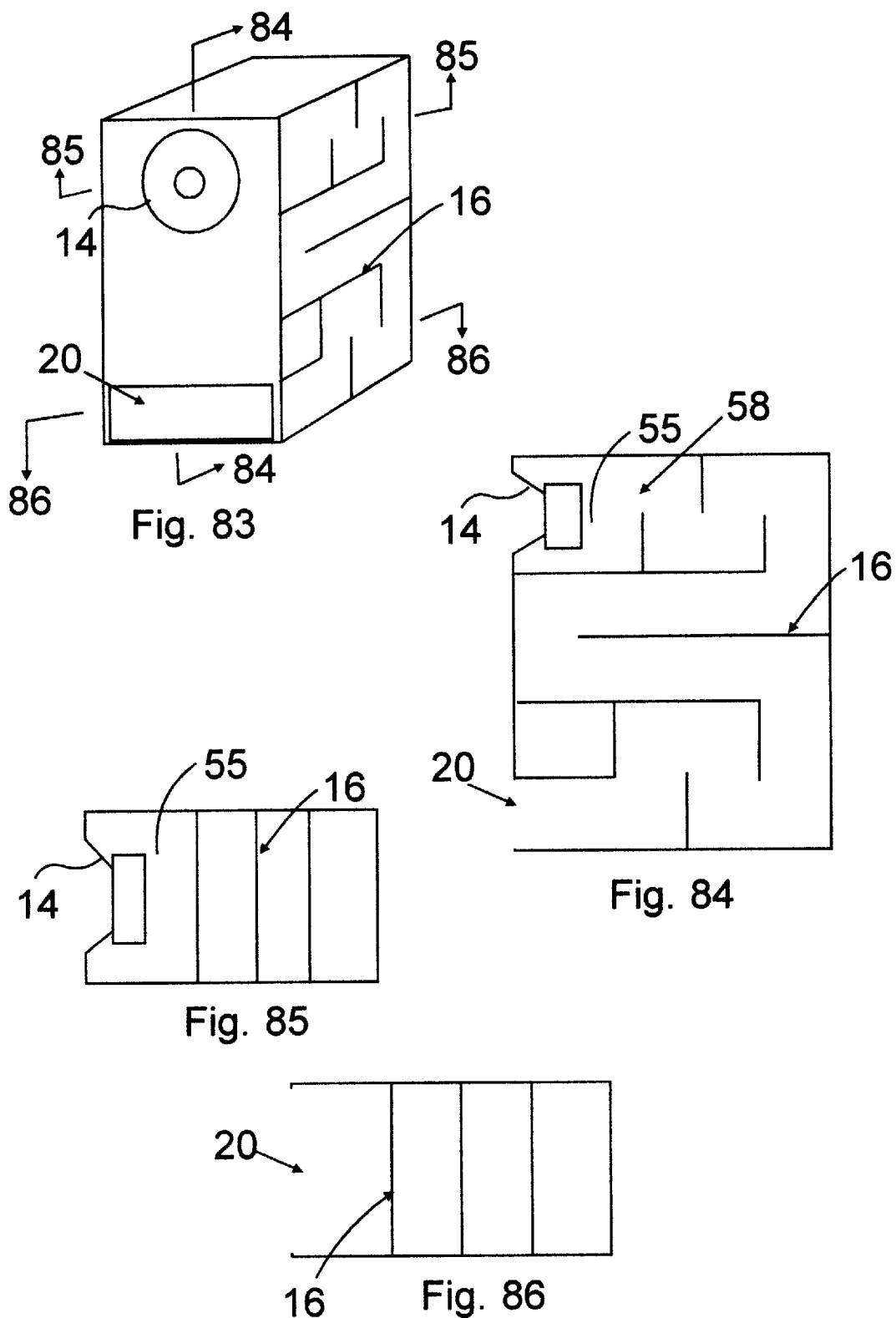

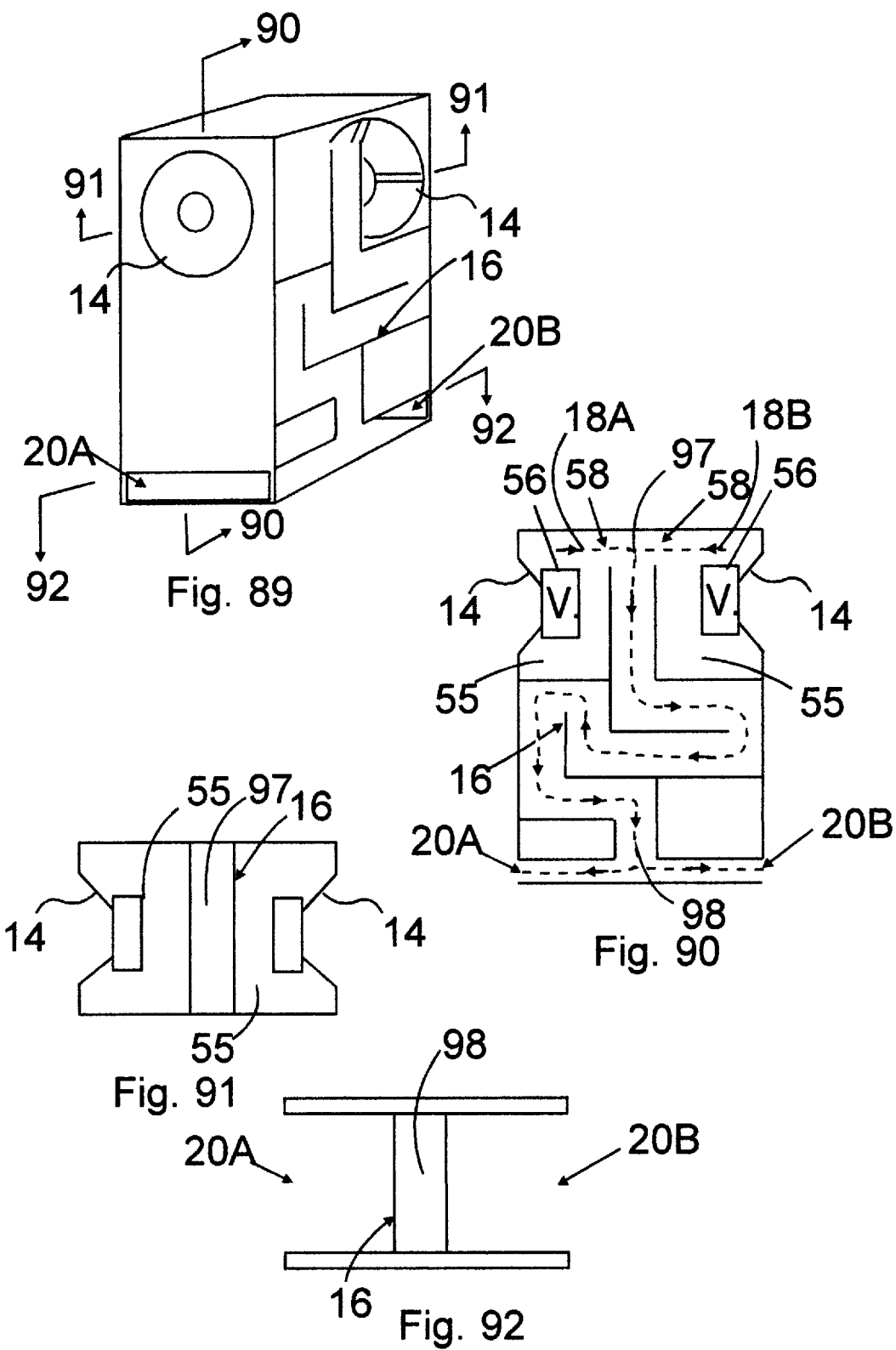

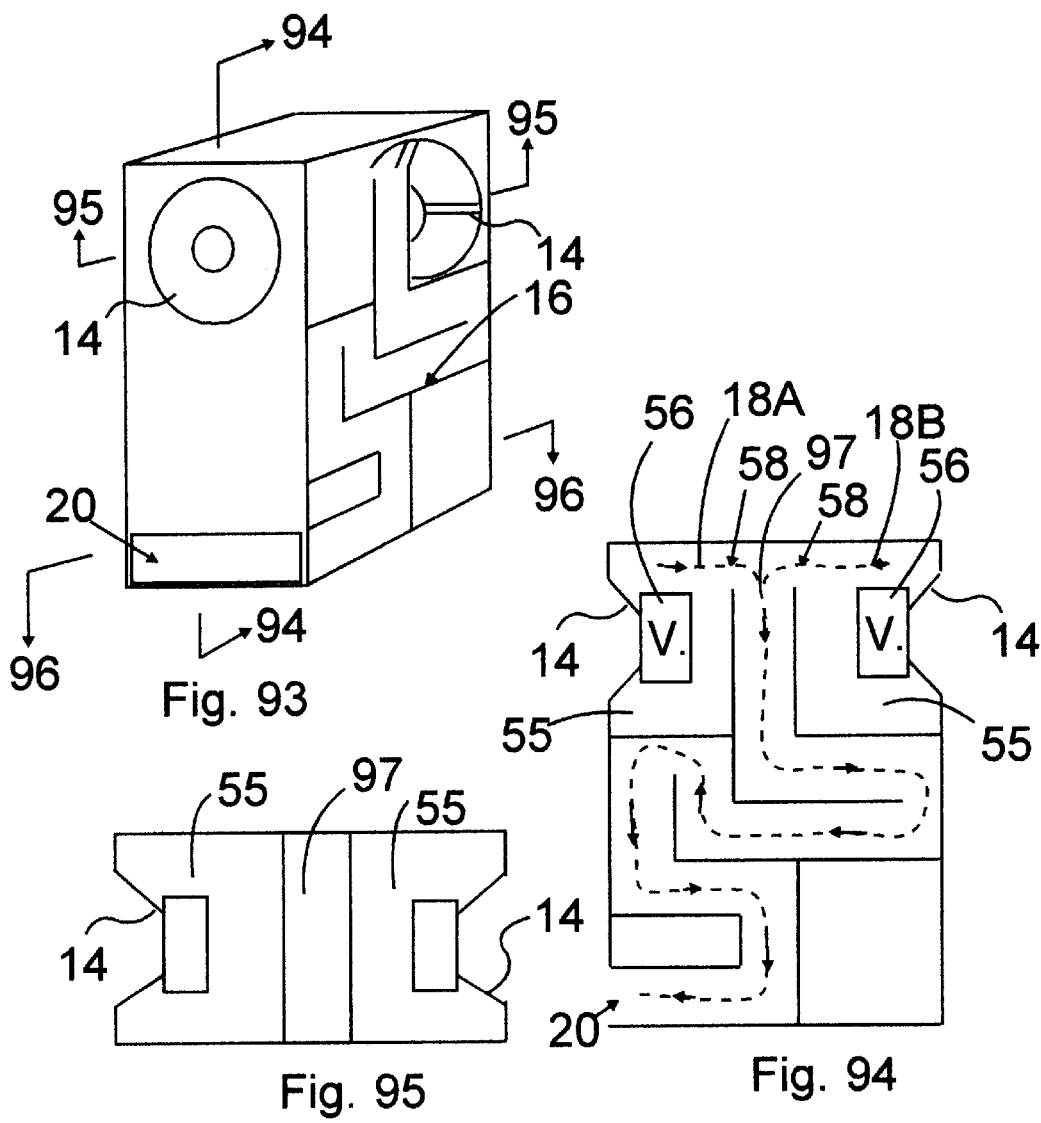
Fig. 93
Fig. 94
Fig. 95
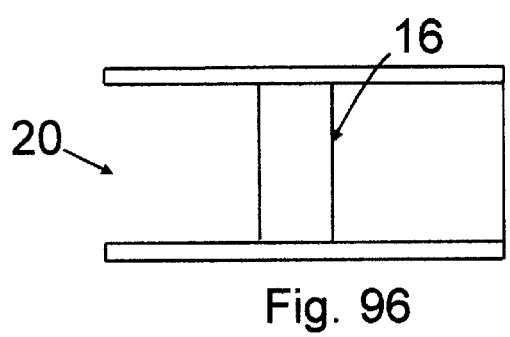
Fig. 96

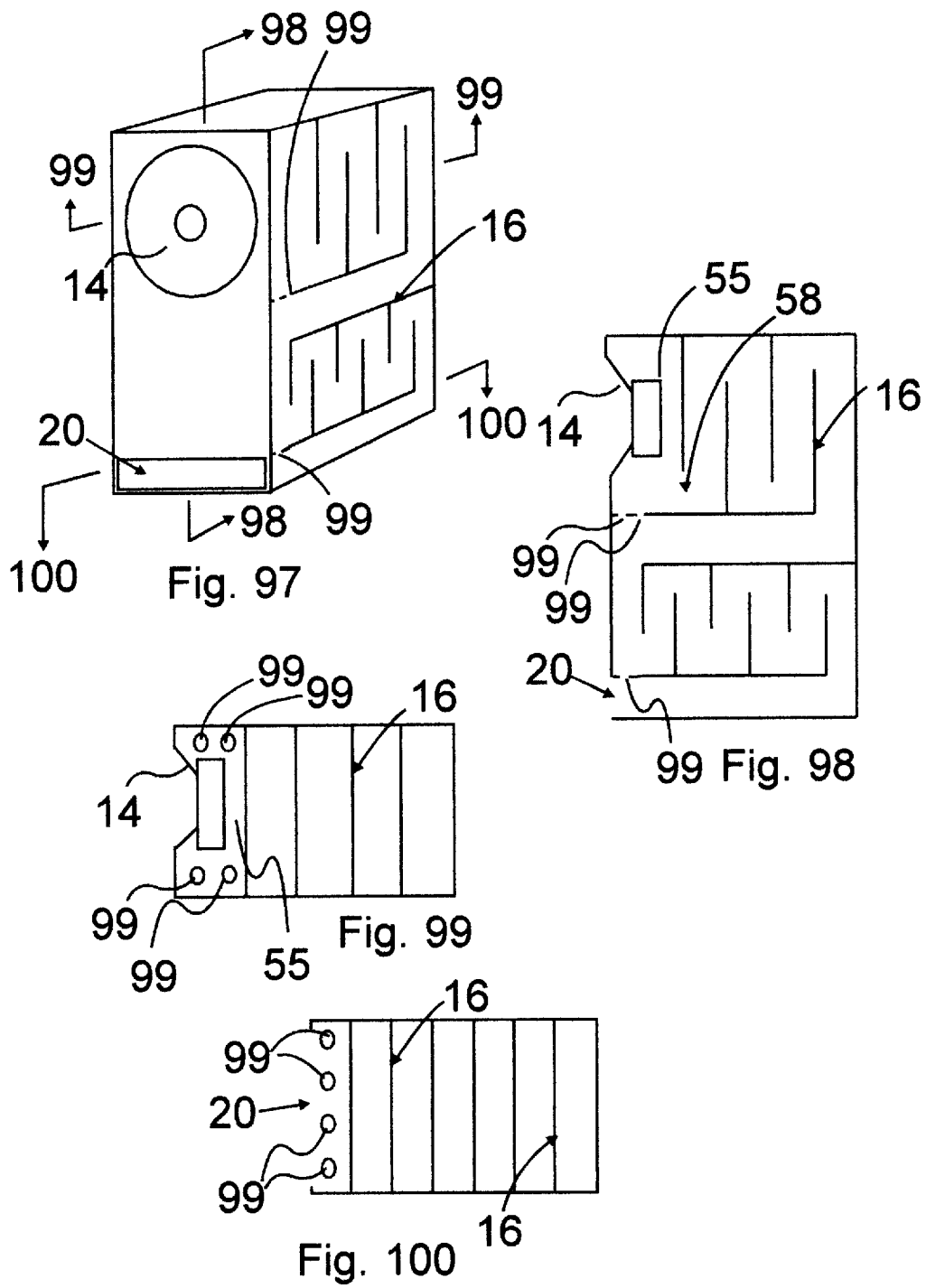

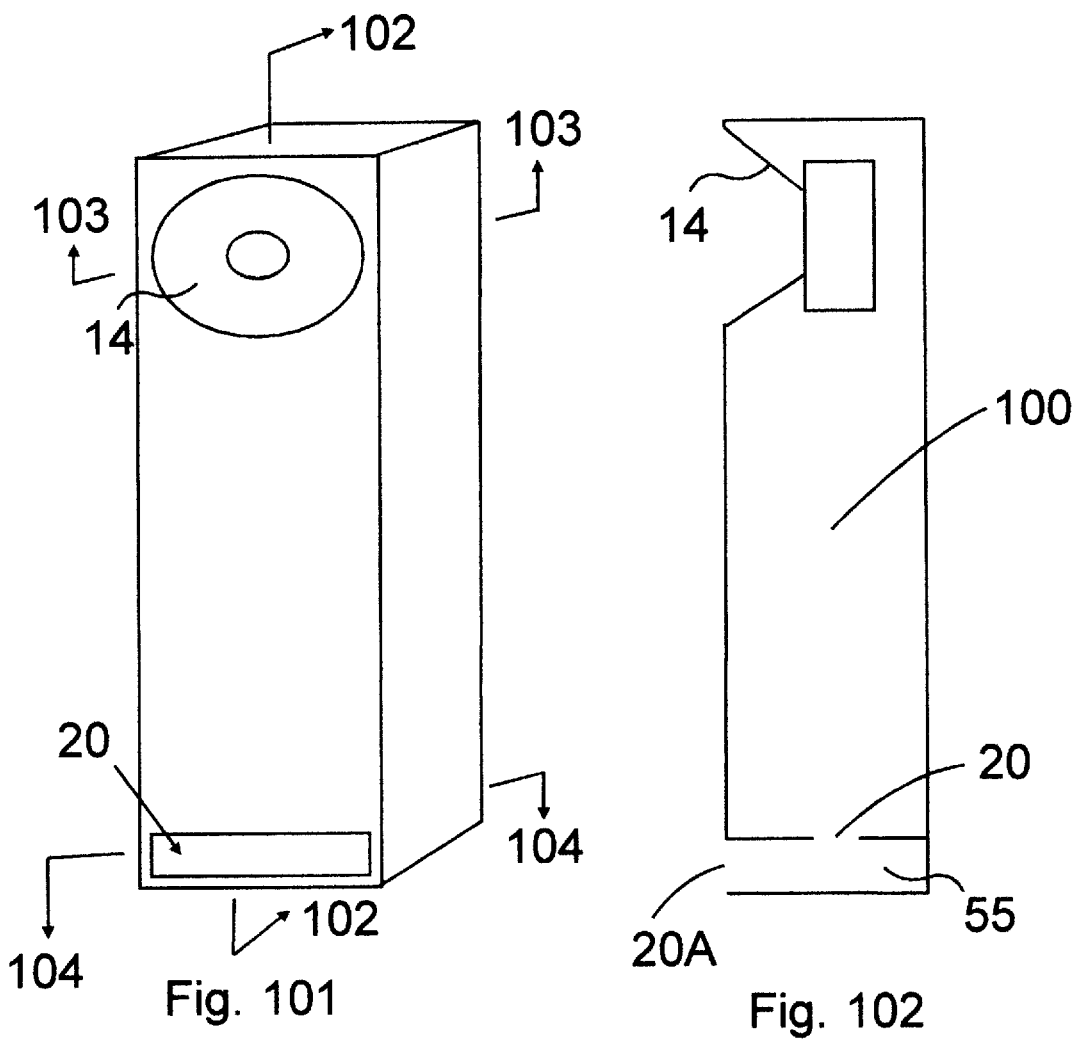
Fig. 101
Fig. 102
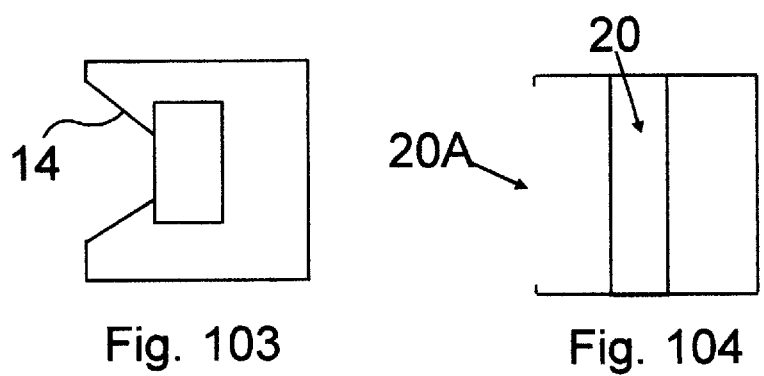
Fig. 103
Fig. 104

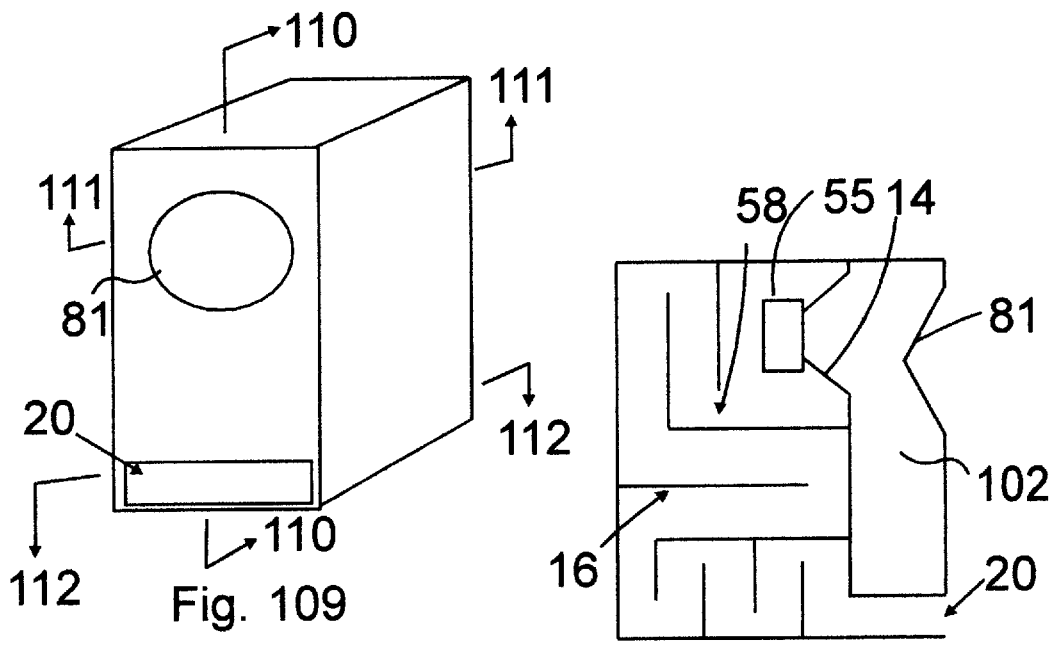
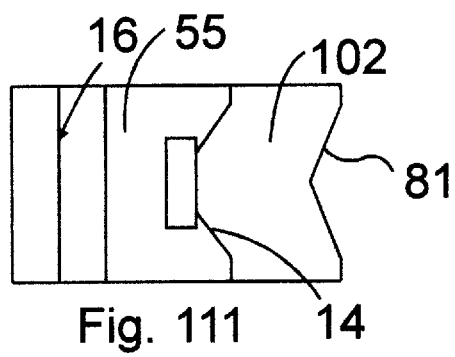
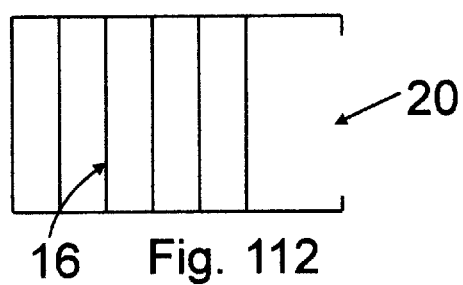

ACOUSTIC SYSTEM

FIELD OF THE INVENTION

The present invention relates in general to acoustic systems, and it more particularly relates to an improved loudspeaker system that produces deep bass or a wide frequency range of sounds with deep bass and sounds over a broad range of frequencies. The methods used in this invention have numerous commercial applications for generating or canceling frequencies.

BACKGROUND ART

U.S. Pat. No. 2,031,500 to Olney, which is incorporated herein by reference in its entirety, discloses a sound reproducing system which aims at eliminating the air cavity resonance effect of a loudspeaker cabinet. The system is provided with a conduit or passageway lined with sound absorbing material, and which has the form of a labyrinth into which the sound waves radiate from one surface of a sound radiator. The length of the conduit is selected so as to resonate at those lower frequencies at which the loud speaker is an inefficient reproducer.

U.S. Pat. No. 4,628,528 to Bose et al., which is incorporated herein by reference in its entirety, discloses a loudspeaker driver that has its front surface adjacent one end of a low loss acoustic waveguide and its rear surface adjacent one end of a second acoustic waveguide that is one third the length of the first. The other openings of the waveguides face air and couple acoustical energy substantially uniformly over a relatively broad range of frequencies extending into the bass frequency region. An equalizer includes a notch filter so that the frequency response of the equalizer below a bass cutoff frequency is sufficiently low to prevent distortion.

However, there is a significant and still unsatisfied need for a loudspeaker system that is relatively simple in design, inexpensive, with improved sound quality, and which is capable of producing deep bass and sounds over a broad range of frequencies.

SUMMARY OF THE INVENTION

The present invention provides a unique loudspeaker system that produces deep bass and sounds over a wide range of frequencies in a relatively small enclosure size. The loudspeaker system causes a substantial cancellation of high frequency sounds, and prevents lower frequency sounds from being canceled.

Yet another advantage of the present loudspeaker system is that it is relatively simple in design and inexpensive, and has improved sound quality.

Briefly, the foregoing and other objects are achieved by providing a new acoustic system for producing sounds over a broad range of frequencies. The acoustic system includes an enclosure, a speaker that is acoustically connected to the enclosure, for generating, almost simultaneously, two sounds, a forward sound, and a rearward sound. It further includes a waveguide enclosed at least partly within the enclosure, and acoustically connected to the speaker, for defining an acoustic path along which one of the forward or rearward sounds travels. The waveguide includes a plurality of inner panels that are positioned inside the enclosure for optimizing the length of the travel path. The inner panels and the enclosure defining a plurality of inner passageways having generally similar cross-sectional surface areas, and a plurality of inner openings, for causing a selective cancellation of sounds at predetermined frequencies, while preserving sounds at other frequencies.

In addition, the present acoustic system design has numerous commercial applications. For instance, it can be used in conjunction with ultra sound and sonar systems, hearing aids, stethoscopes, microphones, telephones, hearing aids, and noise cancellation devices, radios, etc.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 7 is a perspective view of yet another loudspeaker system according to the present invention, illustrating the use of a passive radiator;

FIG. 8 is a cross-sectional view of the loudspeaker system of FIG. 7, taken along line 8—8 thereof;

FIG. 9 is a cross-sectional view of the loudspeaker system of FIG. 7, taken along line 9—9 thereof;

FIG. 10 is a cross-sectional view of the loudspeaker system of FIG. 7, taken along line 10—10 thereof;

FIG. 11 is a perspective view of another embodiment of a loudspeaker system according to the present invention, illustrating the use of multiple speakers;

FIG. 12 is a cross-sectional view of the loudspeaker system of FIG. 11, taken along line 12—12 thereof;

FIG. 13 is a cross-sectional view of the loudspeaker system of FIG. 11, taken along line 13—13 thereof;

FIG. 14 is a cross-sectional view of the loudspeaker system of FIG. 11, taken along line 14—14 thereof;

FIG. 17 is a perspective view of yet another loudspeaker system according to the present invention, illustrating the use of a woofer or sub woofer;

FIG. 18 is a cross-sectional view of the loudspeaker system of FIG. 17, taken along line 18—18 thereof;

FIG. 19 is a cross-sectional view of the loudspeaker system of FIG. 17, taken along line 19—19 thereof;

FIG. 20 is a cross-sectional view of the loudspeaker system of FIG. 17, taken along line 20—20 thereof;

FIG. 24 is a perspective view of yet another loudspeaker system according to the present invention, illustrating the use of two separate loudspeakers and waveguides;

FIG. 25 is a perspective view of yet another loudspeaker system according to the present invention, illustrating its use in a portable stereo system;

FIG. 26 is a perspective view of yet another loudspeaker system according to the present invention, illustrating its use in a television or monitor;

FIG. 27 is a perspective view of yet another loudspeaker system according to the present invention, illustrating its use in a portable computer;

FIG. 65 is a perspective view of yet another loudspeaker system according to the present invention, illustrating the use of angled corners on the waveguides;

FIG. 66 is a cross-sectional view of the loudspeaker system of FIG. 65, taken along line 66—66 thereof;

FIG. 67 is a cross-sectional view of the loudspeaker system of FIG. 65, taken along line 67—67 thereof;

FIG. 68 is a cross-sectional view of the loudspeaker system of FIG. 65, taken along line 68—68 thereof;

FIG. 71 is a perspective view of yet another loudspeaker system according to the present invention, illustrating the use of a spiral waveguide;

FIG. 72 is a cross-sectional view of the loudspeaker system of FIG. 71, taken along line 72—72 thereof;

FIG. 73 is a cross-sectional view of the loudspeaker system of FIG. 71, taken along line 73—73 thereof;

FIG. 74 is a cross-sectional view of the loudspeaker system of FIG. 71, taken along line 74—74 thereof;

FIG. 75 is a perspective view of yet another loudspeaker system according to the present invention, illustrating the use of long waveguides;

FIG. 76 is a cross-sectional view of the loudspeaker system of FIG. 75, taken along line 76—76 thereof;

FIG. 77 is a cross-sectional view of the loudspeaker system of FIG. 75, taken along line 77—77 thereof;

FIG. 78 is a cross-sectional view of the loudspeaker system of FIG. 75, taken along line 78—78 thereof;

FIG. 83 is a perspective view of yet another loudspeaker system according to the present invention, illustrating the use of variable waveguides;

FIG. 84 is a cross-sectional view of the loudspeaker system of FIG. 83, taken along line 84—84 thereof;

FIG. 85 is a cross-sectional view of the loudspeaker system of FIG. 83, taken along line 85—85 thereof;

FIG. 86 is a cross-sectional view of the loudspeaker system of FIG. 83, taken along line 86—86 thereof;

FIG. 89 is a perspective view of yet another loudspeaker system according to the present invention, illustrating the use of two speakers using one waveguide with two output ports;

FIG. 90 is a cross-sectional view of the loudspeaker system of FIG. 89, taken along line 90—90 thereof;

FIG. 91 is a cross-sectional view of the loudspeaker system of FIG. 89, taken along line 91—91 thereof;

FIG. 92 is a cross-sectional view of the loudspeaker system of FIG. 89, taken along line 92—92 thereof;

FIG. 93 is a perspective view of yet another loudspeaker system according to the present invention, illustrating the use of two speakers using one waveguide and one output port;

FIG. 94 is a cross-sectional view of the loudspeaker system of FIG. 93, taken along line 94—94 thereof;

FIG. 95 is a cross-sectional view of the loudspeaker system of FIG. 93, taken along line 95—95 thereof;

FIG. 96 is a cross-sectional view of the loudspeaker system of FIG. 93, taken along line 96—96 thereof;

FIG. 97 is a perspective view of yet another loudspeaker system according to the present invention, illustrating the use of holes in the waveguide;

FIG. 98 is a cross-sectional view of the loudspeaker system of FIG. 97, taken along line 98—98 thereof;

FIG. 99 is a cross-sectional view of the loudspeaker system of FIG. 97, taken along line 99—99 thereof;

FIG. 100 is a cross-sectional view of the loudspeaker system of FIG. 97, taken along line 100—100 thereof;

FIG. 101 is a perspective view of yet another loudspeaker system according to the present invention, without waveguides;

FIG. 102 is a cross-sectional view of the loudspeaker system of FIG. 101, taken along line 102—102 thereof;

FIG. 103 is a cross-sectional view of the loudspeaker system of FIG. 101, taken along line 103—103 thereof;

FIG. 104 is a cross-sectional view of the loudspeaker system of FIG. 101, taken along line 104—104 thereof;

FIG. 109 is a perspective view of yet another loudspeaker system according to the present invention, illustrating the use of a band-pass enclosure with waveguides and a passive radiator;

FIG. 110 is a cross-sectional view of the loudspeaker system of FIG. 109, taken along line 110—110 thereof;

FIG. 111 is a cross-sectional view of the loudspeaker system of FIG. 109, taken along line 111—111 thereof;

FIG. 112 is a cross-sectional view of the loudspeaker system of FIG. 109, taken along line 112—112 thereof;

FIG. 119 is a perspective view of yet another loudspeaker system according to the present invention, illustrating the use of a passive radiator in the waveguides;

FIG. 120 is a cross-sectional view of the loudspeaker system of FIG. 119, taken along line 120—120 thereof;

FIG. 121 is a perspective view of yet another loudspeaker system according to the present invention, illustrating the use of a speaker with a closed end and exiting through the waveguides;

FIG. 122 is a cross-sectional view of the loudspeaker system of FIG. 121, taken along line 122—122 thereof;

FIG. 123 is a perspective view of yet another loudspeaker system according to the present invention, illustrating the use of a passive radiator and speaker exiting through the waveguides;

FIG. 124 is a cross-sectional view of the loudspeaker system of FIG. 123, taken along line 124—124 thereof;

FIG. 125 is a perspective view of yet another loudspeaker system according to the present invention, illustrating the use of a speaker and a passive radiator exiting through the waveguides;

FIG. 126 is a cross-sectional view of the loudspeaker system of FIG. 125, taken along line 126—126 thereof;

FIG. 127 is a perspective view of yet another loudspeaker system according to the present invention, illustrating the use of a speaker and a passive radiator through no waveguides;

FIG. 128 is a cross-sectional view of the loudspeaker system of FIG. 127, taken along line 128—128 thereof;

FIG. 129 is a perspective view of yet another loudspeaker system according to the present invention, illustrating the use of the waveguides in headphones;

FIG. 130 is a perspective view of yet another loudspeaker system according to the present invention, illustrating the use of the waveguides in microphones;

Figure 131:
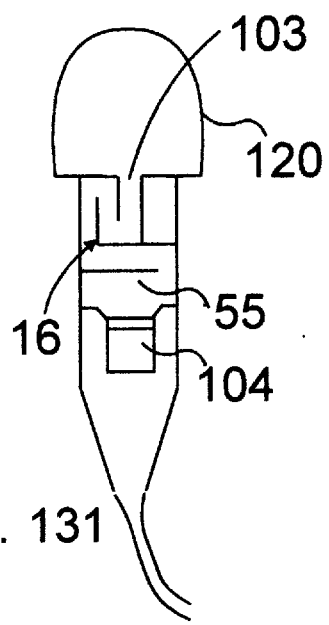
Figure 132:
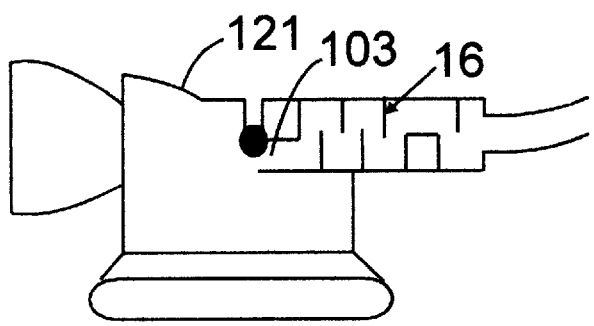
Figure 133:
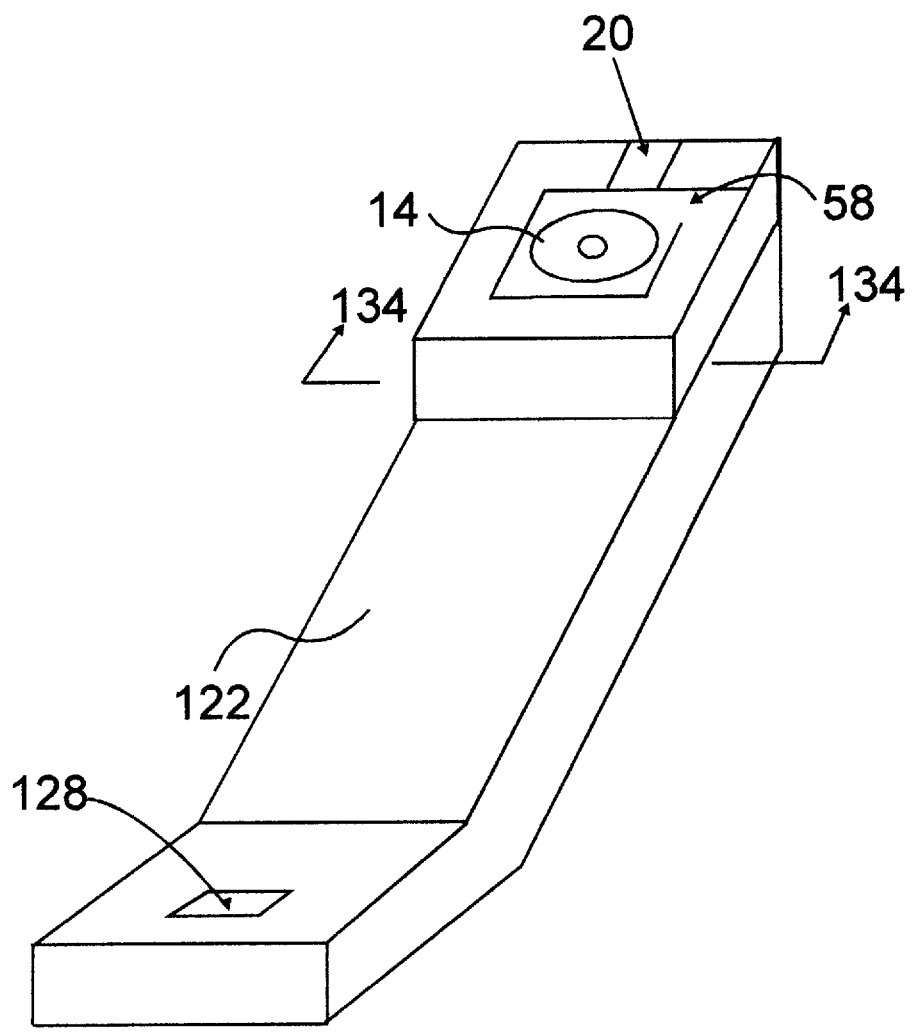
Figure 134:
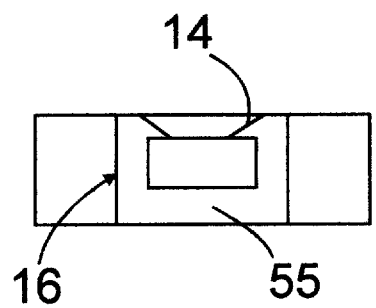
Figure 135:
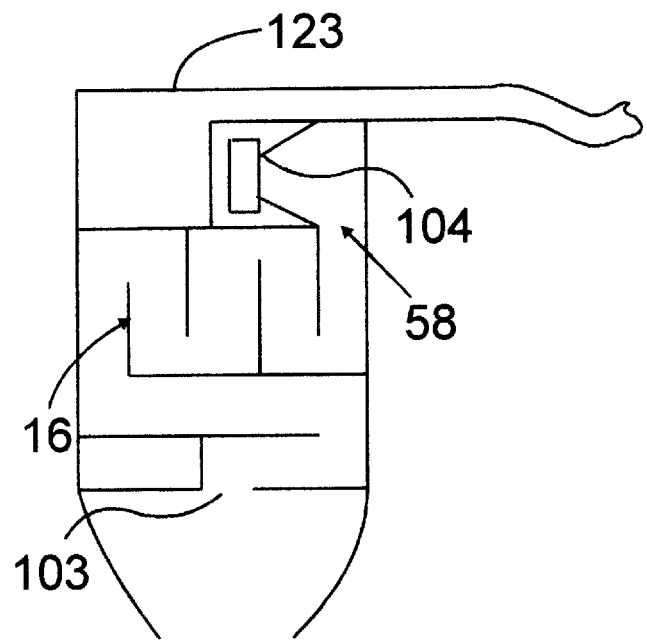
Figure 136:
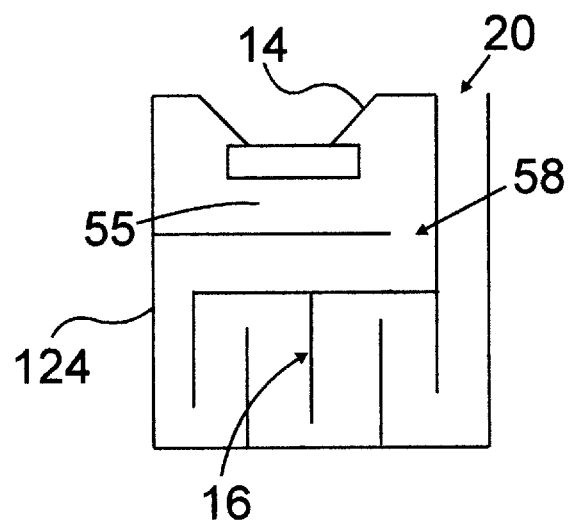
Figure 137:
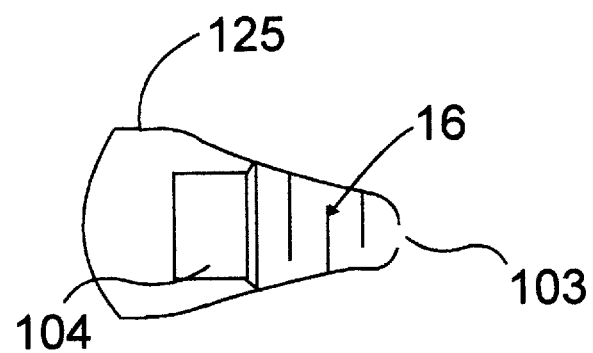
Figure 138:
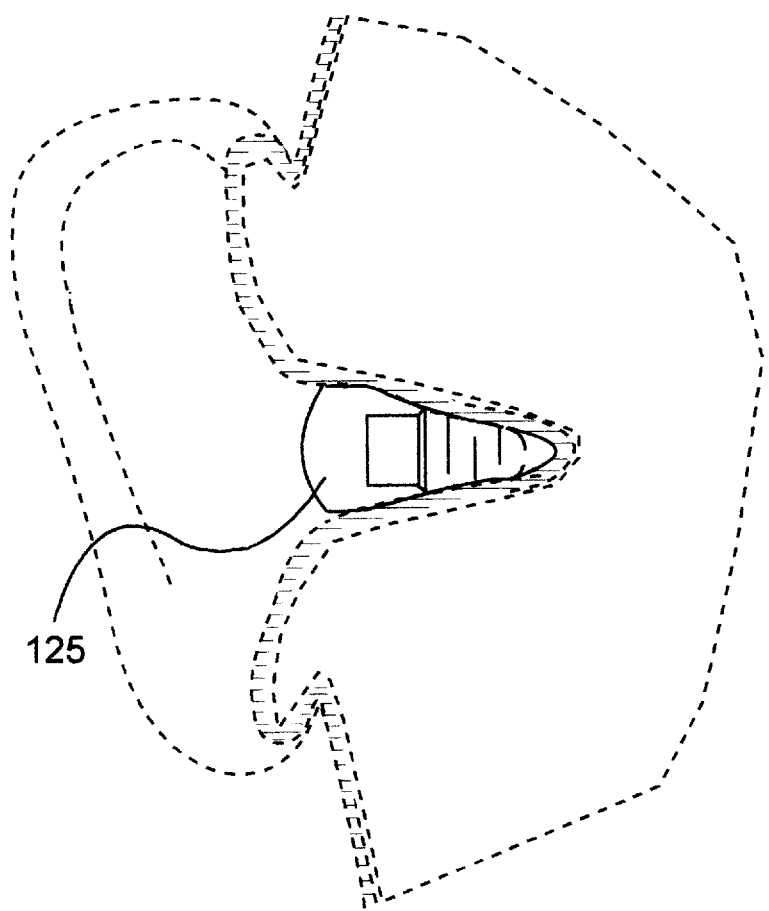
Figure 139:
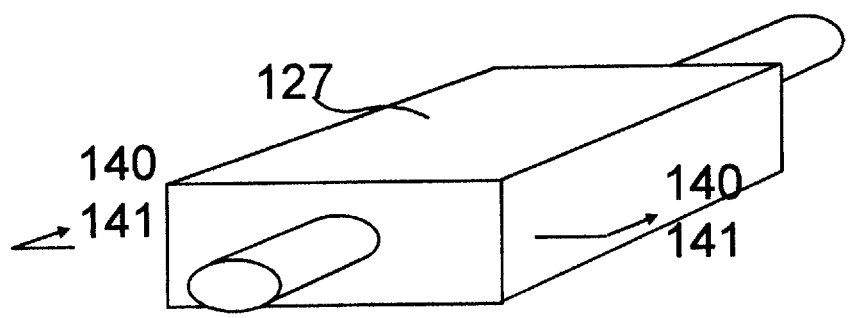
Figure 140:
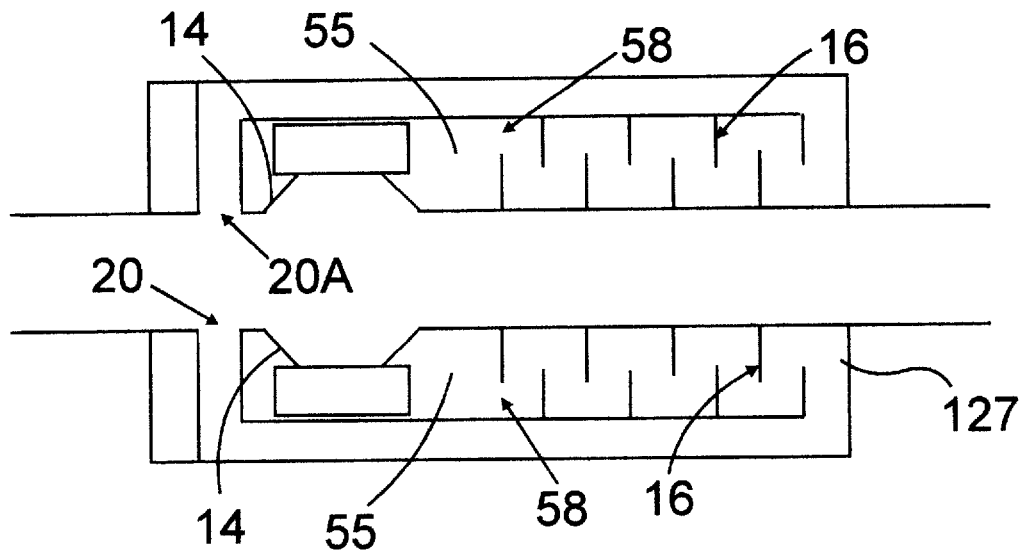
Figure 141:
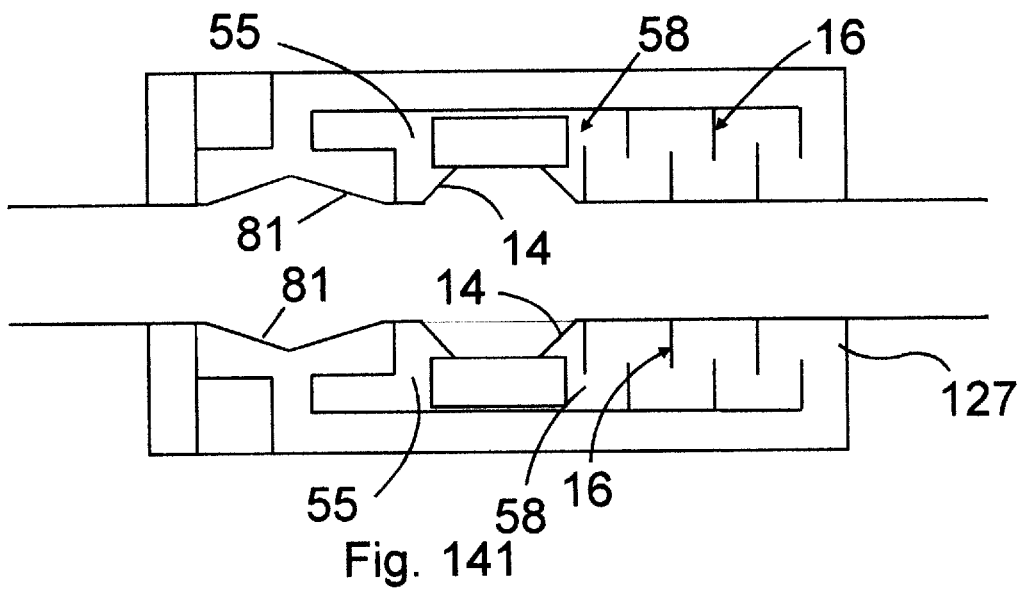
Figure 142:
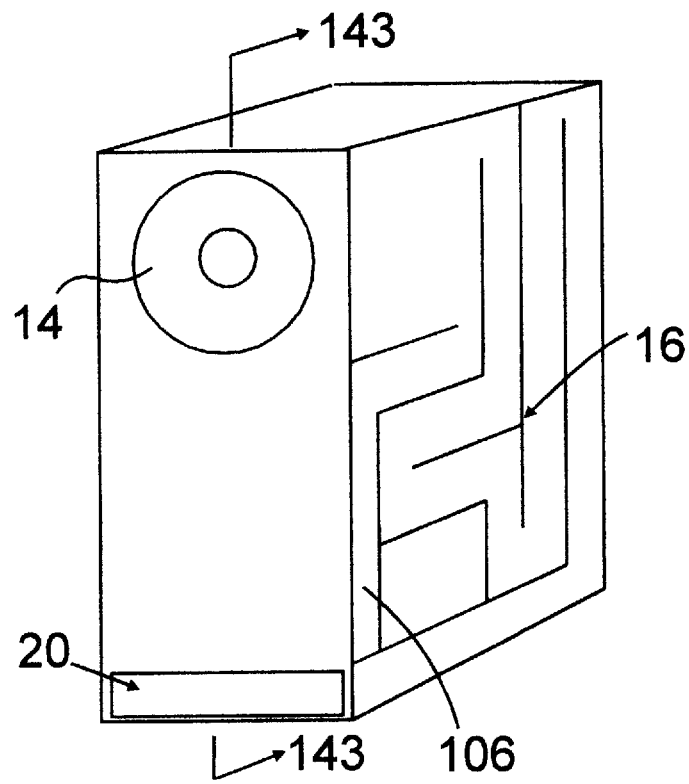
Figure 143:
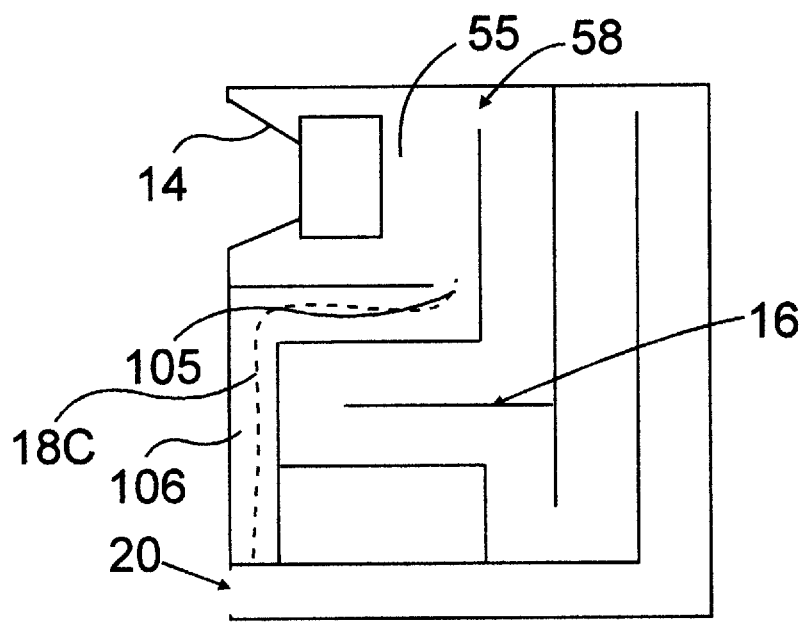
Figure 144:
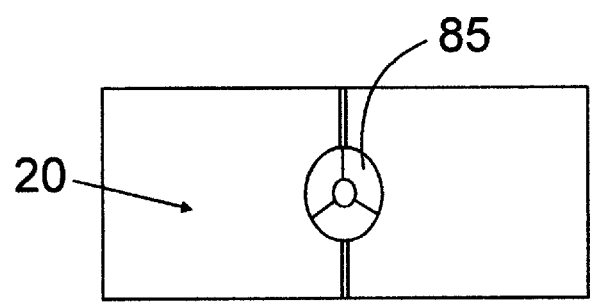
Figure 145:
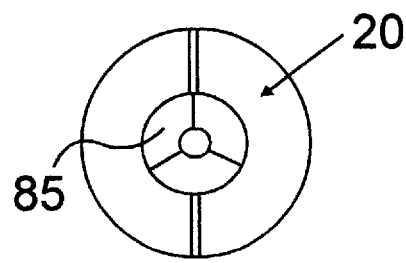

FIG. 131 is a perspective view of yet another loudspeaker system according to the present invention, illustrating the use of the waveguides in microphones to cancel frequencies;

FIG. 132 is a perspective view of yet another loudspeaker system according to the present invention, illustrating the use of the waveguides in stethoscopes;

FIG. 133 is a perspective view of yet another loudspeaker system according to the present invention, illustrating the use of the waveguides in a phone;

FIG. 134 is a cross-sectional view of the loudspeaker system of FIG. 133, taken along line 134—134 thereof;

FIG. 135 is a perspective view of yet another loudspeaker system according to the present invention, illustrating the use of the waveguides in an ultra sound or ultra sonic device;

FIG. 136 is a perspective view of yet another loudspeaker system according to the present invention, illustrating the use of the waveguides in a noise cancellation device;

FIG. 137 is a perspective view of yet another loudspeaker system according to the present invention, illustrating the use of the waveguides in a hearing aid;

FIG. 138 is a perspective view of yet another loudspeaker system according to the present invention, illustrating the use of the hearing aid in the ear;

FIG. 139 is a perspective view of yet another loudspeaker system according to the present invention, illustrating the use of the waveguides in a noise cancellation muffler with a exiting port or passive radiator;

FIG. 140 is a cross-sectional view of the loudspeaker system of FIG. 139, taken along line 140—140 thereof;

FIG. 141 is a cross-sectional view of the loudspeaker system of FIG. 139, taken along line 141—141 thereof;

FIG. 142 is a perspective view of yet another loudspeaker system according to the present invention, illustrating the use of a frequency trap in the waveguide;

FIG. 143 is a cross-sectional view of the loudspeaker system of FIG. 142, taken along line 143—143 thereof;

FIG. 144 is a front view of yet another loudspeaker system according to the present invention, illustrating the use of a tweeter mounted in the output port; and FIG. 145 is a front view of yet another loudspeaker system according to the present invention, illustrating the use of a tweeter mounted in the output port.

Similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE PREFERRED EMBODIMENTS

Referring now to the drawings, similar reference numerals indicate similar components. FIGS. 1 through 4 illustrate a loudspeaker system 10 designed according to the present invention. The loudspeaker system 10 is typically rectangular or square, and generally includes an enclosure 12 that houses a speaker 14 and a waveguide 16.

Figure 2:
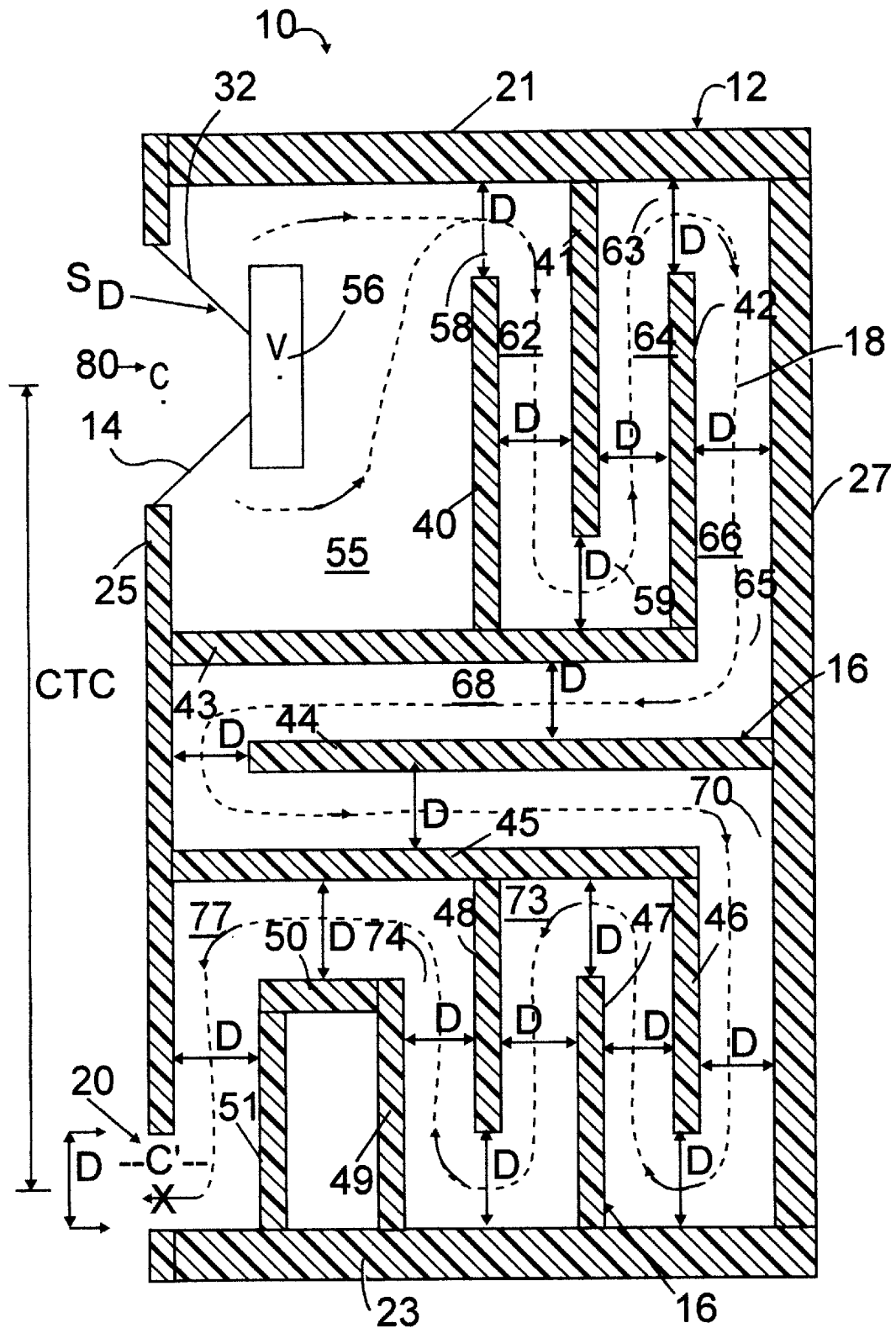
FIG. 2 is an enlarged cross-sectional view of the loudspeaker system of FIG. 1, taken along line 2—2 thereof.

As better shown in FIG. 2, sound radiates from the front diaphragm of the speaker 14. Simultaneously, the waveguide 16 which is specially designed to define an acoustic serpentine path, drawn in dashed lines, and generally referred to as 18, allows sound generated by the speaker driver to travel along the acoustic path 18, and to exit the enclosure 12 via an output port 20. As a result, a single speaker 14 can almost simultaneously produce two sounds, a forward sound emanating directly from the speaker 14, and a "rearward" sound emanating from the output port 20.

Due to the inventive design of the waveguide 16, a deep bass rearward sound is produced over a wide range of frequencies in a relatively compact enclosure 12, by causing a substantial cancellation of high frequency sounds, and by further preventing lower frequency sounds from being canceled. It has been experimentally determined that the sound quality of the speaker system 10 is substantially improved over that of the speaker 14 taken alone or enclosed in a conventional enclosure. Since the construction of the loudspeaker system 10 is relatively simple, its production cost is low, and the savings can be ultimately passed along to the end user.

Figure 1:
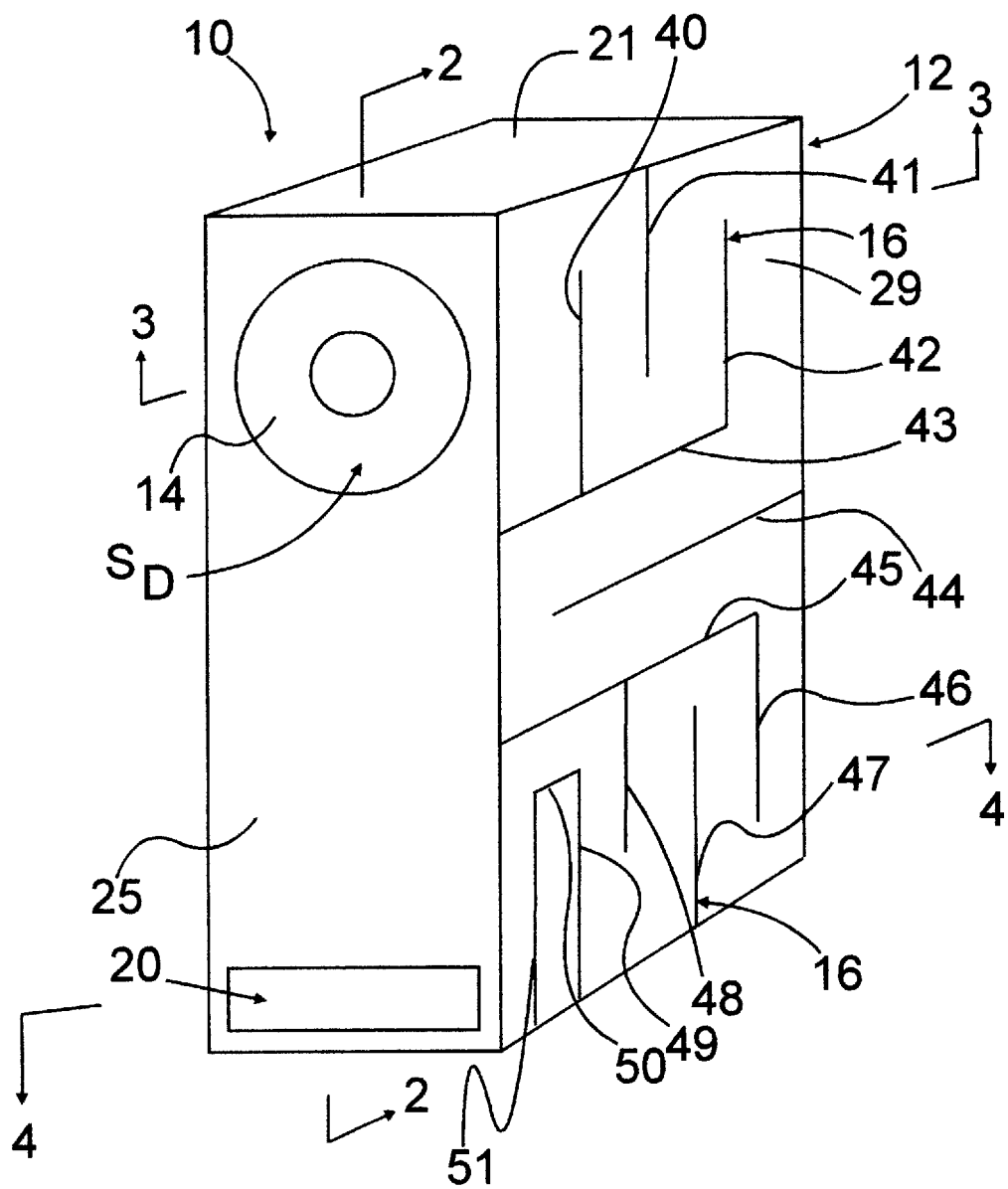
FIG. 1 is a perspective diagrammatic view of a loudspeaker system according to the present invention.
Figure 3:
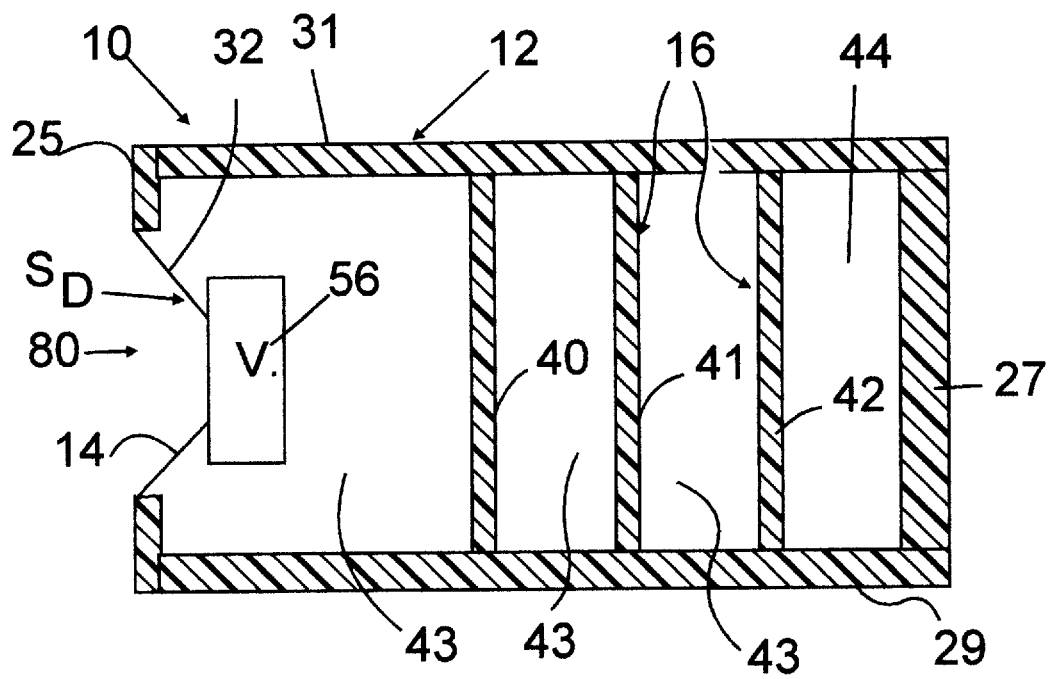
FIG. 3 is an enlarged cross-sectional view of the loudspeaker system of FIG. 1, taken along line 3—3 thereof.
Figure 4:
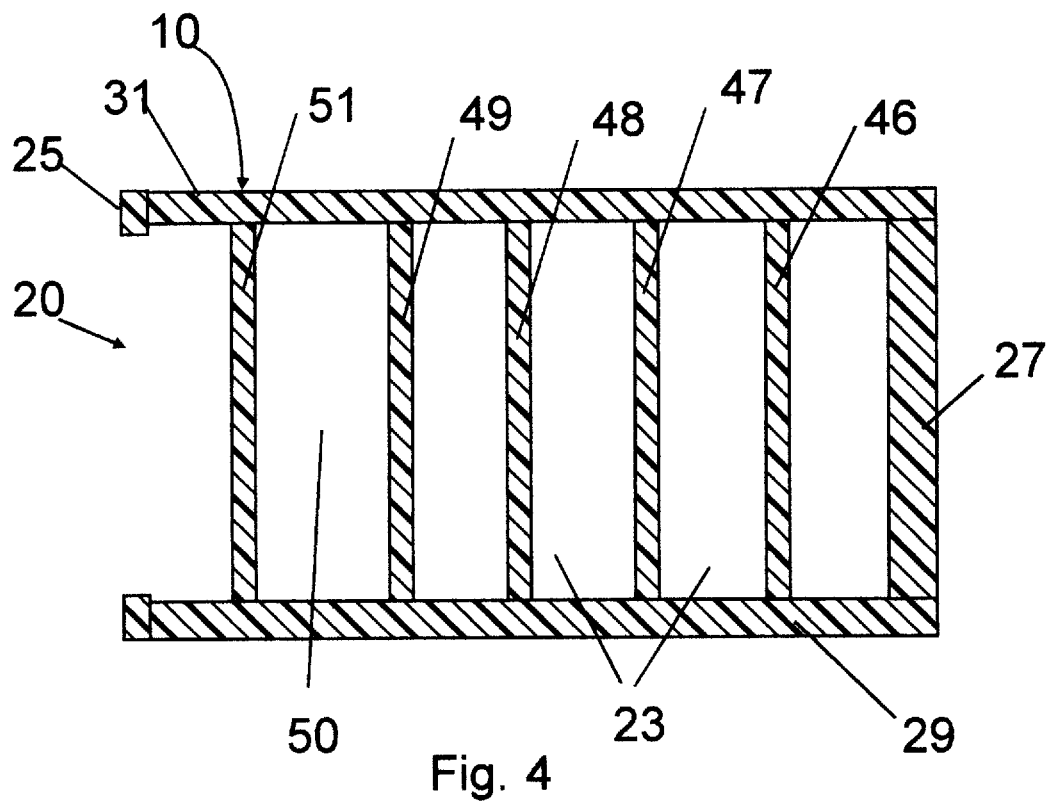
FIG. 4 is a greatly enlarged cross-sectional view of the loudspeaker system of FIG. 1, taken along line 4—4 thereof.

Considering now each of the main components of the loudspeaker system 10 in greater detail, the enclosure 12 may be made of any suitable material, such as plastic, wood, etc. While FIGS. 1–3 show the enclosure 12 as being generally rectangularity shaped, for illustration purpose only, it should be understood that other shapes may alternatively be selected without departing from the scope of the present invention.

The enclosure 12 typically includes a top panel 21, a bottom panel 23, a front panel 25, a rear panel 27, and two side panels 29, 31. These panels can be sized as desired, and for simplicity of illustration, they will be schematically shown in the drawings as line drawings, without a thickness, with the understanding that these panels do in fact have a tangible physical thickness.

The top, bottom, rear and side panels 21, 23, 27, 29, 31, respectively, are generally flat, rectangularity shaped plates. It should be clear that in other embodiments, any of these panels can include predeterminately positioned openings of desired shapes and dimensions, for producing a desired acoustic result. The front panel 25 includes an upper opening for accommodating the speaker 14, as well as the output port 20, through which the rearward sound exits the loudspeaker system 10.

It has been experimentally demonstrated that the preferred embodiment of the loudspeaker system 10 yields an optimal result if the surface area of the output port 20 is about one half the front surface diaphragm area, or the piston area $S_D$ of the loudspeaker 14 with the use of a preferred width to height ratio of one over four that can be used, as set forth in the following equation (1):

$$\text{Waveguide Surface Area} = \text{Output Port Surface Area} = S_D/2. \quad (1)$$

It was also found that if the surface area of the output port 20 is too small, it causes excessive pressure to be applied on the cone 32 of the loudspeaker 14, affecting the quality of the sound.

In one exemplary embodiment, the output port 20 is rectangularity shaped; however, other shapes are also contemplated by the present invention. Using a 3 inch loudspeaker, with a piston area $S_D$ of 4.5 square inches, the optimal surface area of the output port 20 is 2.25 square inches (i.e., $S_D/2$).

The overall size of the exemplary enclosure 12 is 10 inches high, 6.75 inches deep, and 3.5 inches wide. The top panel 21 is about 0.5 inch thick, 6.5 inches high, and 3 inches wide. Each of the side panels 29, 31 is about 0.5 inch thick, 9 inches high, and 3 inches wide. The bottom panel 23 is about 0.5 inch thick, 6.5 inches high, and 3 inches wide. The rear panel 27 is about 0.25 inch thick, 10 inches high, and 6.5 inches wide. The front panel 25 is about 0.25 inch thick, 10 inches high, and 6.5 inches wide. It should be clear that other shapes and dimensions can alternatively be selected for these panels. Therefore, the present inventive design enables the reduction of the overall enclosure size.

The speaker 14 can be any speaker or a combination of speakers. While FIGS. 1–3 show a single speaker 14 oriented outwardly, it should be understood that two or more speakers can be used and placed in relative proximity to each other. Also, in another embodiment using a single speaker, such speaker could be oriented inwardly toward the waveguide 16, rather than outwardly. In yet another embodiment using multiple speakers, one or more speakers could be oriented outwardly, while one or more other speakers could be oriented inwardly, etc. The various embodiments which will be described later will illustrate the diversity of possible configurations, and will provide non-exclusive exemplary designs.

In the above exemplary embodiment, the loudspeaker 14 is a 3 inch full-range magnetically shielded loudspeaker, such as an Audax™ AT080MO loudspeaker, with a retail price of about $15 U.S. By using the present inventive design, it is possible to convert this relatively inexpensive loudspeaker into a loudspeaker system that produces deep bass and sounds over a wide frequency range.

The waveguide 16 includes a plurality of panels or inner plates 40–51 that are positioned inside the enclosure 12 so as to optimize the length of the sound travel path 18 and the sound quality. The panels may be made of any acoustical material that reflects sound, such as plastic, wood, clay, marble, metal, etc. It would be possible to cover of fill some or all of the waveguide 16 with acoustic material, such as wool, fiberglass, and nylon fiber, as it will be explained later in greater detail.

Describing the waveguide 16 with the enclosure 12 in the upright position, the panel 40 extends horizontally between the side panels 29 and 31 of the enclosure 12 (FIG. 3). The panel 40 also extends vertically from the panel 43 toward the top panel 21, for defining an opening 58, through which the sound waves propagate from the speaker 14. In this particular example, the surface area of the opening 58 is substantially similar to the surface area of the output port 20, and is defined by the above equation (1).

The adjacent panel 41 is generally parallel to the panel 40, and is disposed at a predetermined distance "D" therefrom. It extends between the side panels 29, 31 of the enclosure 12, and depends vertically from the top panel 21 toward the panel 43, for defining an opening 59, through which the sound waves propagate along the path 18. In this particular embodiment, the two adjacent panels 40, 41 define an open ended passageway 62 there between, through which the sound waves propagate. The passageway 62 is uniform, and its cross-sectional surface area is typically equal to the surface area of the openings 58, 59.

The panel 42 is generally similarly dimensioned, shaped and positioned as the panel 40. It is disposed at a predetermined distance "D" from the panel 41 and the rear panel 27 of the enclosure 12. The panel 42 extends between the side panels 29, 31 of the enclosure 12, and depends vertically from the panel 43 toward the top panel 21, for defining two opposite openings 63, 65 through which the sound waves propagate along the path 18. In this particular embodiment, the two adjacent panels 41, 42 define an open ended passageway 64 there between, and the panel 42 and the rear panel 27 define another open-ended passageway 66, through which the sound waves propagate. The passageways 64, 66 are typically uniform, and have their cross-sectional surface areas equal to the surface area of the passageway 62.

The panel 43 extends between the side panels 29, 31 and depends horizontally from the front panel 25 of the enclosure 12 toward its rear panel 27. The panel 44 extends between the side panels 29, 31 and depends horizontally from the rear panel 27 of the enclosure 12 toward its front panel 25. The panel 43 is disposed at a predetermined distance "D" from the panel 43 and the panel 45. In this particular embodiment, the three adjacent panels 43, 44 and 45 form an open ended serpentine passageway 68 that extends between the opening 65 and another opposite opening 70. The passageway 68 is typically uniform, and has its cross-sectional surface area equal to the surface area of the passageway 62. In the preferred embodiment, all the openings such as 58, 59 63, 65, 70, etc. along the sound path 18 are generally similar and have a cross-sectional area that is substantially equal to the cross-sectional area of the output port 20.

The panel 45 is generally similar to the panel 43, and is symmetrically disposed relative to the central panel 44. The panels 46, 47 and 48 are generally similar to the panels 42, 41 and 40, respectively, and are symmetrically disposed relative to the central panel 44. Both panels 46 and 48 depend vertically from the panel 45, while the panel 47 is placed intermediate the two panels 46, 48, at an equal distance "D" therefrom. The panel 47 depends vertically from the bottom panel 23 of the enclosure 12 toward the panel 45. The panel 46 is positioned at a distance "D" from the rear panel 27, while the panel 48 is also positioned at the same or substantially similar distance "D" from the panel 49.

In this particular embodiment, the four adjacent panels 46, 47, 48 and 49 form a continuous open ended serpentine passageway 73 that extends between the opening 70 and another opening 74. The panels 49, 50 and 51 are so disposed and interconnected as to form a uniform serpentine passageway 77 between the opening 74 and the output port 20. The cross-sectional area of the passageway 77 is generally similar to that of the output port 20, such that the entire passageway formed between the opening 58 and the output port 20 has a substantially uniform cross-section. As a result, it is now possible to produce deep bass in a small size enclosure.

In the exemplary embodiment illustrated in FIGS. 1–3, the internal panels 40–51 forming the waveguide 16 are 0.25 inch thick and 3 inches wide. Waveguide 43 is 5¼" long which is connected to the face baffle 25. Waveguide 43 is connected to waveguide 40 which is 3³⁄₁₆" long, and waveguide 43 is connected to waveguide 42 which is 3³⁄₁₆" long. Waveguide 41 which is 3³⁄₁₆" long is connected to top panel 21. Waveguide 44 which is 5¼" long is connected to side panel 27. Waveguide 45 which is 5¼" long is connected to the face baffle 25. Waveguide 45 is connected to waveguide 46 which is 2²⁄₁₆ long, and waveguide 45 is connected to waveguide 48 which is 2²⁄₁₆ long. Waveguide 47 which is 2⅛" long is connected to bottom panel 23. Bottom panel 23 is connected to waveguide 49 which is 2⅛ long. Waveguide 50 which is 1⅛" is connected to waveguide 49 and 51. Then waveguide 51 which is 1⅞" is connected to bottom panel 23.

While only twelve panels 40–51 are shown, it should be understood that a different number of panels can be selected to determine the final length of the sound path 18. It should also be understood that the overall size of the loudspeaker system 10 can be miniaturized, as it will be described later.

The panels 40, 43 form a first compartment 55 with the enclosure 12, in which the speaker 14 is at least partially housed. In the preferred embodiment, the first compartment 55 is empty, and defines a predetermined volume with the speaker 14. The air volume or volume to air mass will herein be referred to as "air volume" and is measured in volume units, such as cubic inches or cubic centimeters. The air volume loads the rear surface of the speaker 14 with back pressure to increase the efficiency of the speaker driver 56, and to reduce the speaker cone excursion.

The speaker driver 56 generates sound pressure waves that radiate from the front and the rear. The sound radiated from the rear of the speaker 14 exits the compartment 55 through the opening 58, and propagates along the path 18. The air volume surrounding the rear surface of the loudspeaker 14, i.e., within the compartment 55 is referred to as air volume, and is defined by the following equation (2):

$$AV = \frac{1728}{18} \times \sqrt{FS} \times QTS \times VAS \qquad (2)$$

where FS represents the free-air resonant frequency of the speaker 14; QTS represents the Q of the speaker 14 at FS in free air considering both its electrical and mechanical resistance; Q represents the system losses or relative damping (i.e., ratio of stored to dissipated energy or ratio of reactive to resistive energy); and VAS represents the volume of air having the same compliance as the suspension of the speaker 14. For other embodiments, the constant (1728/18) can be represented by a constant K, which can vary from one design to the other. In the above equation (2), AV may be expressed in cubic inches while VAS may be expressed in cubic feet.

The area of the waveguides 18 and the area of the output port 20 may be equal. This waveguide area (Wga or WGA or WGA OR WGA) is half of the front surface diaphragm area of the loudspeaker with the use of a preferred width to height ratio of one to four that can be used. This area must be constant through all the waveguides 48 and out at least one output port 20 to avoid echoing, such that: WGA OR WGA=$S_D$/2. While in the preferred embodiment the cross-sectional surface areas of the inner passageways are described herein as being generally similar, it is possible that they may be different. Also, while in the preferred embodiment the areas of the waveguides 18 and the output port 20 may be equal, these areas may not have a 1:1 correspondence (may not be equal) in other embodiments. For instance, in some embodiment the area of the waveguide(s) 18 is larger than that of the output port 20, and in other embodiment the area of the waveguide(s) 18 is smaller than the area of the output port 20.

The waveguide 16 directs and controls the sound pressure waves generated by the rear radiating surface of the loudspeaker 14. The length of the waveguide 16 is generally determined from the center V of the voice coil of the speaker driver 56 through the waveguides 16, along the path 18 up to the output port 20. The length of the waveguide 16 will be referred to as Lwg and is measured in inches. It is generally defined by the following equation (3):

$$Lwg = k/FS, \qquad (3)$$

where k is a constant, which, in the preferred embodiment is equal to: (0.265×12×C), where C is the speed of sound, and FS is the free-air resonant frequency of the speaker 14.

As a result, the length of the waveguide 16 depends on the speaker resonant frequency (FS). The lower FS is, the longer the waveguide 16 will be. In the preferred embodiment, the length of the waveguide 16 is typically between ¼ (0.25) to ⅓ (0.33) wavelength at the speaker resonant frequency, in order to prevent the front radiating sound of the speaker 14 from canceling the rear radiating sound of the speaker 14, thus producing the widest frequency range and the deepest bass. In some applications, the length of the waveguide 16 is between ¼ to ⅓ the wavelength at the FS of the speaker. For instance, for a ¼ wavelength with a FS of 50 hertz the length is 67.8" long. For a ⅓ wavelength with a FS of 50 hertz the length is 89.5" long. For the preferred embodiment with a FS of 50 hertz the length is 71.8" long. The internal panels 40–51 forming the waveguide 16 are constructed with the use of 90 and 180 degrees bends in order to eliminate echoing out of the output port 26.

In the waveguide 16, the sound pressure waves generated by the speaker driver 56 are reflected by the inner surfaces of the panels 40–51, to create standing waves within the enclosure 12. The sound waves generated by the speaker 14 push the standing waves out of the output port 20.

The techniques described herein allow the speaker driver 56 to have the same air pressure on the front radiating diaphragm 80 of the speaker 14 as to the rear radiating diaphragm of the speaker 14 to produce good efficiency, deep bass, and a wide frequency range. No fibrous sound damping material is used in the preferred embodiment. However, a small amount might be used in other designs to prevent excessive wind noise at the output port 20, at high listening volumes. Thus, the present invention enables a small diameter speaker to produce deep bass and a very wide frequency ranging at least between 20 Hz and 20 KHz, in a smaller and more compact size enclosure 12 than previously possible.

In order to generate a smooth frequency response of the enclosure, a vertical center to center (CTC) measurement is taken between the center V of the speaker driver 56 (or the center C of the speaker diaphragm 80) and the center C' of the output port 20. The CTC is preferred in many embodiments. The CTC measurement is generally proportional to the length Lwg of the waveguide 16, as set forth in the following equation (4):

$$CTC = m/Lwg, \qquad (4)$$

where m is a constant factor. In a preferred embodiment, m is set forth to: (1/6.7424).

Figure 5:
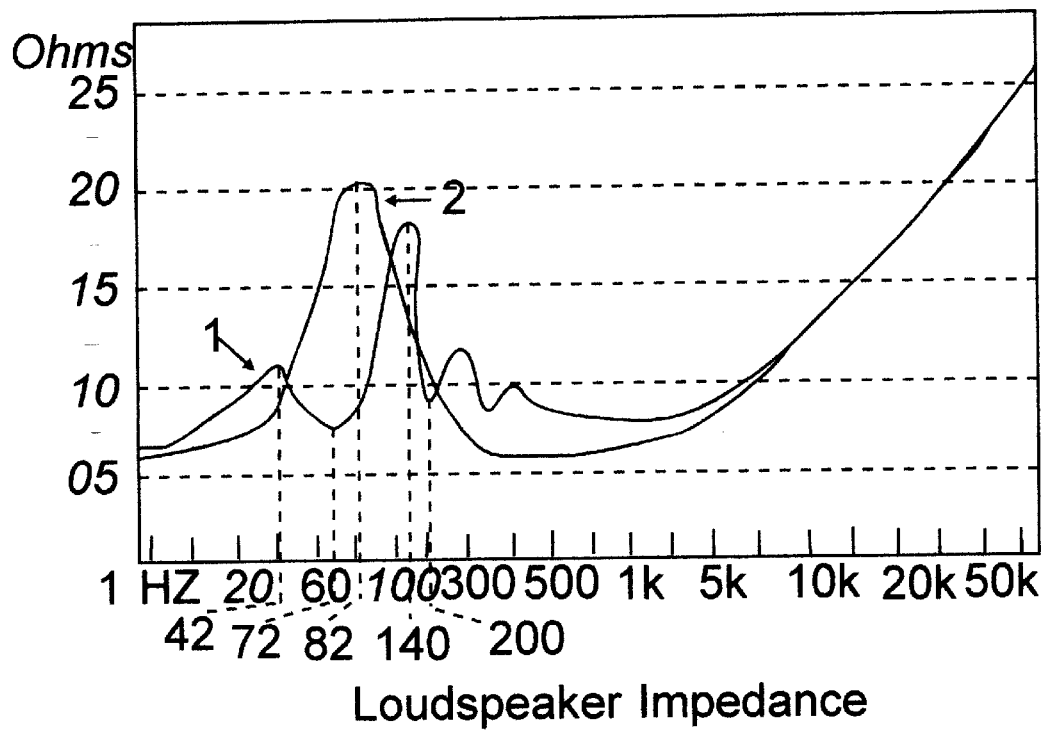
FIG. 5 illustrates two graphs plotting the electrical impedance versus the frequency response of the speaker system of FIGS. 1–3 (Graph 1), and the electrical impedance of a speaker by itself (Graph 2)

FIG. 5 illustrates two graphs plotting the electrical impedance versus the frequency response of the speaker system 10 (graph 1), and the electrical impedance of the speaker 14 by itself without the enclosure 12 and the waveguide 16. Graph 1 shows that speaker 14 has a series of resonance frequencies, such as the positive peaks at 42 Hz and 140 Hz. This indicates low pressure and large excursions on the speaker diaphragm of the speaker 14. Graph 2 indicates a single resonance frequency of the speaker 14 by itself at 82 Hz. The comparison of these two graphs 1 and 2 indicates that the air volume in the loudspeaker system 10 loads the diaphragm of the speaker 14 and changes its response by lowering its resonance frequency to 42 hertz compared with the speaker inherent resonance frequency of 82 Hz.

Graph 1 also shows a series of dips at 72 hertz and 200 hertz. This indicates high pressure on the of the speaker 14 and low diaphragm excursions. These dips are caused by the standing waves within the waveguide 16. The speaker driver 56 has a defined pressure on the surface of the diaphragm 80 as making it possible to produce deep bass and. As a result, the present invention makes it possible for a compact enclosure 12 to generate a large amount of deep bass and.

Figure 6:
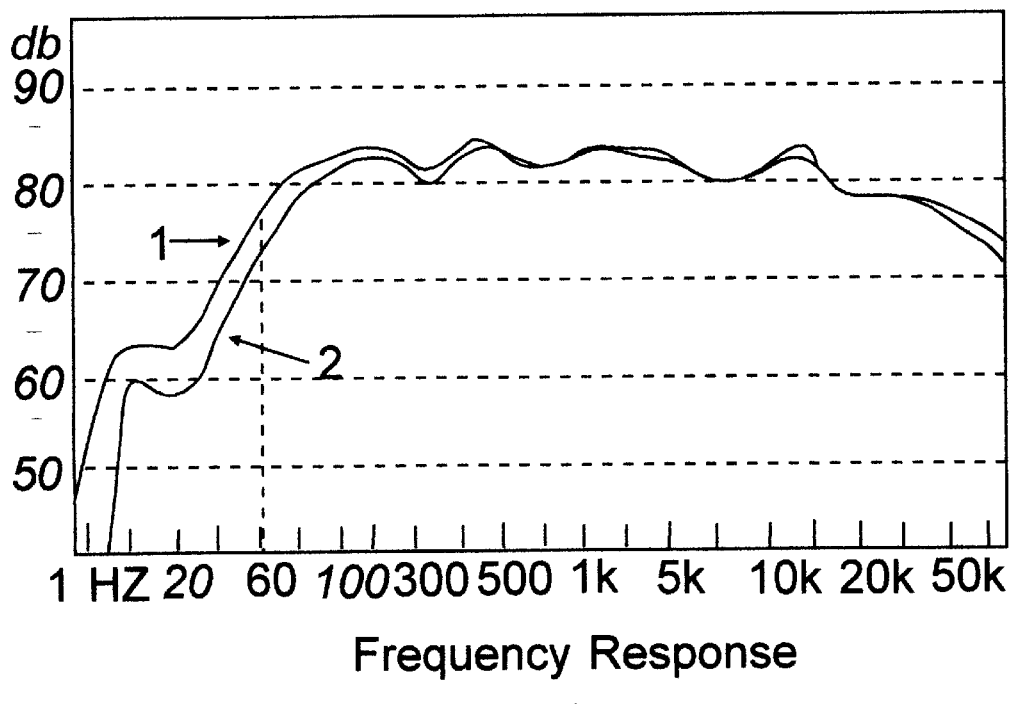
FIG. 6 illustrates the frequency response of the speaker system of FIGS. 1–3 (Graph 1), and that of the speaker by itself (Graph 2)

FIG. 6 shows the frequency response of the speaker system 10 (graph 1), and that of the speaker 14 by itself (graph 2). FIG. 5 indicates an amplification gain of about 3 to 6 dbs (graph 1) when compared to the speaker response by itself (graph 2), over the frequency range from 1 Hz to about 2000 depending on the speakers frequency range.

FIGS. 7–10 show the use of a passive radiator 81 instead of the output port 20. With the use of the passive radiator 81 there is a reduction of driver cone excursions, no turbulence of air moving out of the port 20. The waveguide 16 can be filled or lined with sound absorbing material 86 as in FIG. 23 for the absorption of sound waves.

FIGS. 11–14 show the use of multiple speakers 14. It is possible to have a combination of different types of speakers, i.e., woofers, full-range etc., to produce deep bass or a wide frequency range with deep bass. The WGA OR WGA and the area of the output port 20 is set forth in the following equation (5):

$$WGA \text{ OR } WGA \text{ and port} = S_D \text{ Total}/2. \quad (5)$$

where $S_D$ Total is the total area of the speakers piston area. This equation (5) is for two or more speakers that have the speakers surface area radiating in the air volume. The air volume is multiplied by the number of speakers that have the speakers surface area radiating in the air volume. The air volume is set forth in the following equation (6):

$$\text{Air Volume} = Av \times \text{speakers} \quad (6)$$

where Av is the total air volume of the speakers (more than one), speakers that radiate in the air volume of the compartment, i.e., compartment 55.

Figure 15:
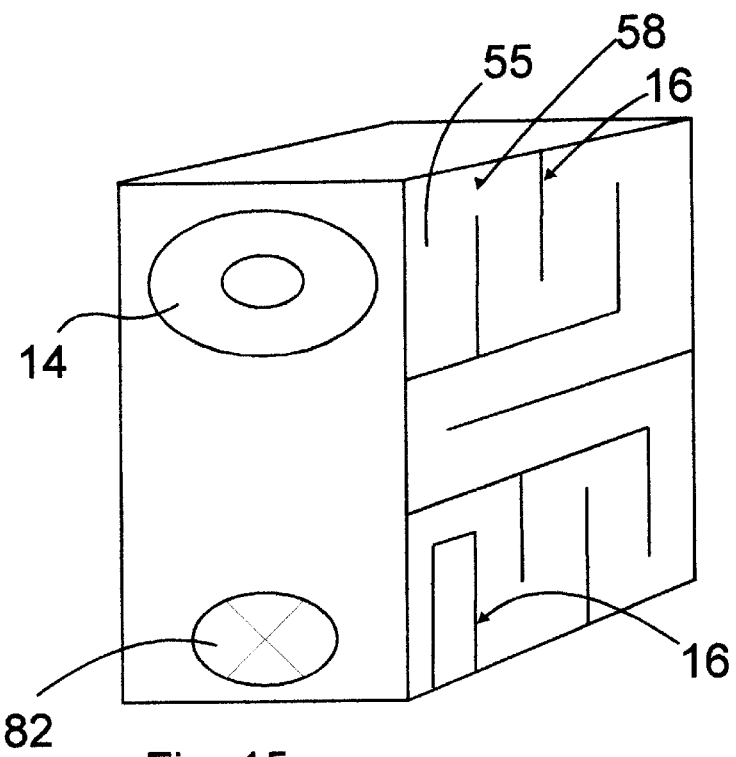
FIG. 15 is a perspective view of another embodiment of a loudspeaker system according to the present invention, illustrating the use of a variovent.

FIG. 15 shows the use of a variovent 82 instead of the output port 20 using the above preferred embodiment. A variovent 82 is an opening with some damping material used as to produce a flow resistance for the sound waves to exit through and into the listening area. The listening area is a room or area to be directed with sounds from a sound source. With the use of the variovent 82 there is a reduction of driver cone excursions and a well defined bass response. The variovent 82 may alternatively be located along the waveguide 16 while still using the output port 20.

Figure 16:
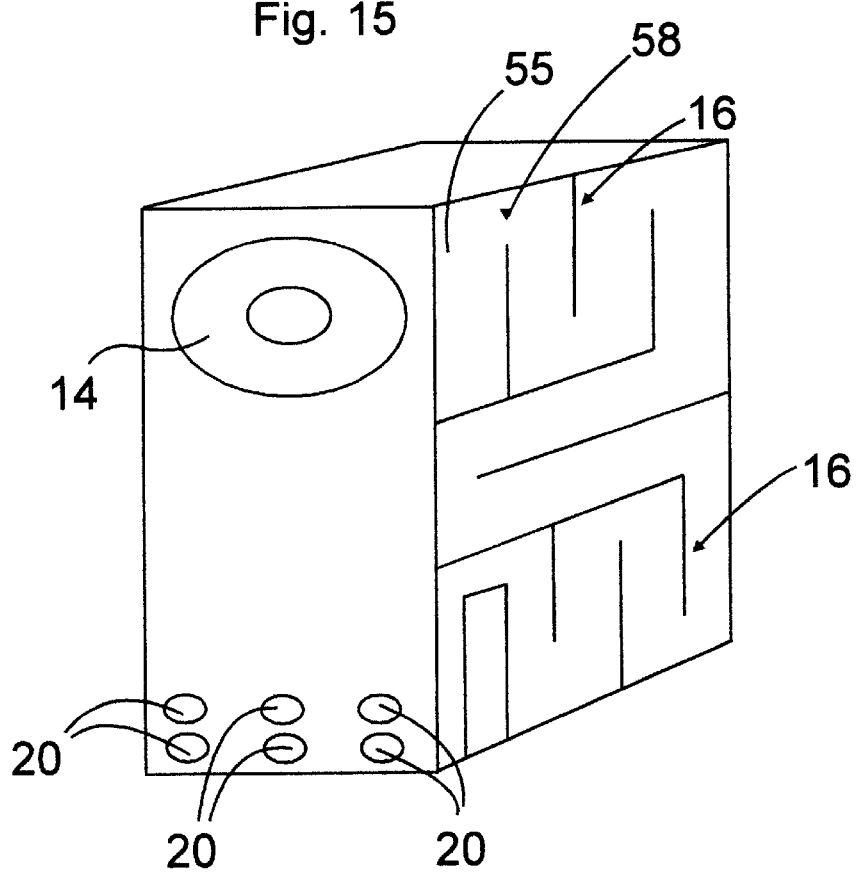
FIG. 16 is a perspective view of another embodiment of a loudspeaker system according to the present invention, illustrating the use of multiple ports.

FIG. 16 shows the use of two or more output ports 20 using the embodiments described herein. The use of more then one output port 20 will prevent, or minimize the turbulence of air exiting the output ports 20. The output ports 20 can have the same or different shapes and sizes, i.e., a combination of shapes or sizes, such as round, rectangular, etc.

FIGS. 17–20 show the use of a woofer or sub woofer speaker 14 using the embodiments described herein. With the use of a woofer or sub woofer speaker 14 the loudspeaker system will produce a deeper bass due to the lower resonant frequency of the speaker 14. There can be a cross over filter, notch filter, and a frequency cut off filter used in this or any embodiments described herein.

Figure 21:
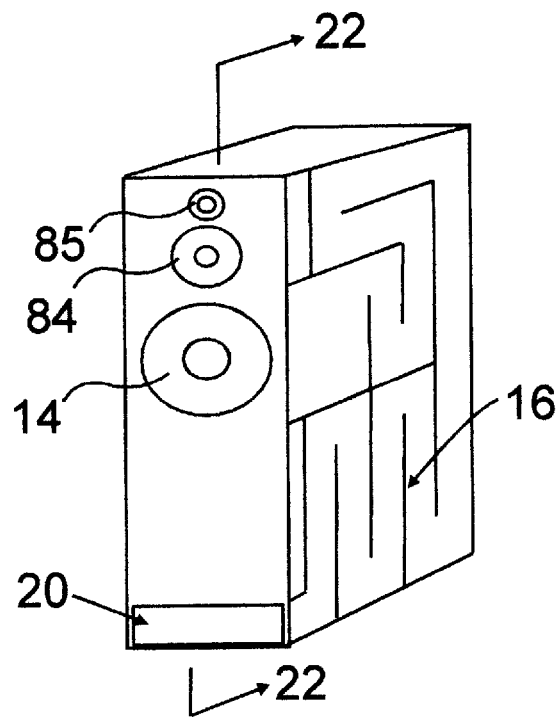
FIG. 21 is a perspective view of yet another loudspeaker system according to the present invention, illustrating the use of a woofer, tweeter, and midrange.
Figure 22:
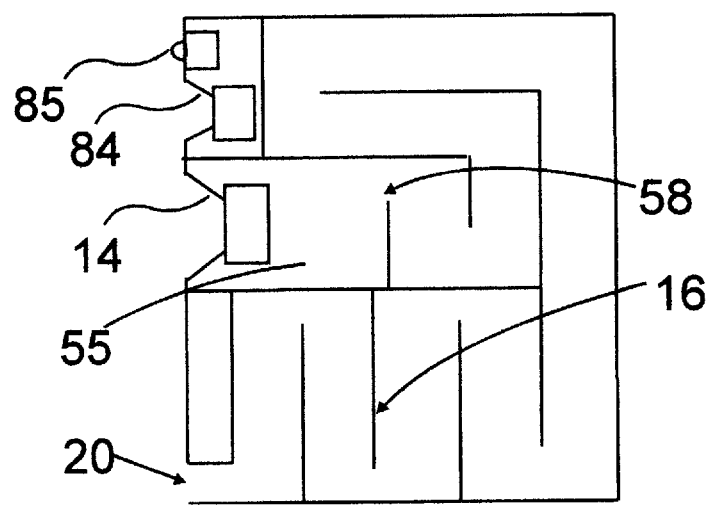
FIG. 22 is a cross-sectional view of the loudspeaker system of FIG. 21, taken along line 22—22 thereof.

FIGS. 21 and 22 show the use of a woofer speaker 14, mid-range 84, and tweeter 85 using the embodiments described herein. With the use of the three of more separate drivers for these speakers 14, 84, 85, each driver can produce a certain frequency range for a wide frequency. There can be a cross over filter, notch filter, and or a frequency cut off filter used in this or any embodiments described herein. The tweeter 85 produces the high frequency sounds (highs), the midrange 84 produces the mid range frequency sounds (mids), and the woofer speaker 14 produces the low frequency sounds (bass). The collective effect of separate drivers is that each driver can produce the frequency range best suited for the design of the speaker.

Figure 23:
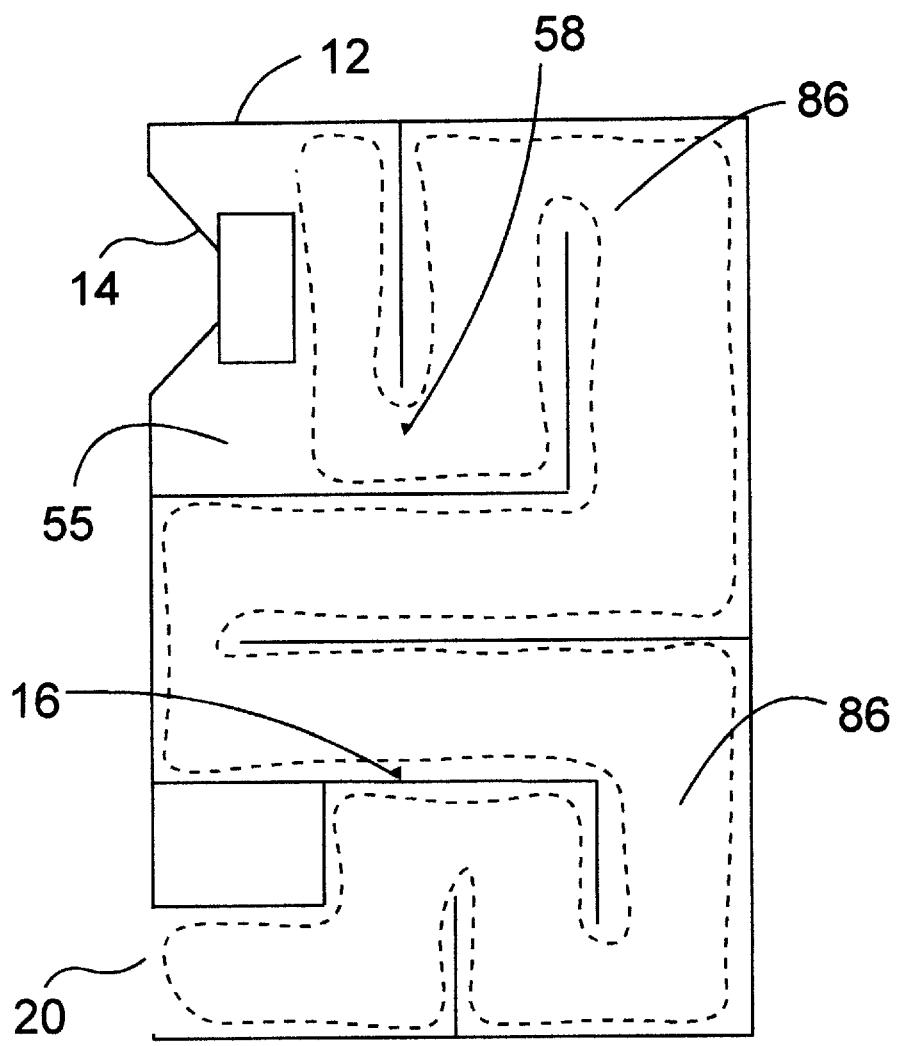
FIG. 23 is a perspective view of yet another loudspeaker system according to the present invention, illustrating the use of sound absorbing material.

FIG. 23 shows the use of sound absorbing material 86 (shown in dashed lines) filled or lined in the enclosure 12 using the embodiments described herein. The sound absorbing material 86 can be located in one particular area, or some, or all of the enclosure 12. The sound absorbing material will prevent the upper bass frequency sounds from exiting from the output port 20.

FIG. 24 shows the use of two or more speakers 14 using two or more separate waveguides 16 using the embodiments described herein. This embodiment produces a higher and clear sound pressure level to fill a large room with sound i.e., a public address system etc.

FIG. 25 shows the use of using the loudspeaker system for use in a portable stereo 107 using one of the preferred embodiments. With the use of the present invention a small, light weight and energy saving portable stereo 107 can produce deep bass or a wide frequency range of sounds with deep bass and sound over a wide frequency range. With the use of only two full-range speakers 14 connected to the waveguides 16 a high quality sound system can be produced. This embodiment can be used in other commercial applications for instance, radio, clock radio, radio and or television that fits under a kitchen cabinet, etc..

FIG. 26 shows the use of using the loudspeaker system for use in a television or monitor 108 using one of the embodiments described herein. With the use of the present loudspeaker system, a television or monitor 108 can have a high fidelity sound system for producing deep bass or a wide frequency range of sounds with deep bass and a wide frequency of sounds in a compact space saving size.

FIG. 27 shows the use of using the loudspeaker system for use in a portable computer 109 using one of the embodiments disclosed herein. With the use of the present invention a portable computer 109 can have a high fidelity sound system for producing deep bass or a wide frequency range of sounds with deep bass and a wide frequency of sounds in a small size.

Figure 28:
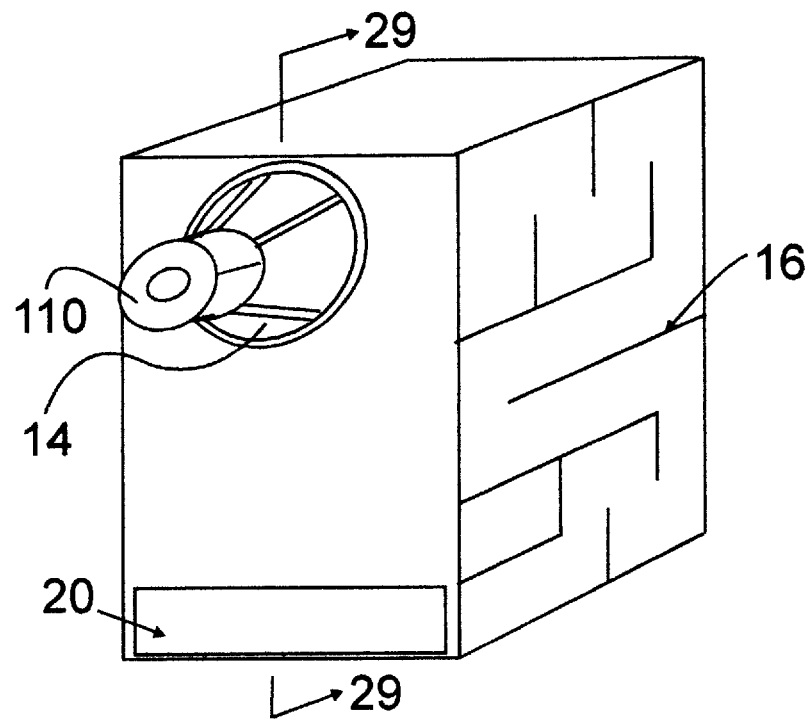
FIG. 28 is a perspective view of yet another loudspeaker system according to the present invention, illustrating the use of a speaker mounted with its magnet end outside the enclosure.
Figure 29:
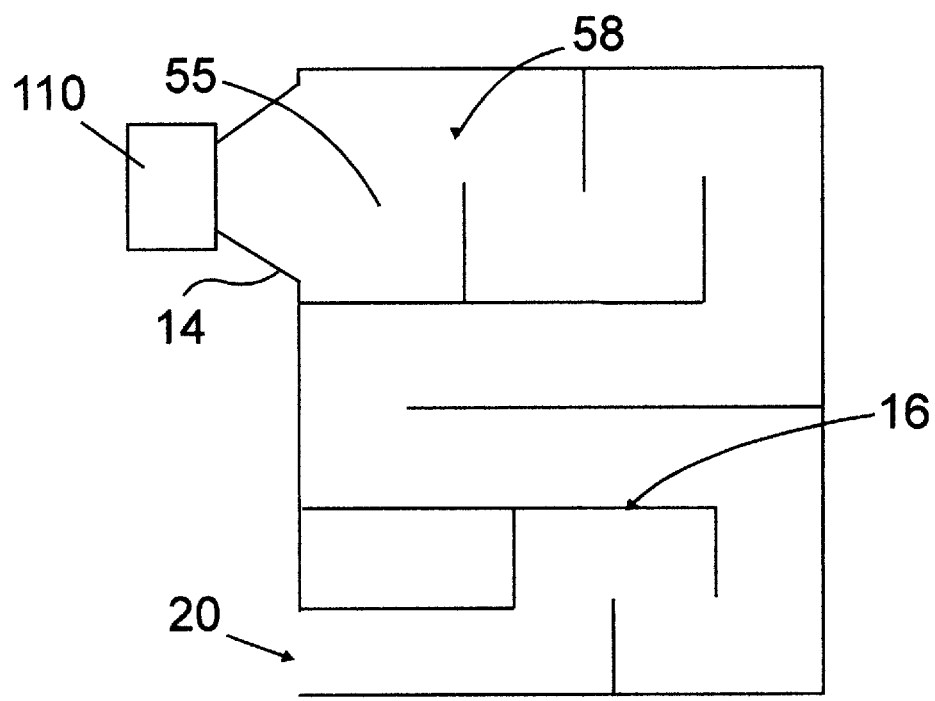
FIG. 29 is a cross-sectional view of the loudspeaker system of FIG. 28, taken along line 29—29 thereof.

FIGS. 28 and 29 illustrate another alternative embodiment, wherein the magnet end 110 of the speaker 14 faces outward. In this design, the higher frequencies would not be heard, i.e., they would be cutoff, due to the higher frequencies radiating in the waveguide and not able to exit from the output port 20 due to the length of the waveguide 16. Most of the high frequencies radiate from the front of the speaker 14 cone and not from the rear of the speaker 32.

Figure 30:
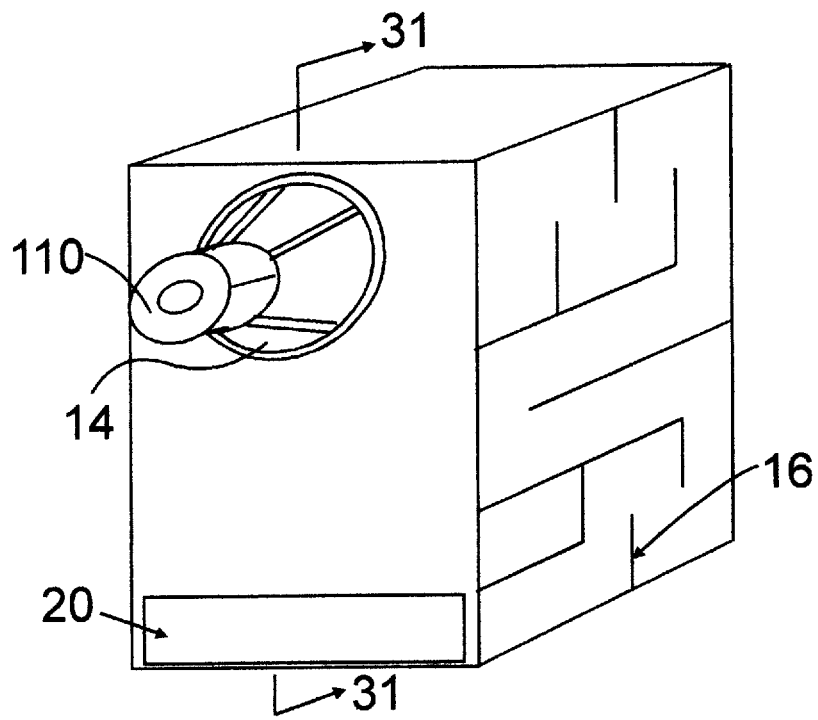
FIG. 30 is a perspective view of yet another loudspeaker system according to the present invention, illustrating the use of two speakers mounted facing each other.
Figure 31:
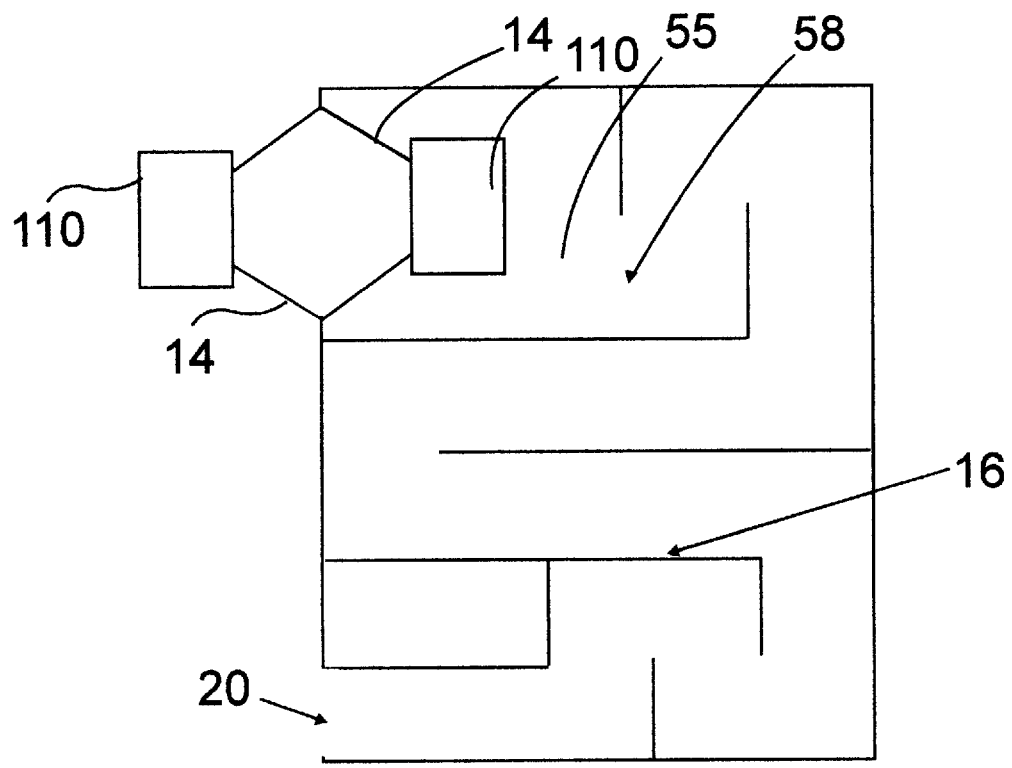
FIG. 31 is a cross-sectional view of the loudspeaker system of FIG. 30, taken along line 31—31 thereof.

FIGS. 30 and 31 show the use of two speakers 14, with one speaker 14 having its magnet end 110 facing out and the other speaker 14 mounted in the regular position using the preferred embodiment of FIG. 1. More than two speakers may alternatively be used, with the speakers 14 being grouped in pairs. Using this method one half of the speakers 14 are wired with opposite polarity. This causes half of the speakers 14 to move forward while the other half is moving backward in a push-pull configuration. Using this method will reduce the speaker distortion and driver cone excursions. The measurement of the Wgl is the same as the preferred embodiment.

Figure 32:
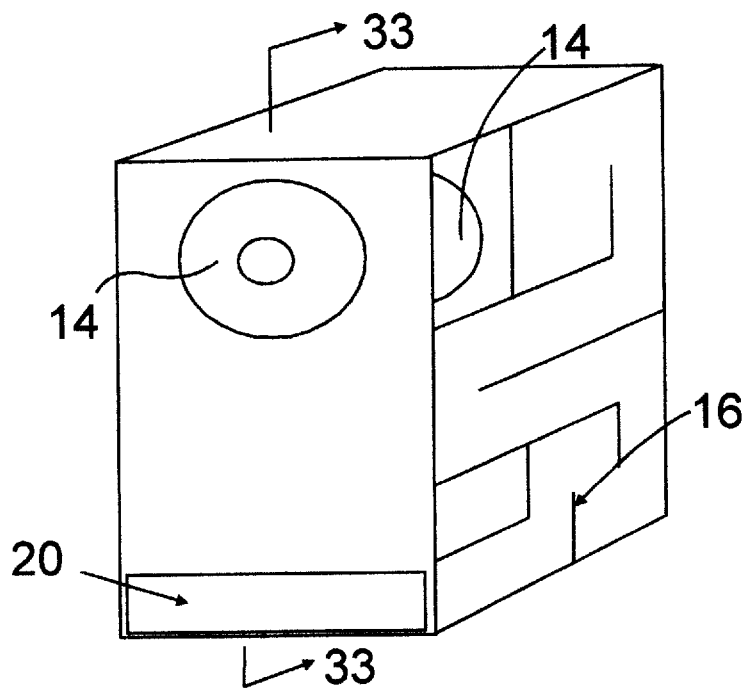
FIG. 32 is a perspective view of yet another loudspeaker system according to the present invention, illustrating the use of two speaker mounted back to back.
Figure 33:
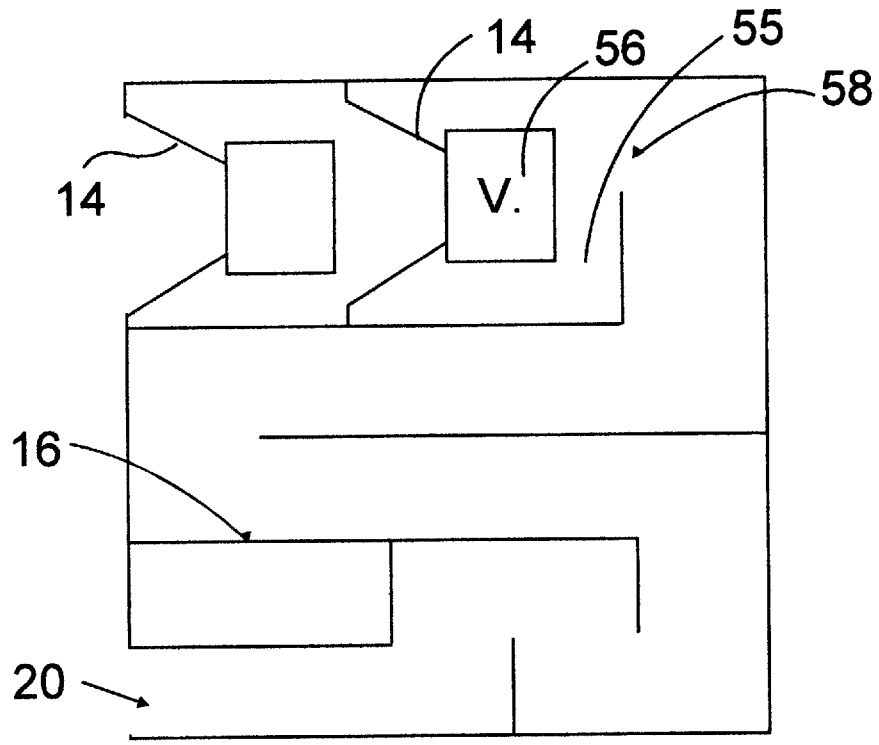
FIG. 33 is a cross-sectional view of the loudspeaker system of FIG. 32, taken along line 33—33 thereof.

FIGS. 32 and 33 show the use of two or more speakers with one speaker 14 being mounted in the regular position (FIG. 1) and a second speaker 14 mounted in the same direction, but directly (or at a predetermined position) behind the first speaker 14. The two speakers 14 are wired in the same polarity. Another configuration is to keep the first speaker the same (mounted on the front panel) as above, and to reverse the second speaker 14 so that its magnet end 110 is faces the first speaker. In this latter configuration, The speakers 14 are wired with opposite polarities. The measurement of the Wgl is to start from the center of the voice coil 56 of the speaker 14 that is closest to the 58.

Figure 34:
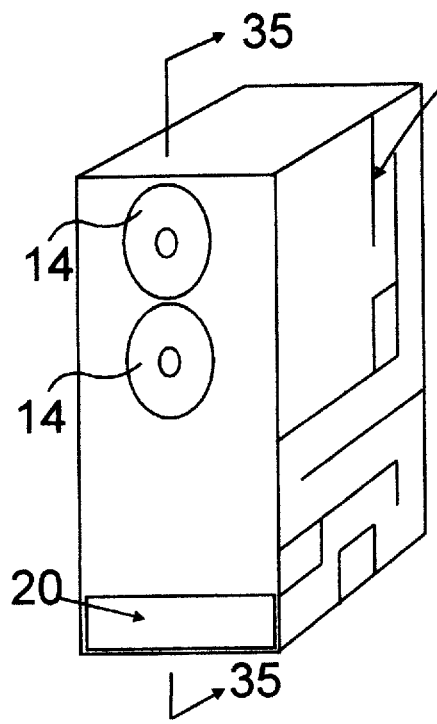
FIG. 34 is a perspective view of yet another loudspeaker system according to the present invention, illustrating the use of two speakers using one waveguide.
Figure 35:
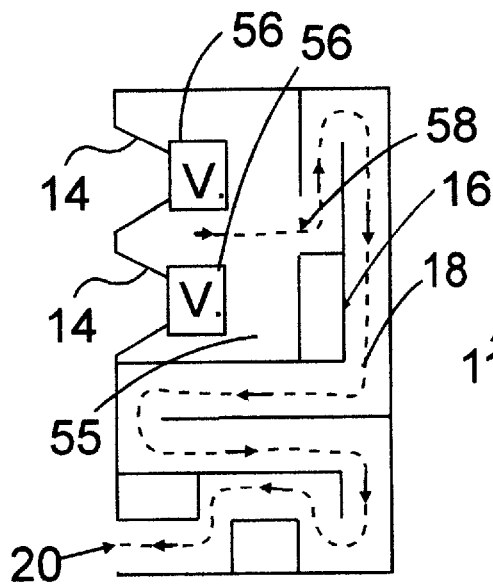
FIG. 35 is a cross-sectional view of the loudspeaker system of FIG. 34, taken along line 35—35 thereof.

FIGS. 34 and 35 show the use of two or more speakers 14 using the same waveguide 16 of the preferred embodiment. There is a higher sound pressure level due to the use of more speakers 14. With the use of one of more speakers 14 in some configurations it is best to place the opening 58 of the wave guide in the middle of the speaker 14 or speakers 14 as to provide equal pressure on all of the speakers 14 cones area. The measurement of the Wgl is noted the acoustic serpentine path 18 to start at the middle of the two speakers 14 and middle of voice coils 56.The Wga or WGA and output port 20 is defined by equation (5) multiplied by the number of speakers 14.

Figure 36:
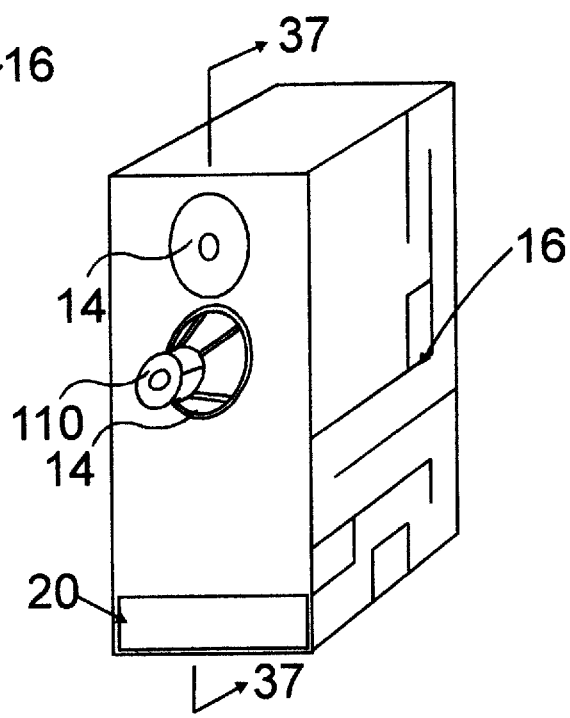
FIG. 36 is a perspective view of yet another loudspeaker system according to the present invention, illustrating the use of two speakers, one speaker being reversed and using one waveguide.
Figure 37:
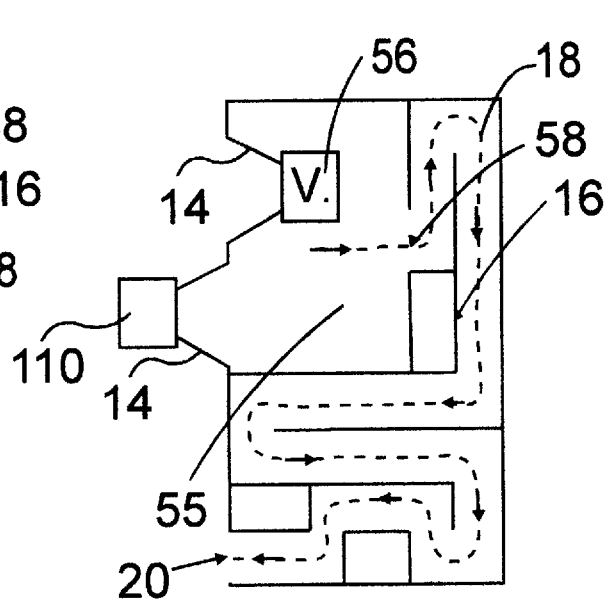
FIG. 37 is a cross-sectional view of the loudspeaker system of FIG. 36, taken along line 37—37 thereof.

FIGS. 36 and 37 show the use of two or more speakers 14 using the same waveguide 16 of the preferred embodiment, with some, i.e.., one half, of the speakers 14 mounted with their magnet ends 110 facing outward. There is a higher sound pressure level due to the use of more speakers 14. The measurement of the Wgl is noted the acoustic serpentine path 18B to start at the middle of voice coils 56 closest to the opening 58 of the wave guide. The Wga or WGA and output port 20 is defined by equation (1) multiplied by the number of speakers 14.

Figure 38:
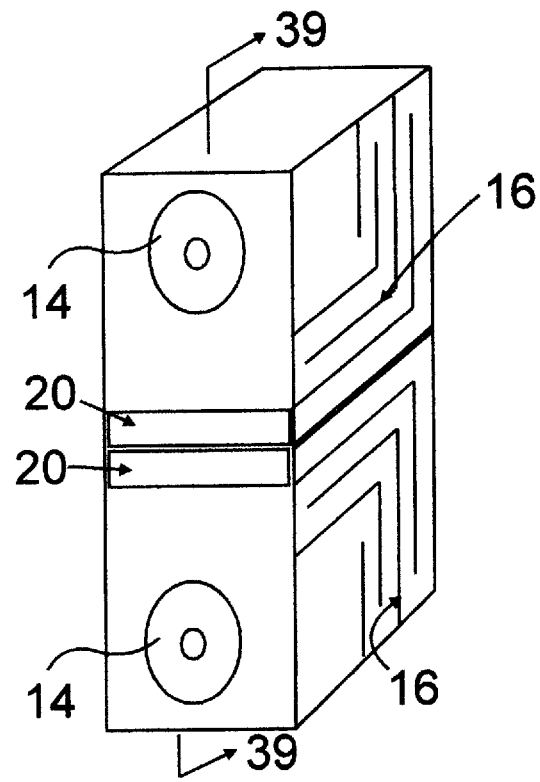
FIG. 38 is a perspective view of yet another loudspeaker system according to the present invention, illustrating the use of two speakers using two waveguides.
Figure 39:
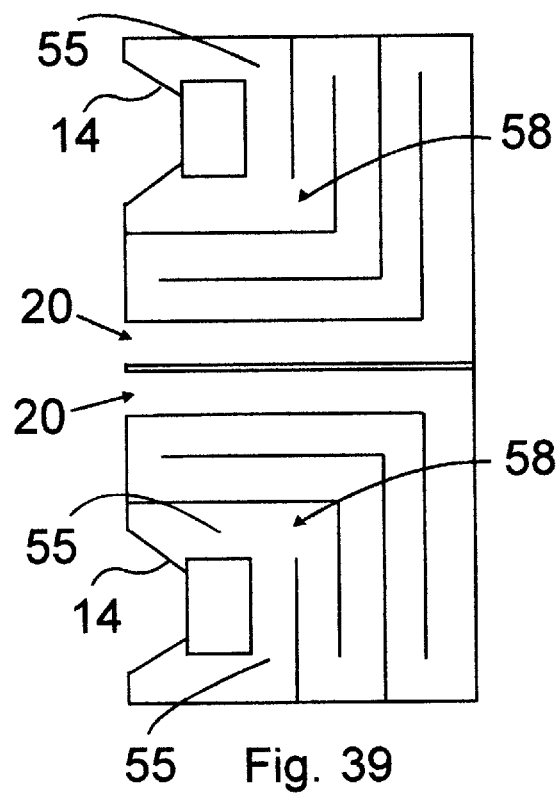
FIG. 39 is a cross-sectional view of the loudspeaker system of FIG. 38, taken along line 39—39 thereof.

FIGS. 38 and 39 show the use of two or more speakers 14 using separate waveguides 16 using the embodiments described herein. This embodiment produces a higher and clear sound pressure level to fill a large room with sound i.e., a public address system.

Figure 40:
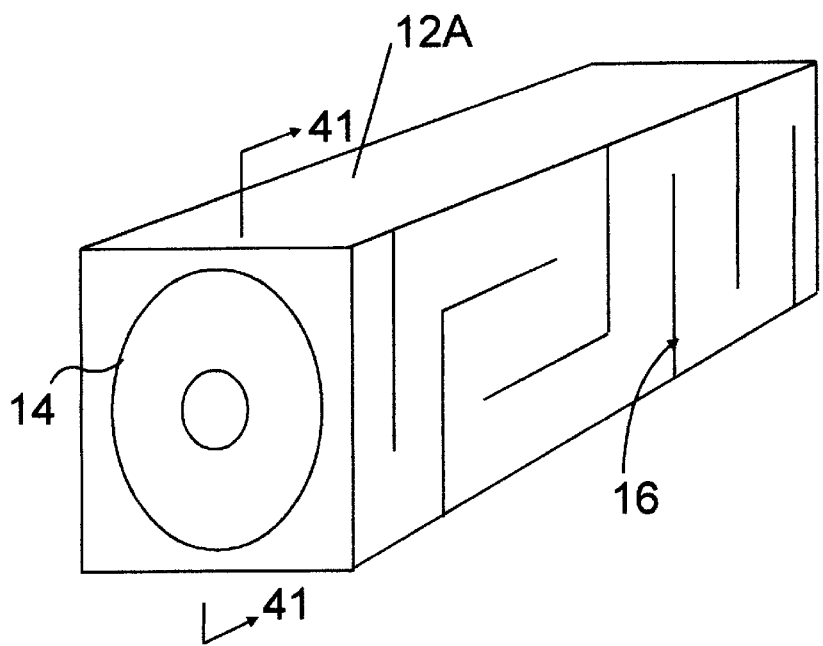
FIG. 40 is a perspective view of yet another loudspeaker system according to the present invention, illustrating the use of a speaker and exit port on opposite ends of the enclosure.
Figure 41:
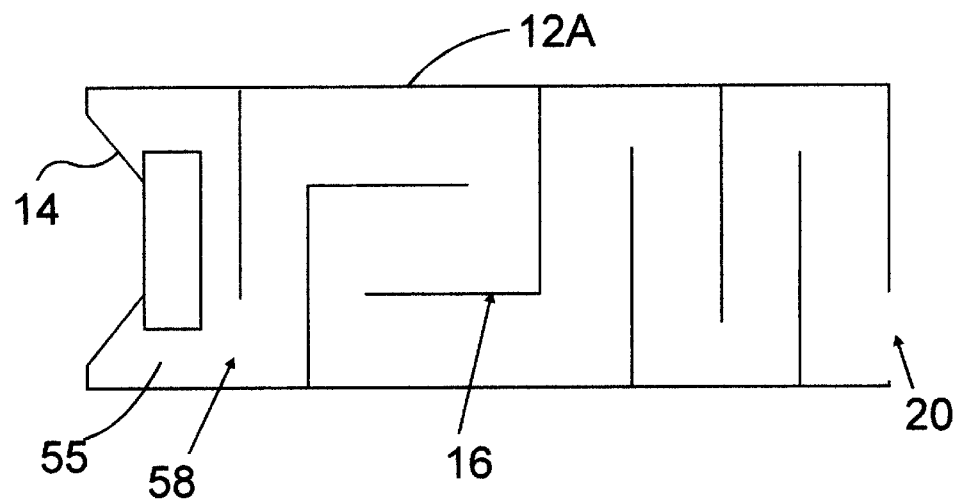
FIG. 41 is a cross-sectional view of the loudspeaker system of FIG. 40, taken along line 41—41 thereof.

FIGS. 40 and 41 show the use of one or more speakers 14 using waveguides 16 with the output port 20 located opposite to the speakers 14 end of an enclosure 12A. In this embodiment, the enclosure 12A has a generally similar function to the enclosure 12 of FIG. 1, but has a different shape. The enclosure 12A has a generally elongated shape. The bass waves that exit out of the output port 20 are reflecting of the walls, floor, and ceiling in the listening area to give a surround sound effect. The surround sound effect is the sound waves that are produced by the front of the speaker 14 and are directed toward the listener. The sound waves that come out of the output port 20 are reflected off the walls, ceilings, and floors to produce a sound like a life performance because of the time delay of the sound waves reflecting of objects.

Figure 42:
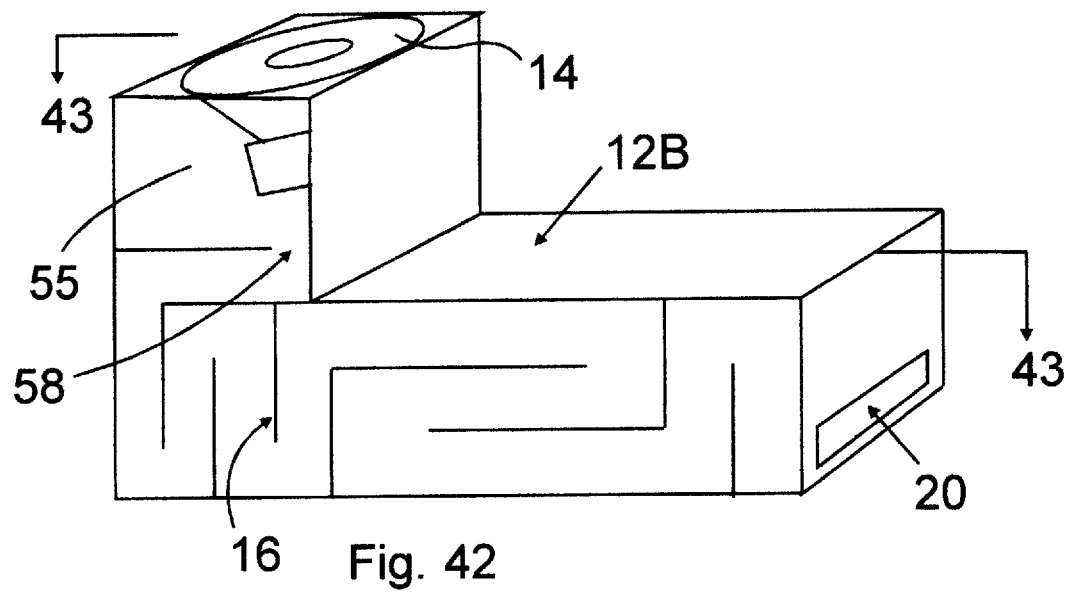
FIG. 42 is a perspective view of yet another loudspeaker system according to the present invention having an alternatively shaped enclosure.
Figure 43:
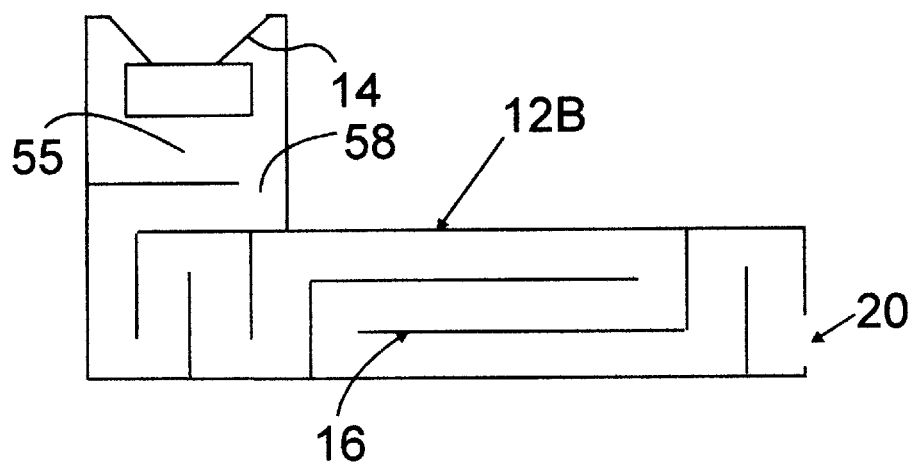
FIG. 43 is cross-sectional view of the loudspeaker system of FIG. 42, taken along line 43—43 thereof.

FIGS. 42 and 43 show the use of one or more speakers 14 using a waveguides 16 in a shape and size to fit a custom designed space using the embodiments described herein. In this embodiment, the speaker system includes a generally L-shaped enclosure 12B with similar function to that of the enclosure 12. The shape of enclosure 12B can be constructed to fit any space and provides the listening area with sound.

Figure 44:
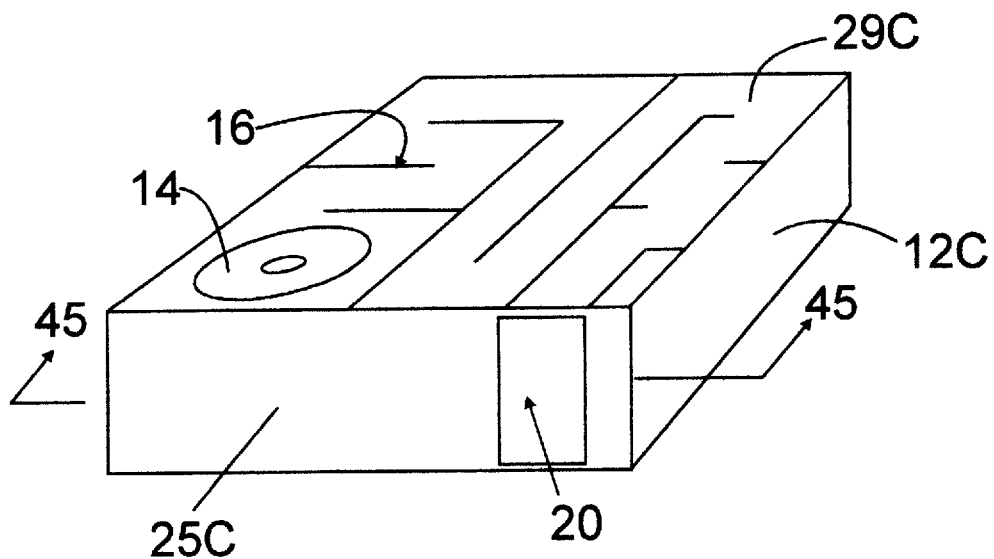
FIG. 44 is a perspective view of yet another loudspeaker system according to the present invention having an alternatively shaped enclosure.
Figure 45:
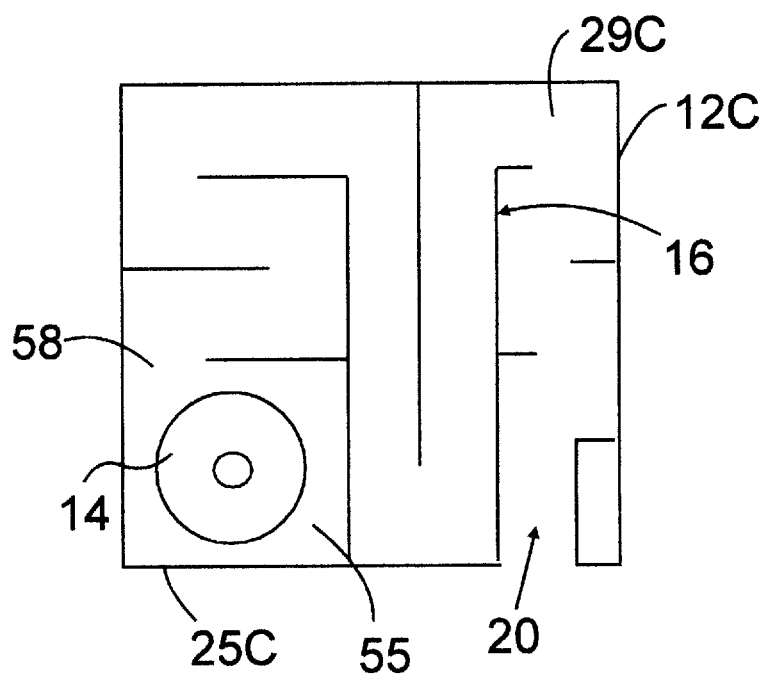
FIG. 45 is a cross-sectional view of the loudspeaker system of FIG. 44, taken along line 45—45 thereof.

FIGS. 44 and 45 show the use of one or more speakers 14 using a custom designed enclosure 12C and a waveguide 16 shaped and dimensioned to fit a designed space, using the embodiments described herein. The enclosure 12C can be constructed to fit any space and provide the area with sound. This embodiment can fit, for instance, under the seat of a car or truck, to provide deep bass or a wide frequency range of sounds with deep bass and sounds over a wide frequency range. In this embodiment, the enclosure 12C is generally flat, and the speaker 14 is secured to a side panel 29C rather than to the front panel 25C.

Figure 46:
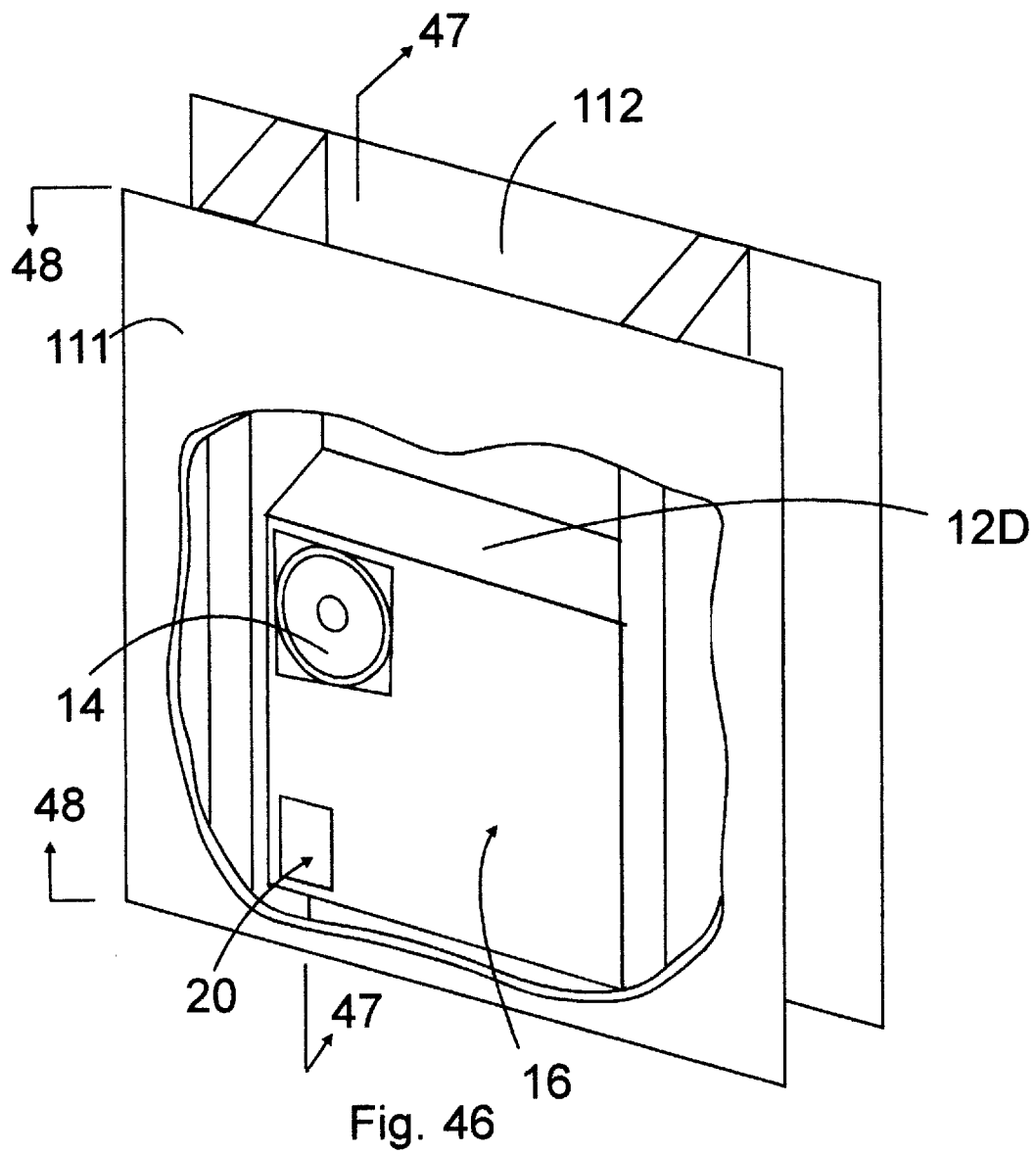
FIG. 46 is a perspective, cutaway view of yet another loudspeaker system according to the present invention, illustrating the use of the loudspeaker system installed in a wall, ceiling, or floor.
Figure 47:
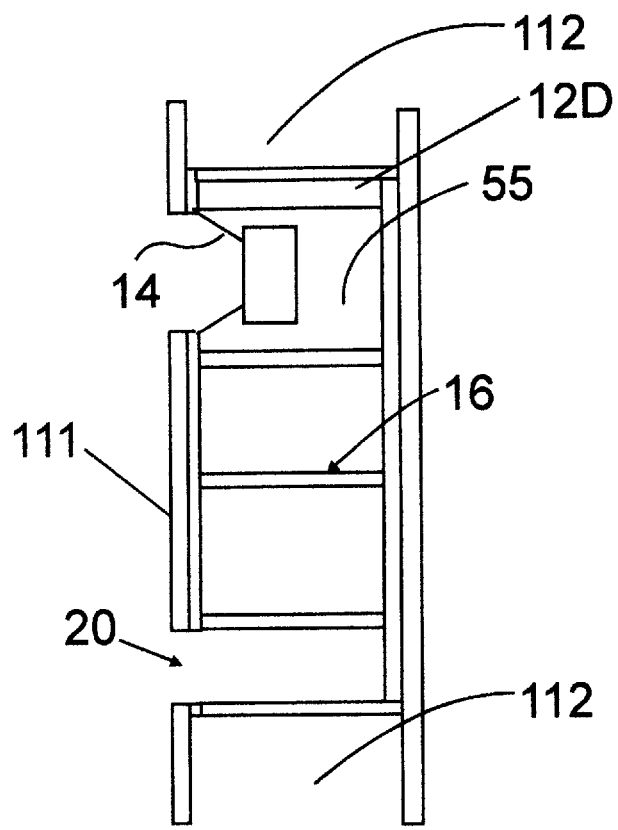
FIG. 47 is a cross-sectional view of the loudspeaker system of FIG. 46, taken along line 47—47 thereof.
Figure 48:
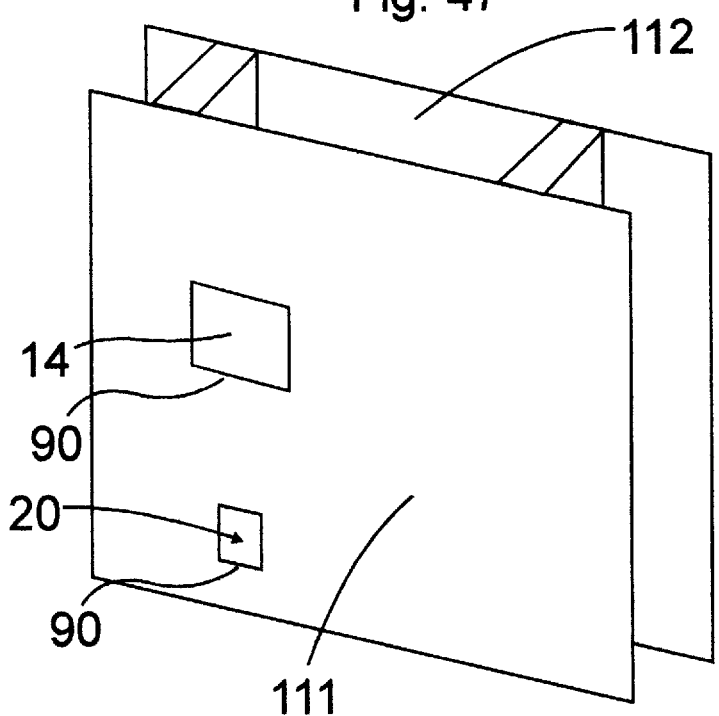
FIG. 48 is a cross-sectional view of the loudspeaker system of FIG. 46, taken along line 48—48 thereof.

FIGS. 46, 47, and 48 show the use of one or more speakers 14 installed in a space 112 between the front panel 111 and the area behind the front panel 111 such as a wall, ceiling, or floor radiation sounds into the listening area, using the embodiments described herein. With this embodiment a loudspeaker enclosure 12D is enclosed within the wall, and does not take up living space. The embodiment can provide deep bass with the use of a woofer speaker 14 or it can provide deep bass or a wide frequency range of sounds with deep bass and sounds over a wide frequency range with the use of a full-range speaker 14 i.e., etc. In the finished installation of FIG. 48 the sound waves radiate from the front surface of the speaker cone that can be covered by a grill 90 that is acoustically transparent and the deep bass frequencies coming out of the port 20 that can be covered by a grill 91 that is acoustically transparent.

Figure 49:
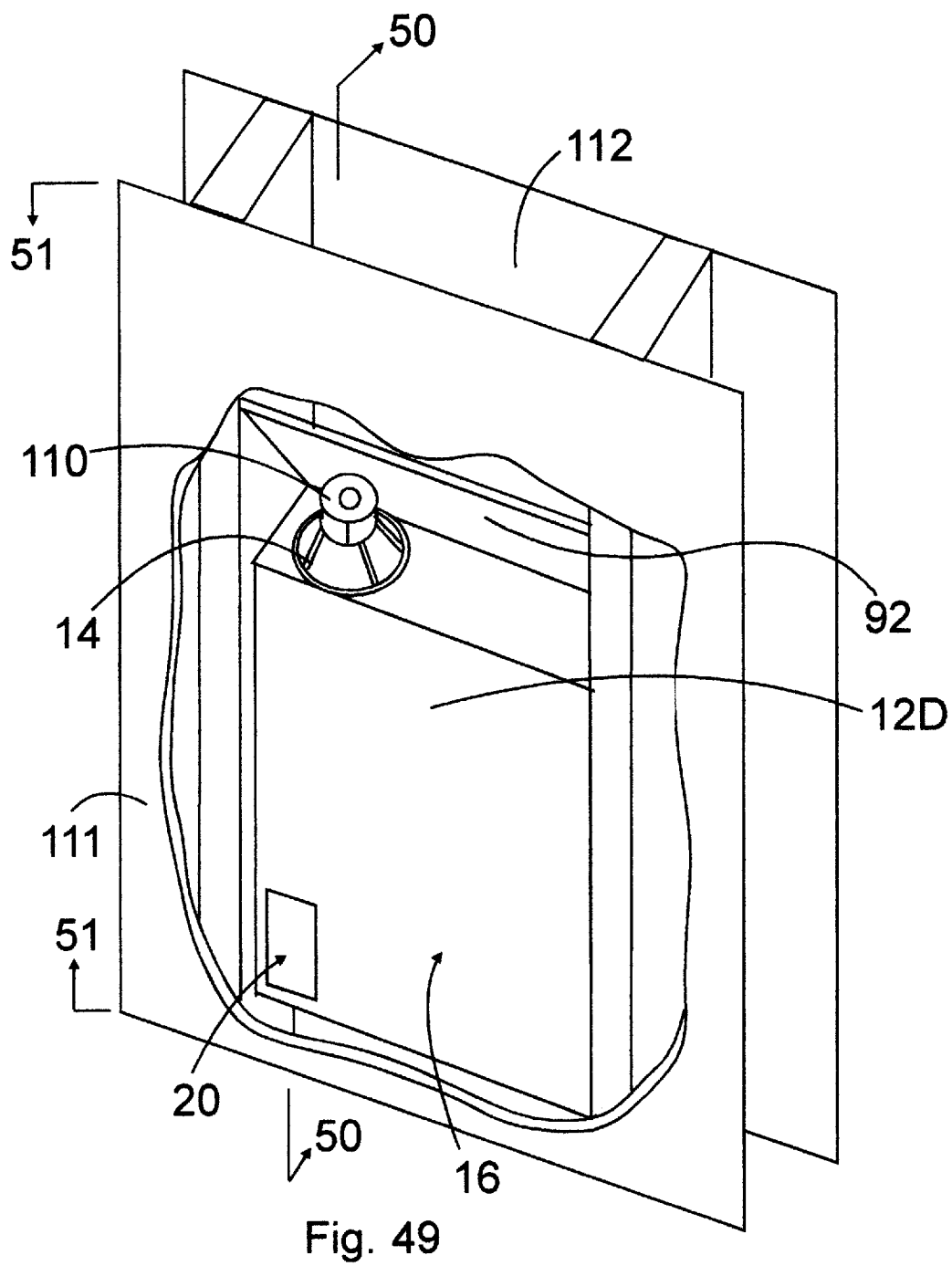
FIG. 49 is a perspective view of yet another loudspeaker system according to the present invention, illustrating the use of the loudspeaker system in a wall, ceiling, or floor.
Figure 50:
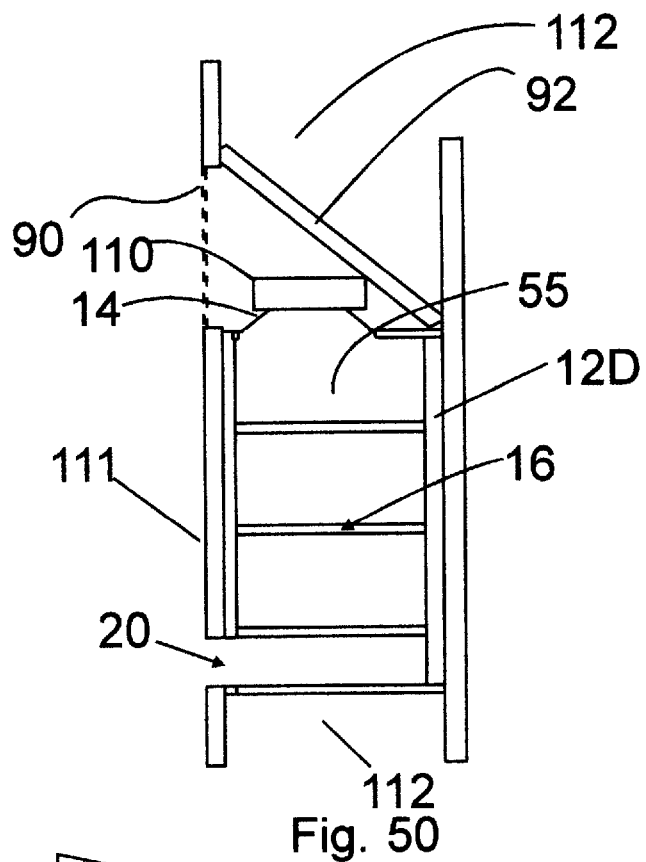
FIG. 50 is a cross-sectional view of the loudspeaker system of FIG. 49, taken along line 50—50 thereof.
Figure 51:
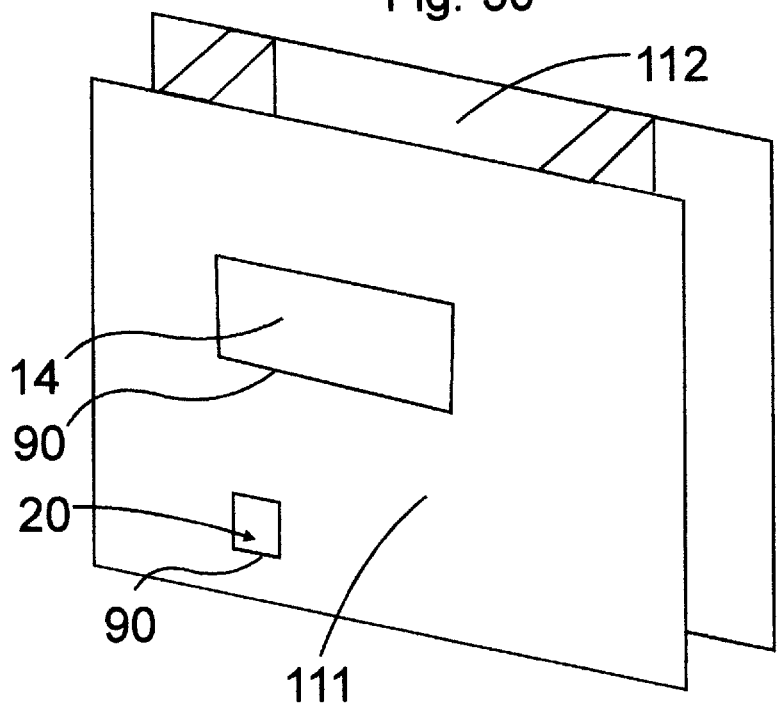
FIG. 51 is a cross-sectional view of the loudspeaker system of FIG. 49, taken along line 51—51 thereof.

FIGS. 49, 50, and 51 show the use of one or more speakers 14 installed in a space 112 between the front panel 111 and the area behind the front panel 111 such as a wall, ceiling, or floor radiation sounds into the listening area using the embodiments described herein. With this embodiment the enclosure 12D is similar to that described above in relation to FIG. 48. The embodiment can provide deep bass with the use of a woofer speaker 14 or it can provide deep bass and sounds over a wide frequency range with the use of a full-range speaker 14 i.e., etc. In FIG. 49 the speaker 56 is mounted with the magnet end 110 facing out and can also be mounted in the regular position. With the use of a deflection board 92 to deflect the sounds from the speaker 14 into the listening area. The deflection board 92 can be angled, rounded, or squared or can have any shape. The deflection board 92 can be lined or filled with sound absorbing material 86 to reduce sound waves or higher frequencies. In FIG. 51 the sound waves radiating from the surface of the speaker 14 can be covered by a grill 90 that is acoustically transparent and the deep bass frequencies coming out of the port 20 can be covered by a grill 91 that is acoustically transparent.

Figure 52:
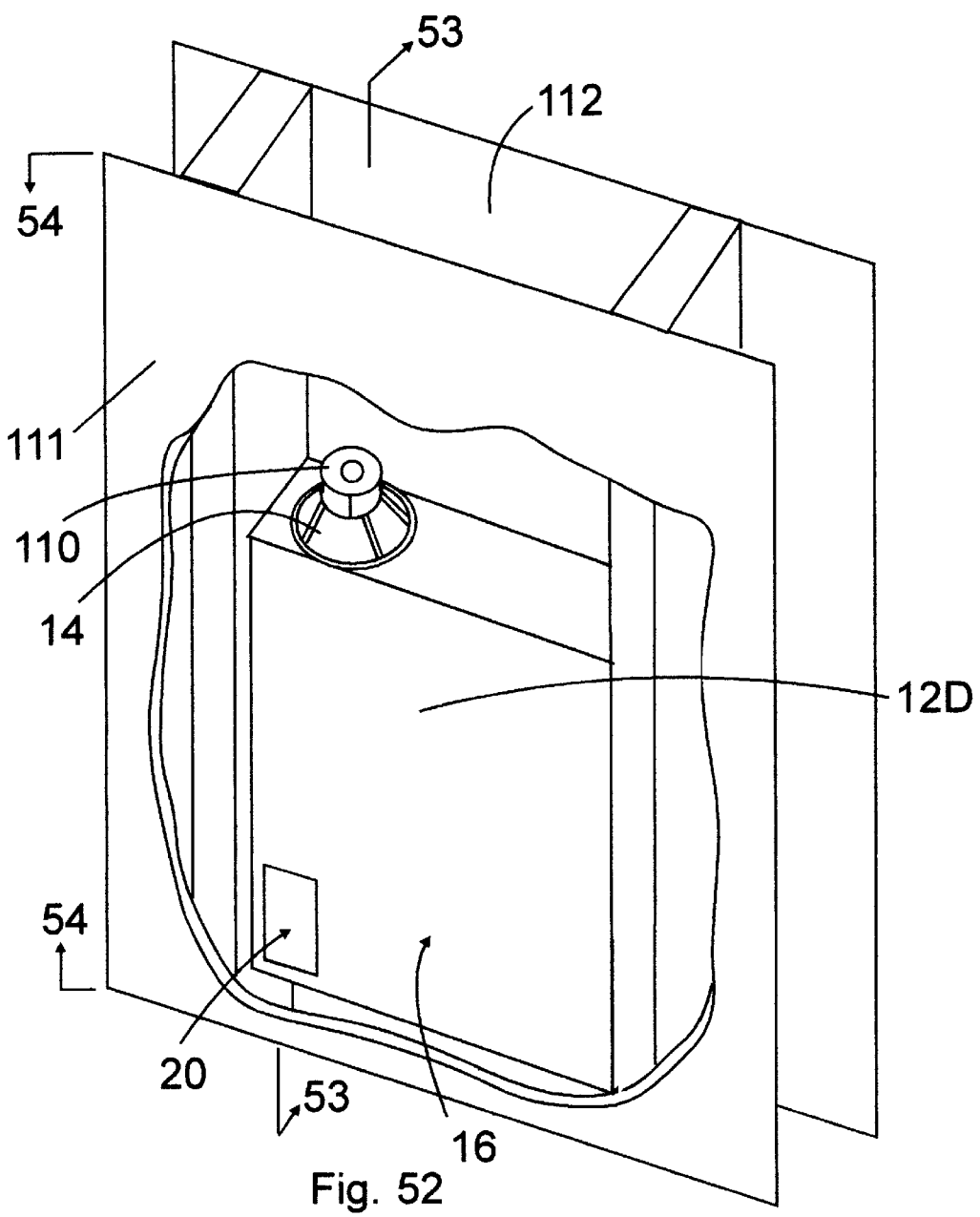
FIG. 52 is a perspective view of yet another loudspeaker system according to the present invention, illustrating the use of the loudspeaker system in the wall, ceiling, or floor.
Figures 53, 54:
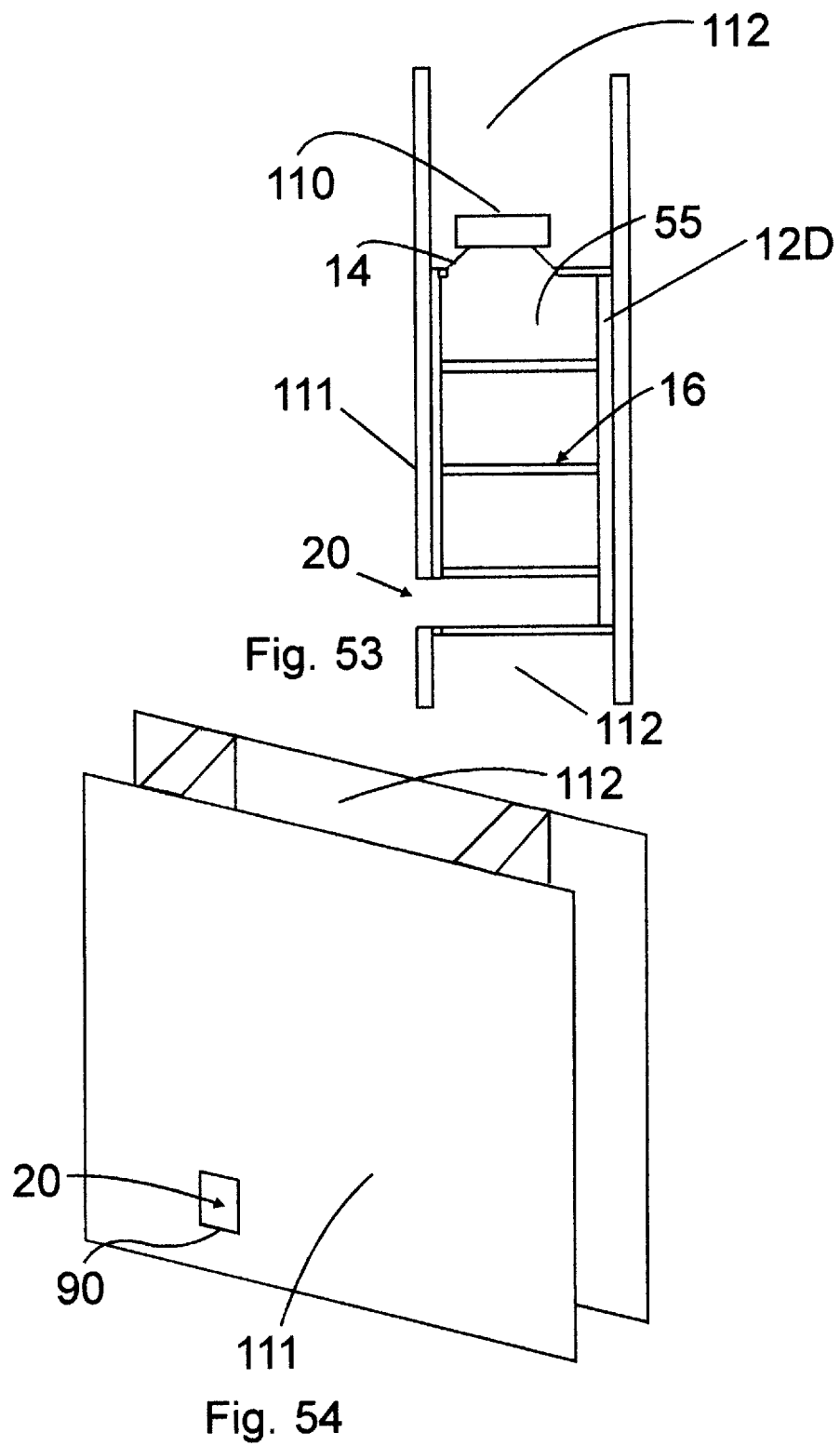
FIG. 53 is a cross-sectional view of the loudspeaker system of FIG. 52, taken along line 53—53 thereof.
FIG. 54 is a cross-sectional view of the loudspeaker system of FIG. 52, taken along line 54—54 thereof.

FIGS. 52, 53, and 54 show the use of one or more speakers 14 installed in a space 112 between the front panel 111 and the area behind the front panel 111 such as a wall, ceiling, or floor radiation sounds into the listening area using the embodiments described herein. With this embodiment the loudspeaker enclosure 12D fitted within the wall space. The embodiment can provide deep bass with the use of a woofer speaker 14, or it can provide deep bass. FIG. 52 the speaker 56 is mounted with the magnet end facing out and can also be mounted in the regular position. The sounds from the magnet end 110 of the speaker 14 are reflected in the empty space 112 that can be lined or filled with sound absorbing material 86 to reduce sound waves or higher frequencies. With the completed installation in FIG. 54 the sound waves exit out of the port 20 that can be covered by a grill 91 that is acoustically transparent. Another embodiment is to have an other port 20 mounted to the front panel 111 that is exiting sounds given off from the speakers 14 in the empty space 112 to provide for more sounds, i.e., sounds originating from both sides of the loudspeaker 14 (magnet end 110 and the front end).

Figure 55:
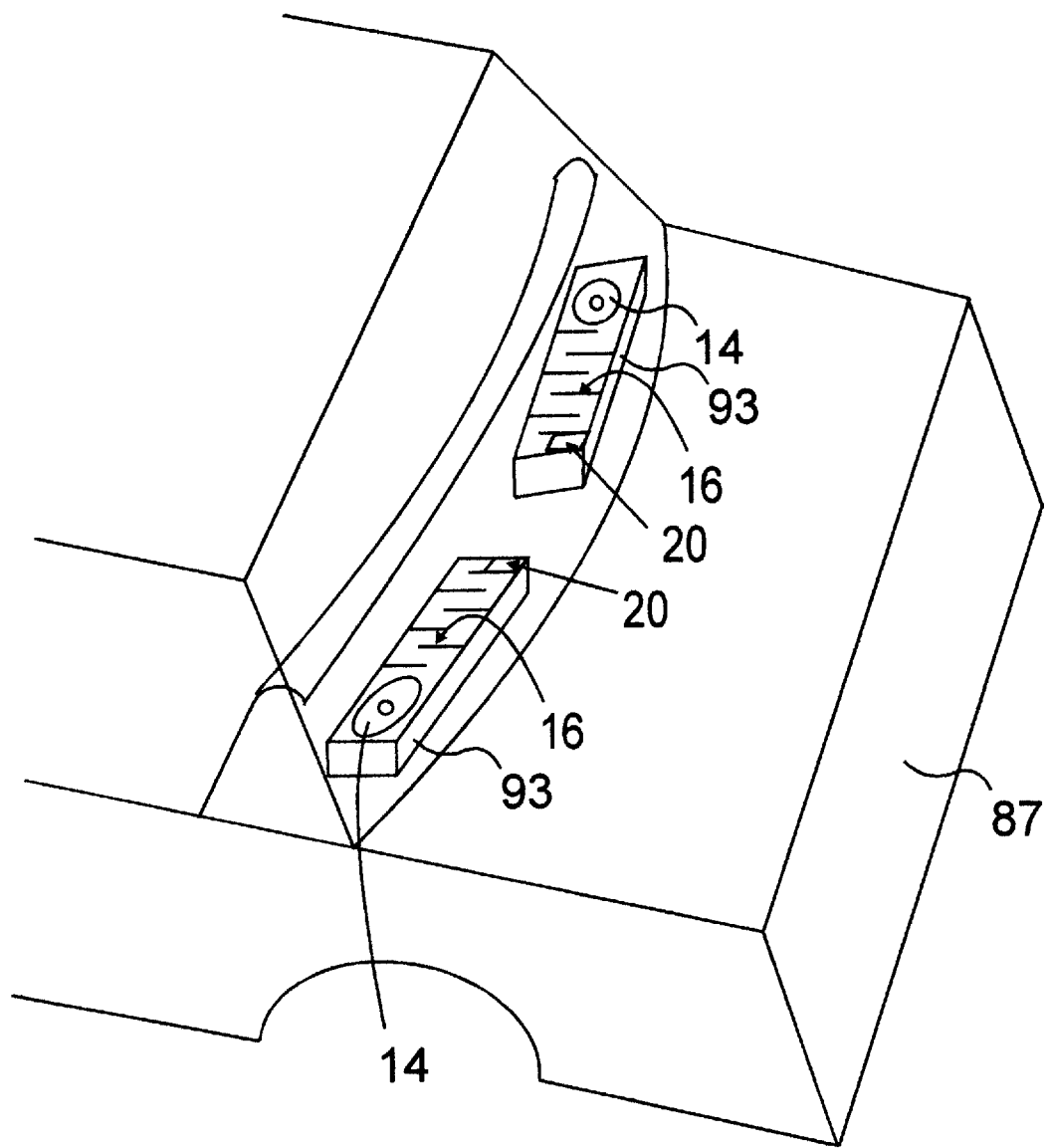
FIG. 55 is a perspective view of yet another loudspeaker system according to the present invention, illustrating the installation of the loudspeaker system in the rear of a car, truck, or other types of utility vehicles.

FIG. 55 shows the use of the embodiments for use in the rear of a car, truck and or sport utility vehicle 89. With the use of the embodiments the enclosure 93 in a car and or truck will save space and provide a deep bass or a wide frequency range with deep bass.

Figure 56:
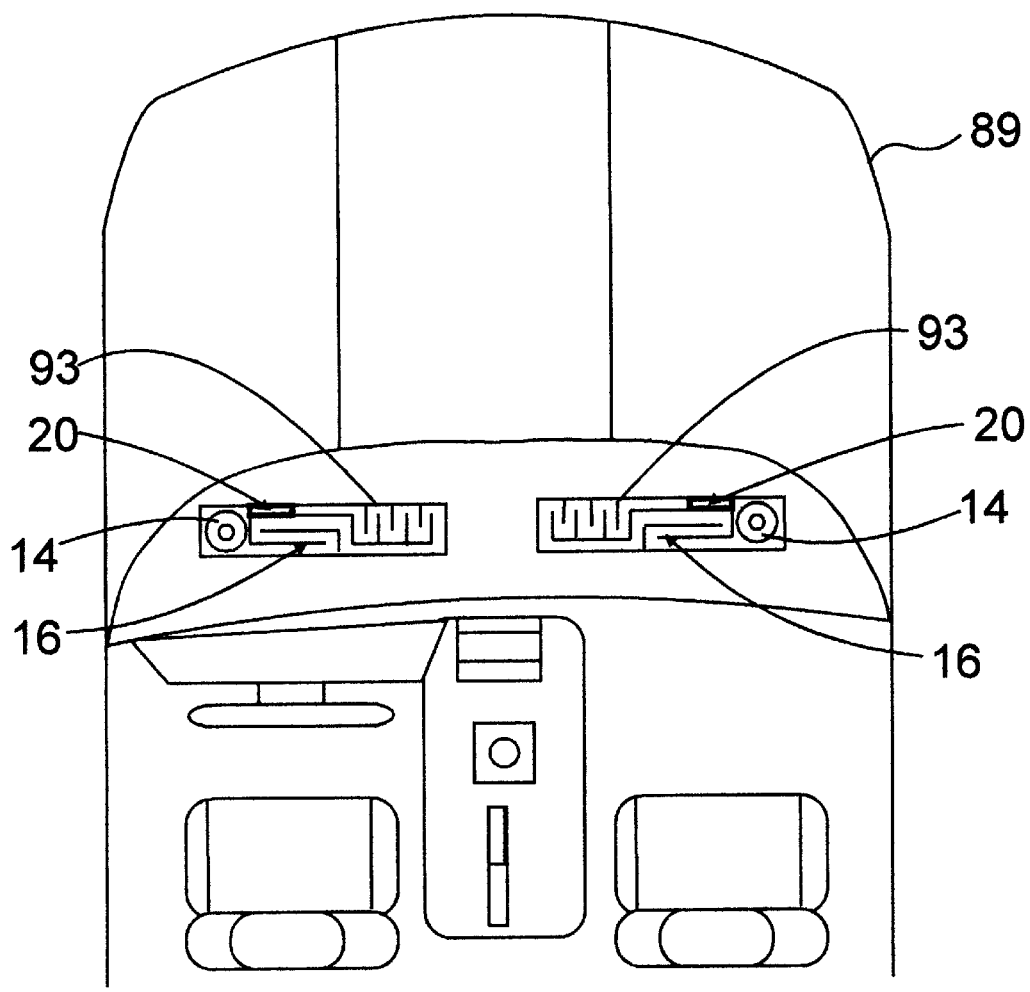
FIG. 56 is a perspective view of yet another loudspeaker system according to the present invention, illustrating the installation of the loudspeaker system in the front of a car, truck, or other types of utility vehicles.

FIG. 56 shows the use of the embodiments for use in the dash of a car, truck and or sport utility vehicle 89. The enclosure 93 in a car and or truck 89 will save on space and provide a deep bass or a wide frequency range with beep bass. With the use of these embodiments there is an improvement in sound quality over the way speakers are used today.

Figure 57:
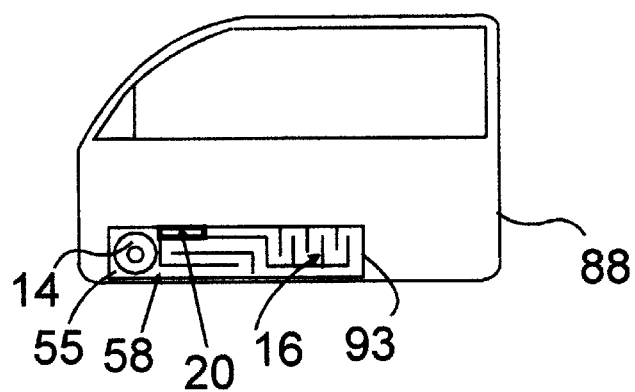
FIG. 57 is a perspective view of yet another loudspeaker system according to the present invention, illustrating the installation of the loudspeaker system in the door of a car, truck, or other types of utility vehicles.

FIG. 57 shows the use of the embodiments in a door 88 of a car, truck and or sport utility vehicle 89. With the use of the enclosure 93 in a car and or truck it will save on space and provide a deep bass or a wide frequency of sounds with deep bass. With the use of these embodiments there is an improvement in sound quality over the way speakers are used today.

Figure 58:
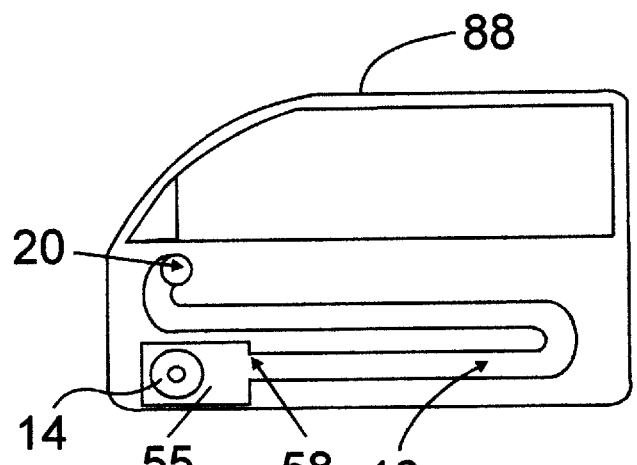
FIG. 58 is a perspective view of yet another loudspeaker system according to the present invention, illustrating the installation of the loudspeaker system in the door of a car, truck, or other types of utility vehicles.

FIG. 58 shows the use of the embodiments in a door 88 of a car, truck and or sport utility vehicle 89. With the use of the speakers 14 and air volume the waveguide 16 can meander in the empty spaces of the door and the output port 20 exiting in the listening area. In a car and or truck this embodiment will save on space and provide a deep bass or a wide frequency of sounds with deep bass. With the use of these embodiments there is an improvement in sound quality over the way speakers are used today. This embodiment can be used in any area of a car, truck and or sport utility vehicle to save on space and provide high quality sound.

Figure 59:
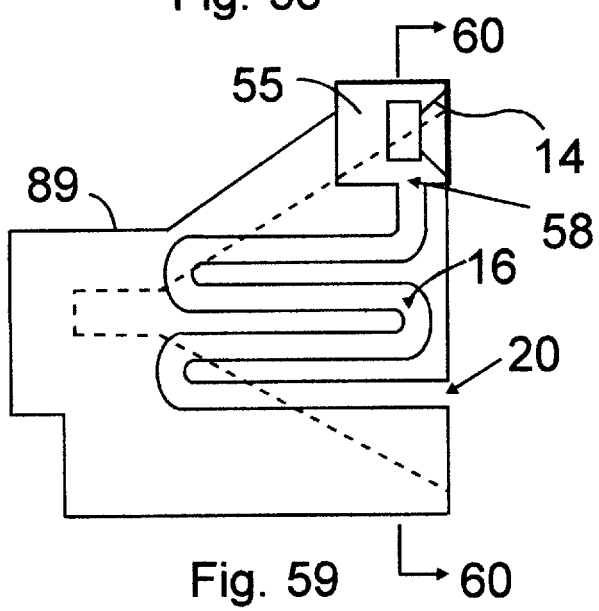
FIG. 59 is a perspective view of yet another loudspeaker system according to the present invention, illustrating the use of the loudspeaker system in a television or monitor.
Figure 60:
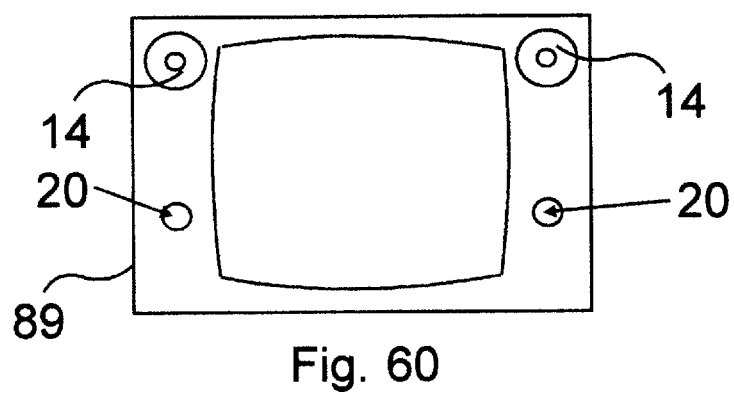
FIG. 60 is a cross-sectional view of the loudspeaker system of FIG. 59, taken along line 60—60 thereof.

FIGS. 59 and 60 show the use of the loudspeaker system in a television or monitor 89. With the use of the present invention a television or monitor 89 can have a high fidelity sound system for producing deep bass and a wide frequency of sounds. The air volume and the waveguide 16 meander in the empty space of the television or monitor 89 and exiting out a port 20. This embodiment is a space saver due to filling useless empty space. The loudspeaker system may extend beyond the enclosure of the monitor. For instance, if the monitor or television were enclosed in the wall or a cabinet, then the waveguide can extend, either externally, or behind the wall, ceiling or floor to a remote location, where output port or ports will be located. In a variation to this embodiment, several speakers and/or output ports may be placed along the extended waveguide. This embodiment can be used in numerous applications, for instance stereo, radio, etc.

Figure 61:
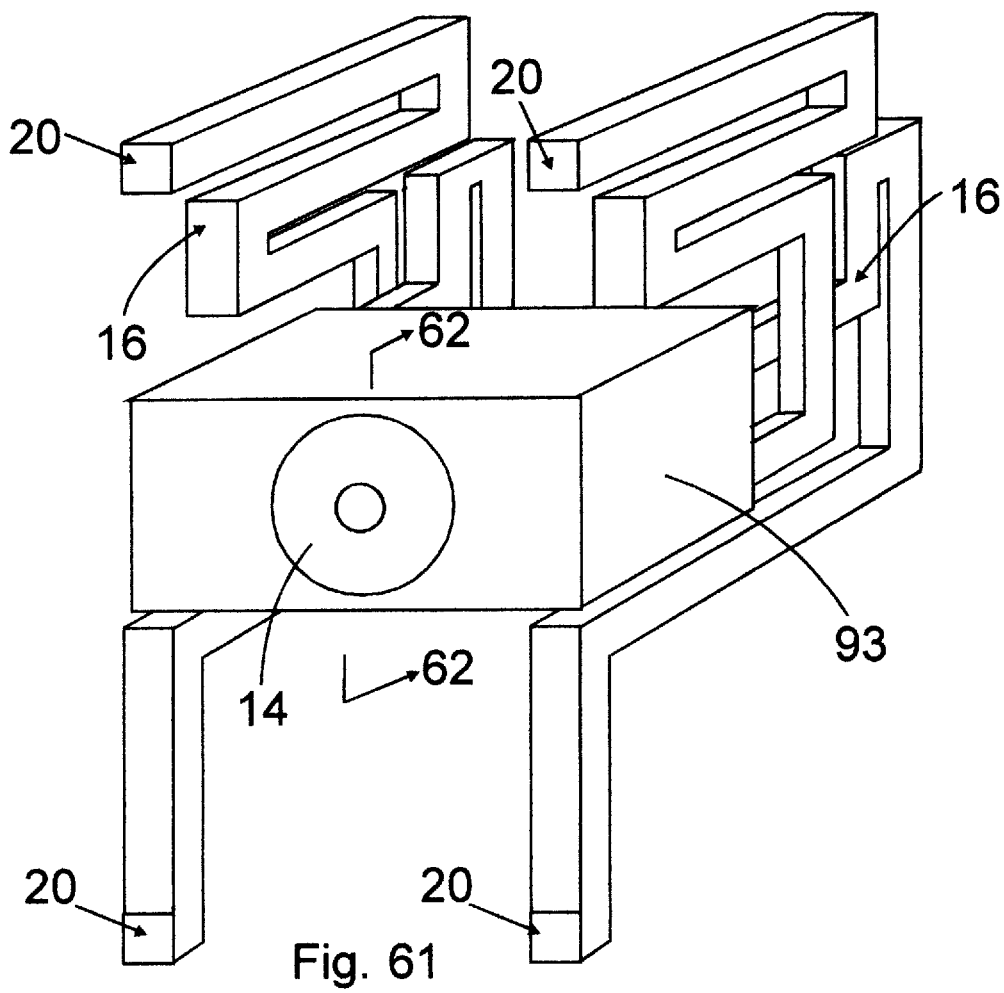
FIG. 61 is a perspective view of yet another loudspeaker system according to the present invention, illustrating the use of multiple outlet ports.
Figure 62:
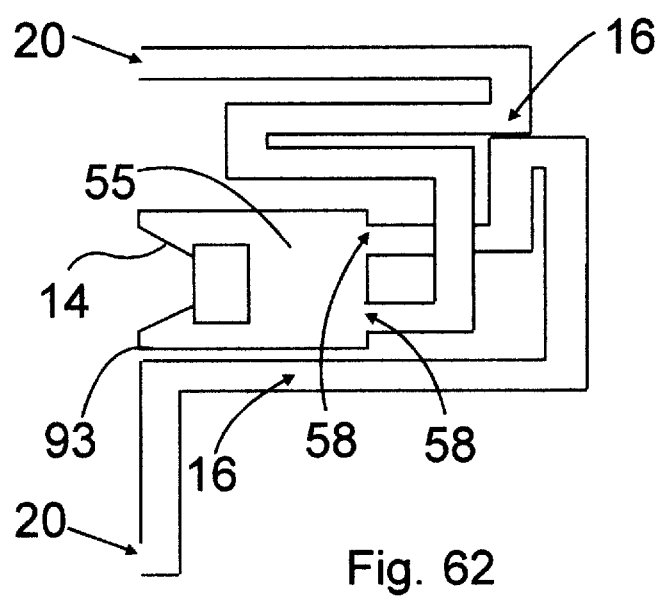
FIG. 62 is a cross-sectional view of the loudspeaker system of FIG. 61, taken along line 62—62 thereof.

FIGS. 61 and 62 show the use of a speaker enclosure 93 with one or more meandering waveguides 16. Four waveguides 16 are used in this embodiment. One or more waveguides 16 can meander and use what is useless space in any type of equipment i.e., a portable stereo etc., and exit out of a port 20. The total area of all the ports 20 should preferably be defined by equations (1) or (5). Another embodiment is to have different waveguide lengths for producing different frequencies coming out of each port 20.

The lengths are defined by using equation (3) and using different values for Fs in the equation to achieve different lengths.

Figure 63:
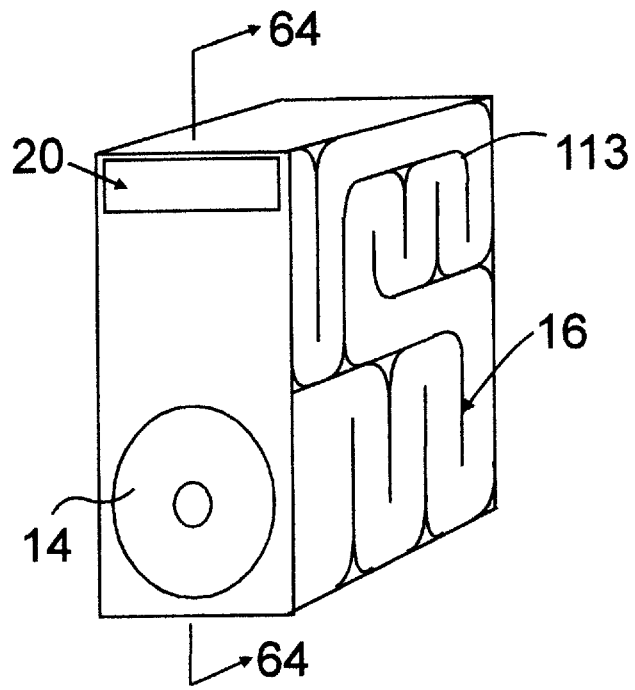
FIG. 63 is a perspective view of yet another loudspeaker system according to the present invention, illustrating the use of rounded or curved corners on the waveguides.
Figure 64:
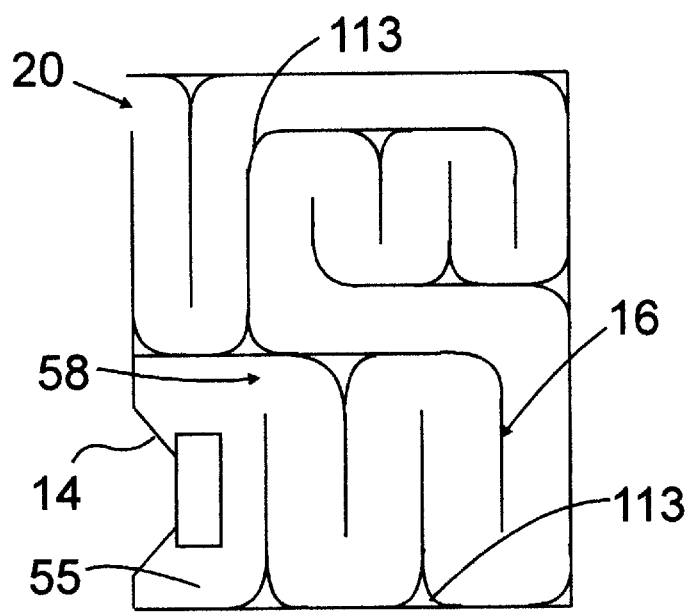
FIG. 64 is a cross-sectional view of the loudspeaker system of FIG. 63, taken along line 64—64 thereof.

FIGS. 63 and 64 show the use of rounded corners 113 in the waveguide 16. With the use of rounded corners 113 in the waveguide 16 the sound waves are angled and directed out the output port 20, to reduce the standing waves in the enclosure FIGS. 65, 66, 67, and 68 show the use of angled 114 corners in the waveguide 16 using the embodiments described herein. With the use of angled 114 corners in the waveguide 16, the sound waves are angled and directed out the output port 20, to reduce the standing waves in the enclosure.

Figure 69:
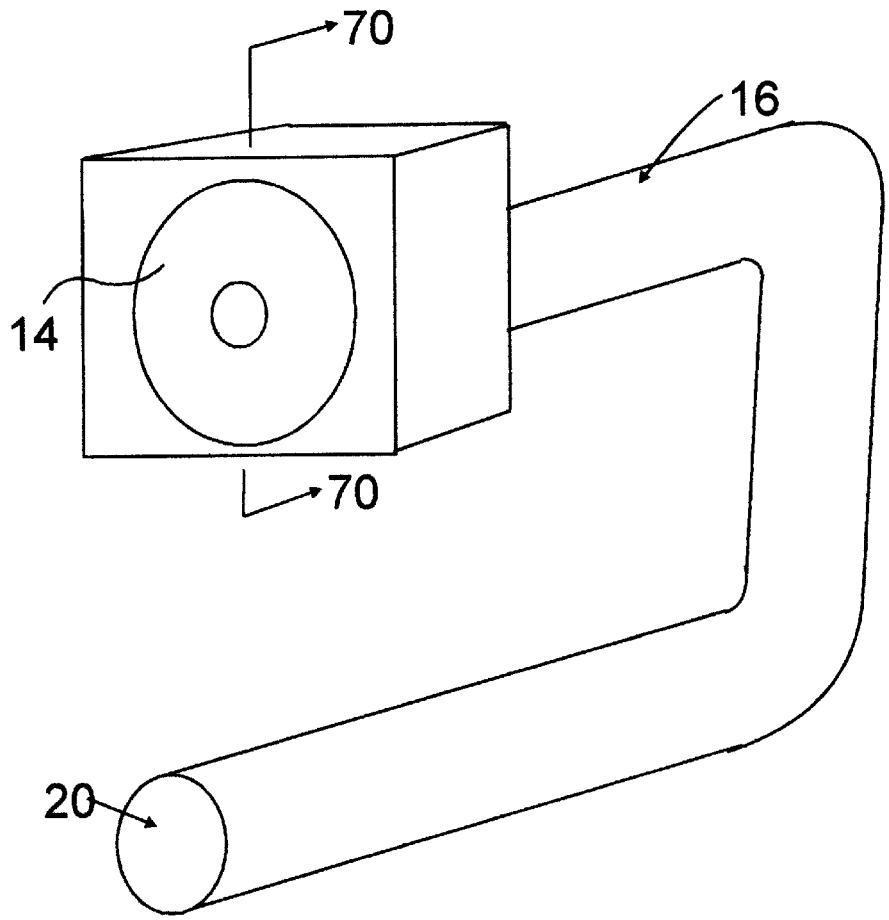
FIG. 69 is a perspective view of yet another loudspeaker system according to the present invention, illustrating the use of rounded waveguides and corners.
Figure 70:
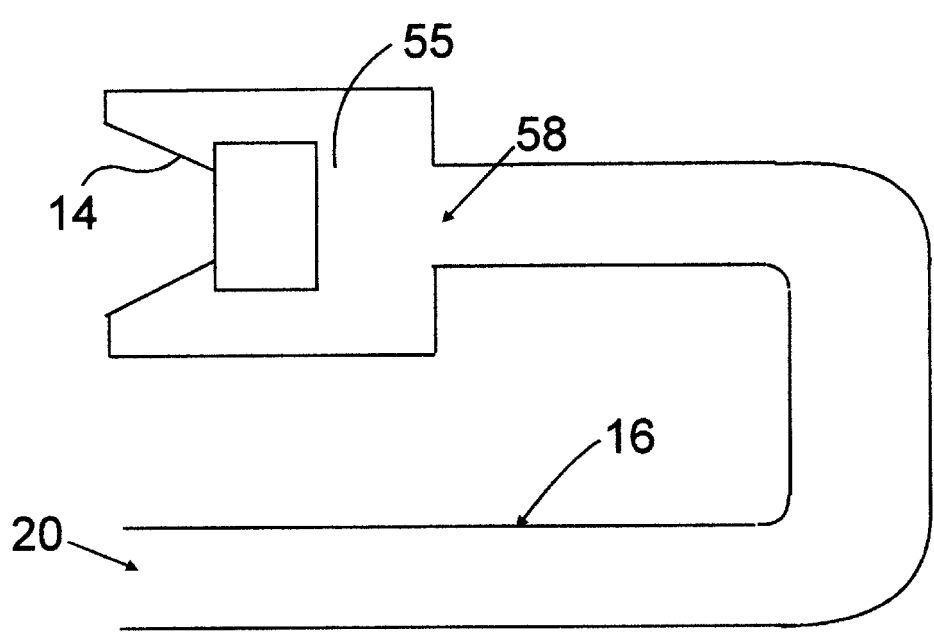
FIG. 70 is a cross-sectional view of the loudspeaker system of FIG. 69, taken along line 70—70 thereof.

FIGS. 69 and 70 show the use of a cylindrical or round waveguide and round corners 115 using the embodiments described herein. With the use of a cylindrical waveguide and round corners 115 the sound waves are reflected and directed out the output 20, to reduce the standing waves in the enclosure.

FIGS. 71, 72, 73, and 74 show the use of a spiral waveguide 116 using the embodiments described herein. With the use of the waveguide 116 the enclosure size is more compact with the wave guide 116 spiraling around speaker 14 and air volume. FIG. 73 is a top cross-sectional view, where the air volume spirals around the speaker 14 and the sound waves enter the opening 58 of the waveguides 116, and circles the speaker as noted by the dashed lines and arrows of the acoustic serpentine path 18 then goes down opening 95 to circle the speaker again in FIG. 74 and then out output port 20 into the listening area.

FIGS. 75, 76, 77, and 78 show the use of long waveguides 16 using the embodiments described herein. With the use of long waveguides 16, an enclosure can be built for a certain height for a good listening position. The waveguide 16 can be unfold and be used in a long tube with an output port 20.

Figures 79, 80, 81, 82:
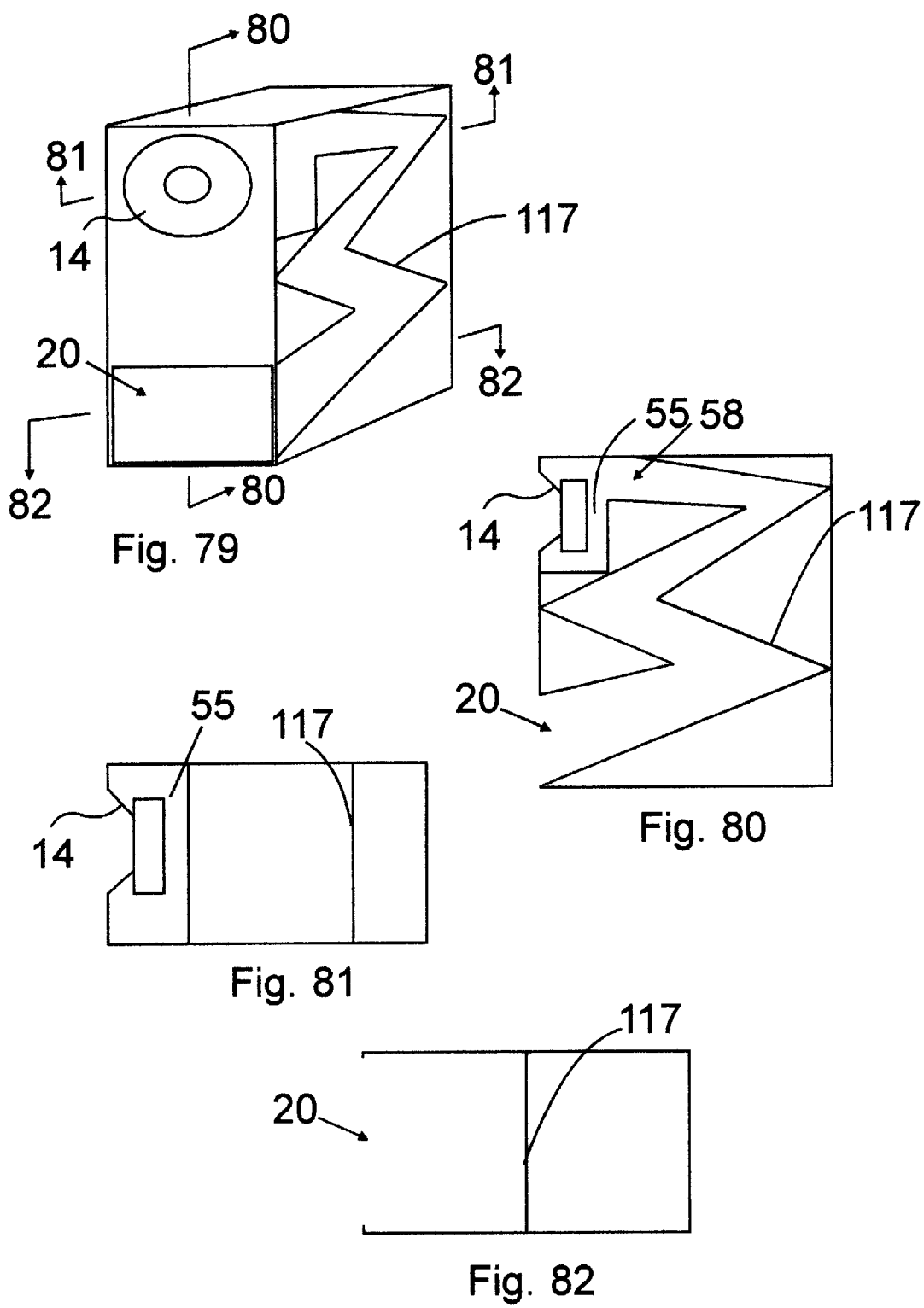
FIG. 79 is a perspective view of yet another loudspeaker system according to the present invention, illustrating the use of variable angle waveguides.
FIG. 80 is a cross-sectional view of the loudspeaker system of FIG. 79, taken along line 80—80 thereof.
FIG. 81 is a cross-sectional view of the loudspeaker system of FIG. 79, taken along line 81—81 thereof.
FIG. 82 is a cross-sectional view of the loudspeaker system of FIG. 79, taken along line 82—82 thereof.

FIGS. 79, 80, 81 and 82 show the use of a variable angled 117 waveguide 16 using the preferred embodiments. In FIG. 80 the waveguide 16 area varies from the start of the waveguide 58 and increase in size as it gets closer to the output port 20. With this use there is a reduction of standing waves in the enclosure. Another configuration is to reverse the various of size; the waveguide 16 area starts large and gets smaller as it gets closer to the output port 20.

FIGS. 83, 84, 85 and 86 show the use of a variable waveguide 20 using the embodiments described herein. In FIG. 84 the start of the waveguide 58 increases in area as it gets to the output port 20. With this use there is a reduction of standing waves in the enclosure. Another configuration is to reverse the various of size; the waveguide area starts 58 large and gets smaller as it gets closer to the output port 20.

Figure 87:
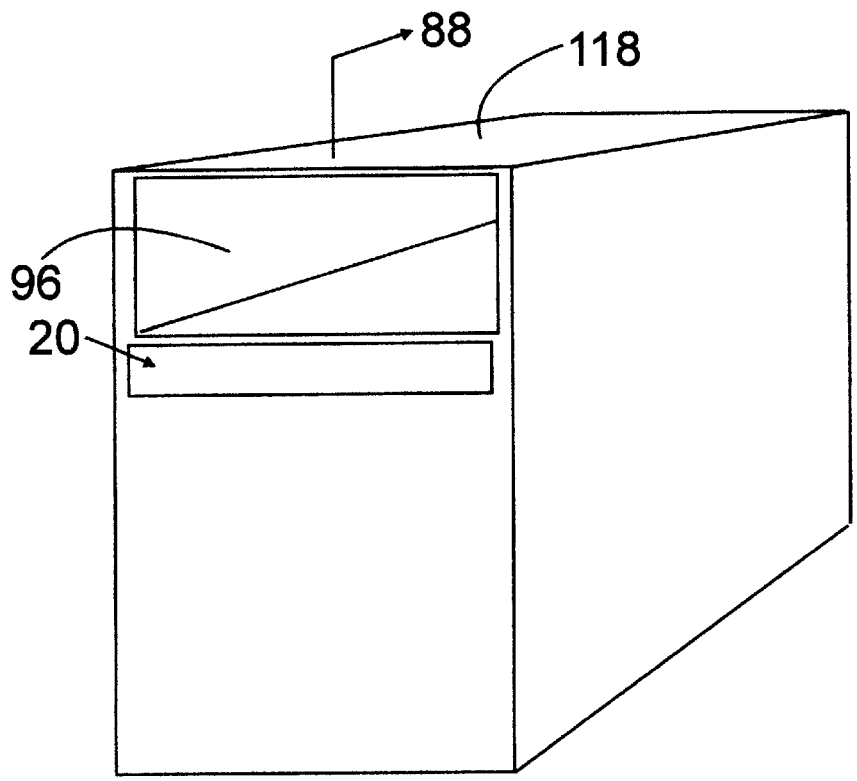
FIG. 87 is a perspective view of yet another loudspeaker system according to the present invention, illustrating the use of a horn assembly.
Figure 88:
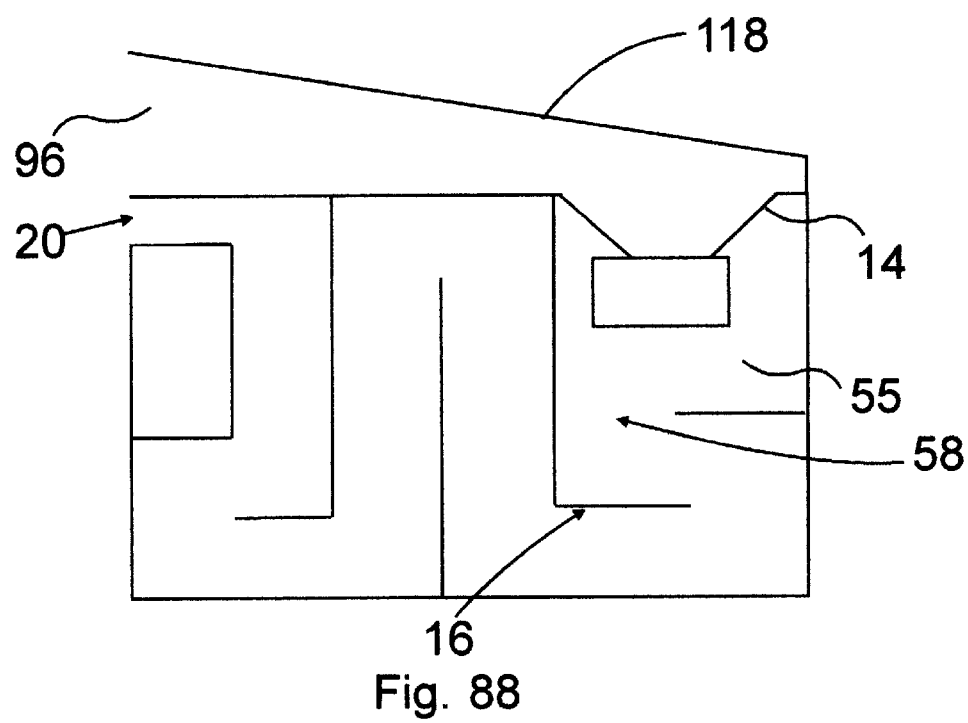
FIG. 88 is a cross-sectional view of the loudspeaker system of FIG. 87, taken along line 88—88 thereof.

FIGS. 87 and 88 show the use of a horn assembly 118 and a waveguide 16 using the embodiments herein. With the use of the horn 118 assembly there is a reduction of standing waves and a clearer sound and an increased sound pressure level. The bass frequencies exit out the port 20 into the listening area.

FIGS. 89, 90, 91 and 92 show the use of two or more speakers 14 using the same waveguide 16 and separate output ports 20 and 20A using the embodiments herein. In FIG. 90 each speaker 14 has a separate air volume. The opening of both waveguide 58 is defined by equation (1). The two speakers 14 acoustic serpentine path 18A and 18B is noted by dotted lines where both waveguides meet at opening 97 and join together. This opening 97 is defined as the total area of both openings 58. This waveguide 16 area is maintained until the waveguide 16 approaches reducer 98 near the output port 20. As the waveguide 16 approaches reducer 98, the waveguide 16 area returns to the separate starts of the waveguide area 58 and exits out the output port 20 and output 20A into the listening area. With this embodiment the sound waves are radiating from two sides of the enclosure to provide a surround sound effect. The surround sound effect is the sound waves that are produced by the front of the speaker 14 and port 20A are directed toward the listener. The sound waves that come out of the Speaker 14 and output port 20B are reflected off the walls, ceilings, and floors to produce a sound like a life performance because of the time delay of the sound waves reflecting of objects. Also one half of the speakers maybe wired with opposite polarity.

FIGS. 93, 94, 95, and 96 show the use of two or more speakers 14 using the same waveguide 16 and one output port 20 using the preferred embodiments. In FIG. 94 each speaker 14 has a separate air volume. The opening of both waveguide 58 is defined by equation (1). The two speakers 14 acoustic serpentine path 18A and 18B is noted by dotted lines where both waveguides meet at opening 97 and join together. This opening 97 is defined as the total area of both openings 58. The Wga and output port 20 is used through the rest of the waveguide 16 and out the output port 20. With this embodiment the sound waves are radiating from two sides of the enclosure to provide a surround sound effect. The surround sound effect is the sound waves that are produced by the front of the speaker 14 and port 20 are directed toward the listener. The sound waves that are produced by the front of the speaker 14 are reflected off the walls, ceilings, and floors to produce a sound like a life performance because of the time delay of the sound waves reflecting of objects. Also one half of the speakers maybe wired with opposite polarities.

FIGS. 97, 98, 99, and 100 show the use of a waveguide 16 with one or more waveguide holes 99 using the preferred embodiments. With the use of one or more waveguide holes the higher frequencies would be able to exit out of the output port 20 due to the shorter length of going through the waveguide holes 99 and the lower frequencies would be going through the whole length of the waveguide 16 and coming out the output port 20.

FIGS. 101, 102, 103, and 104 show the use the embodiments described herein, without a waveguide. In FIG. 102, the air volume (2) 100 is expressed as follows by equation (7):

$$\text{Air volume (2)} = Wga \text{ equation (1)} \times Wgl \text{ equation (3)}, \qquad (7)$$

where Wga represents the waveguide surface area, and Wgl (or Lwg) represents the length of the waveguide, and where the multiplication of these two parameters (Wga and Wlg) produces an air volume (2). The output ports 20, 20A have generally the same area as Wga, as expressed in equation (1 or 5), and the air volume is defined by equation (2). The construction of this speaker system, that does not include a waveguide may simplify the overall system design.

Figures 105, 106, 107, 108:
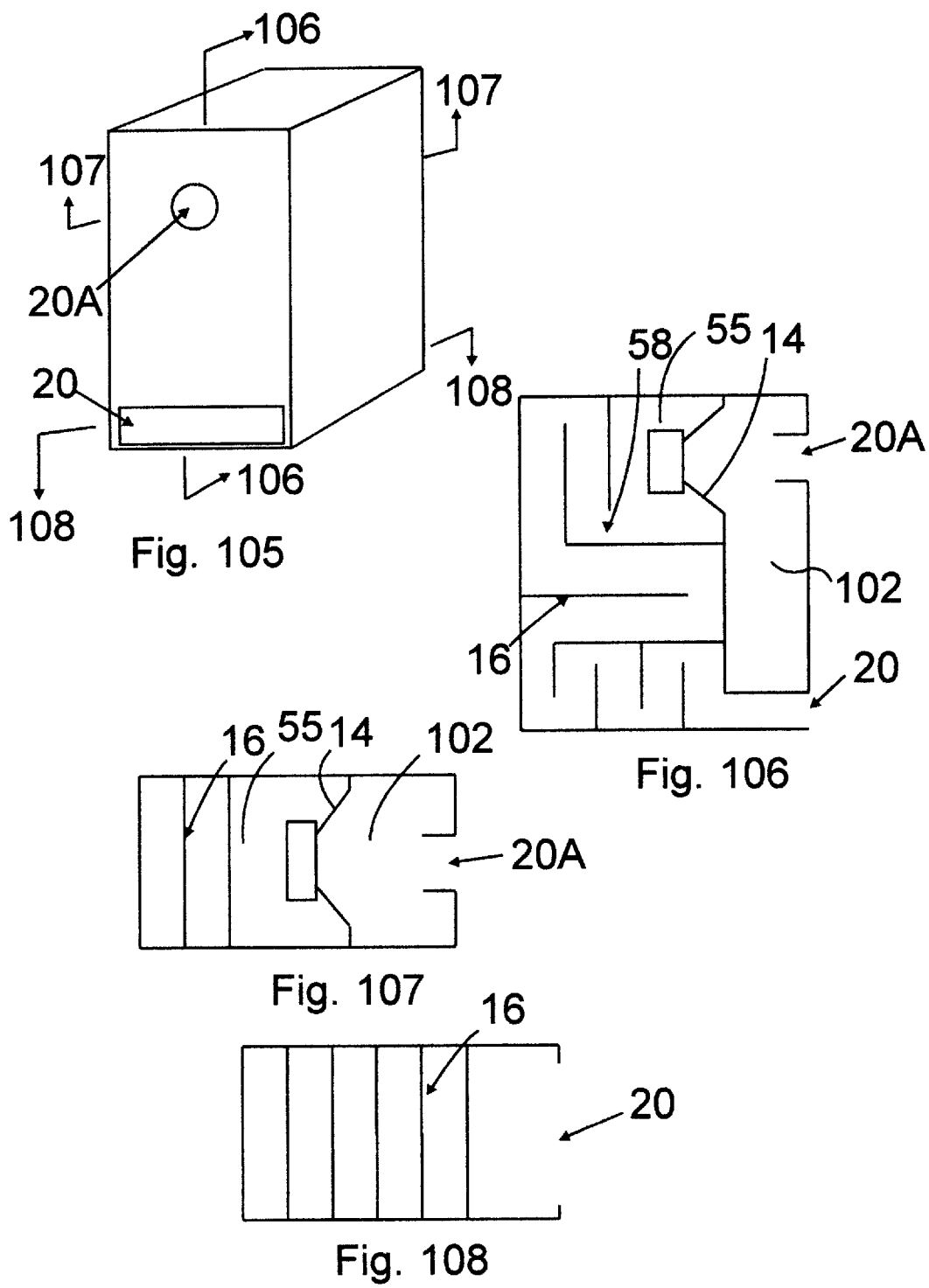
FIG. 105 is a perspective view of yet another loudspeaker system according to the present invention, illustrating the use of a band-pass enclosure with waveguides.
FIG. 106 is a cross-sectional view of the loudspeaker system of FIG. 105, taken along line 106—106 thereof.
FIG. 107 is a cross-sectional view of the loudspeaker system of FIG. 105, taken along line 107—107 thereof.
FIG. 108 is a cross-sectional view of the loudspeaker system of FIG. 105, taken along line 108—108 thereof.

FIGS. 105, 106, 107, and 108 show the use of the waveguides 16 and the use of an air volume (3) 102 with an output port 20 using the embodiments herein. In FIG. 106 one surface of the speaker 14 cone is radiating sound waves through the waveguide 16 and out a port 20. The other surface of the speaker 14 cone is radiating sound waves into a air volume (3) 102 and out a port 20A. The air volume (3) 102 is tuned to control the upper frequency limit of the design from not coming out of the port 20A. This embodiment produces only the lower bass frequencies.

FIGS. 109, 110, 111, and 112 show the use of the waveguides 16 and the use of an air volume (3) 102 with the use of a passive radiator 81 using the embodiments herein. In FIG. 110 one surface of the speaker 14 cone is radiating sound waves through the waveguide 16 and out a port 20. The other surface of the speaker 14 cone is radiating sound waves into an air volume (3) 102 and causing the movement of the passive radiator 81 and only lower frequencies can be heard. This embodiment produces only the lower bass frequencies. The passive radiator operates in conjunction with the speaker 14 at low frequencies sharing the acoustic load of the speaker 14 to reduce driver cone excursions.

Figure 113:
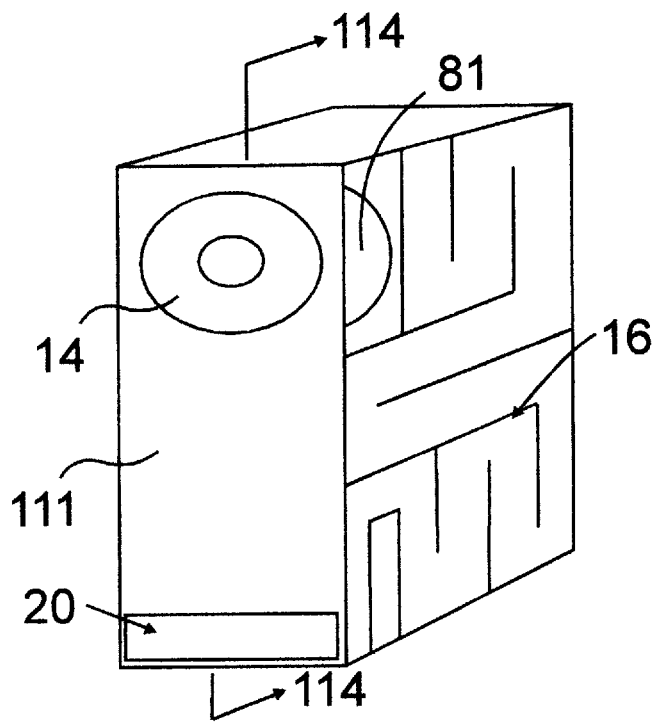
FIG. 113 is a perspective view of yet another loudspeaker system according to the present invention, illustrating the use of a passive radiator in the enclosure.
Figure 114:
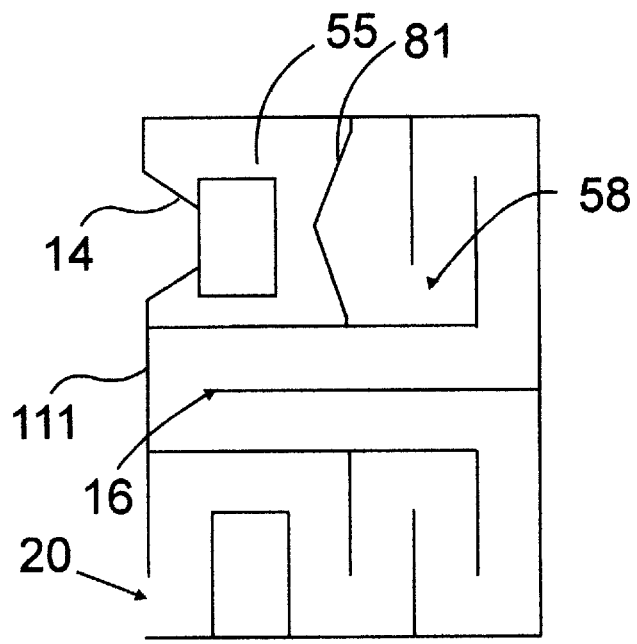
FIG. 114 is a cross-sectional view of the loudspeaker system of FIG. 113, taken along line 114—114 thereof.

FIGS. 113 and 114 show the use of a speaker 14 located on front panel 111 with the use of a passive radiator 81 mounted in the air volume with the use of waveguides 16 using the embodiments herein. The length of the waveguide 16 is defined by equation (3) and the waveguide area and output port 20 is defined by equations (1 or 5), also the waveguide area can be defined by the $S_D$ of the passive radiator 81 using equations (1 or 5). With the use of this embodiment only the lower frequencies are exited from the output port 20 into the listening area and a reduction of driver cone excursions.

Figure 115:
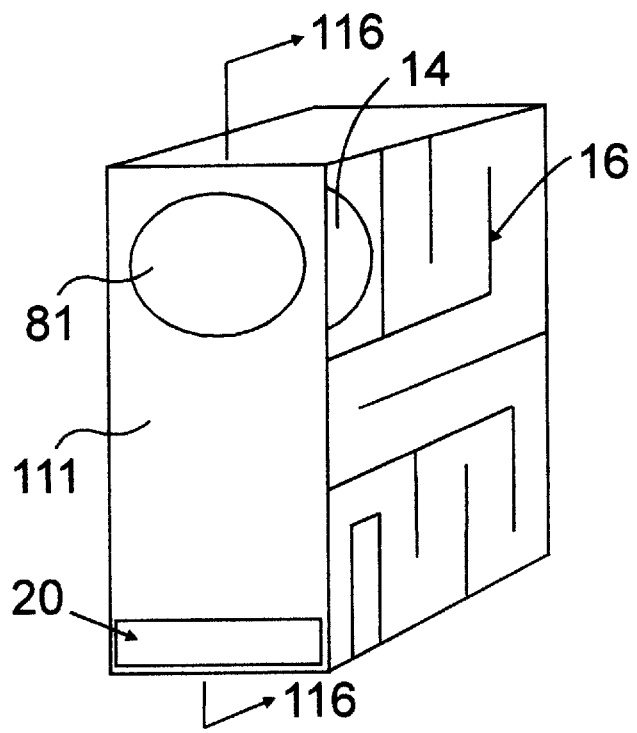
FIG. 115 is a perspective view of yet another loudspeaker system according to the present invention, illustrating the use of a passive radiator and a speaker in the enclosure.
Figure 116:
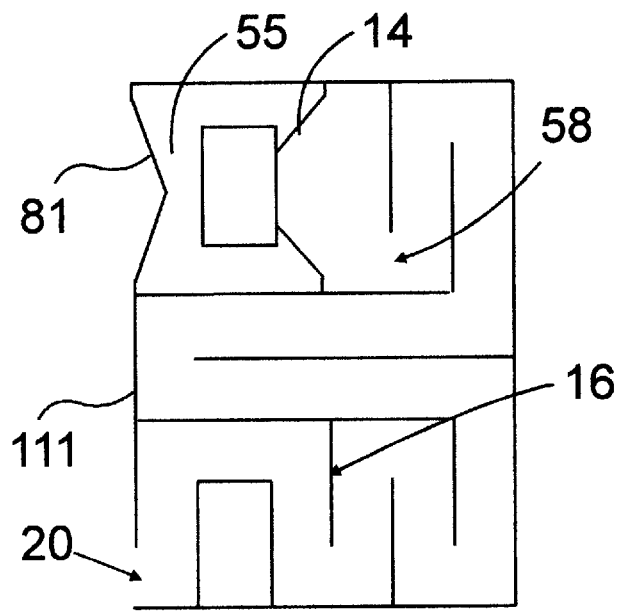
FIG. 116 is a cross-sectional view of the loudspeaker system of FIG. 115, taken along line 116—116 thereof.

FIGS. 115 and 116 show the use of a passive radiator 81 located on front panel 111 with a speaker 14 located in the air volume the use of waveguides 16 using the embodiments herein. The length of the waveguide 16 is defined by equation (3) and the waveguide area and output port 20 is defined by equations (1 or 5), also the waveguide area and output port 20 can be defined by the $S_D$ of the passive radiator 81 using equations (1 or 5. With the use of this embodiment there is a reduction of driver cone excursions. The lower frequencies exit from the output port 20 and the front surface of the passive radiator 81 into the listening area.

Figure 117:
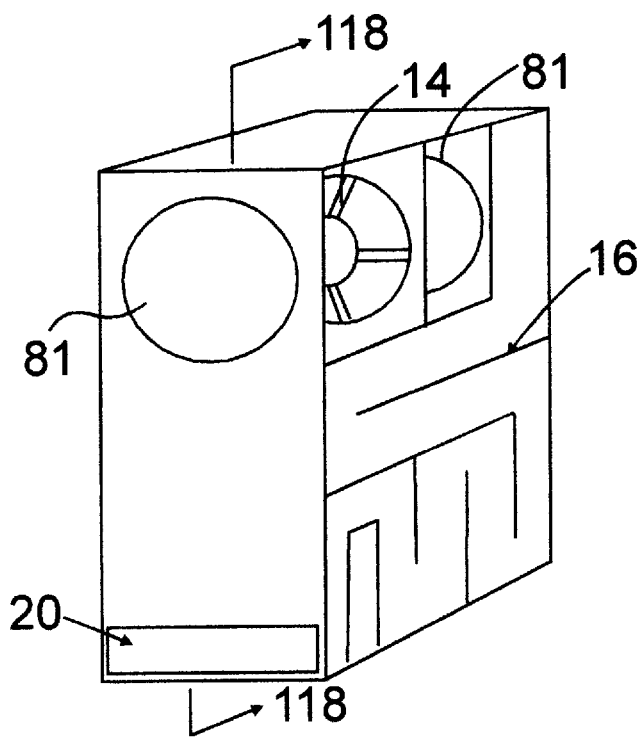
FIG. 117 is a perspective view of yet another loudspeaker system according to the present invention, illustrating the use of a passive radiator and a speaker and a passive radiator in the enclosure.
Figure 118:
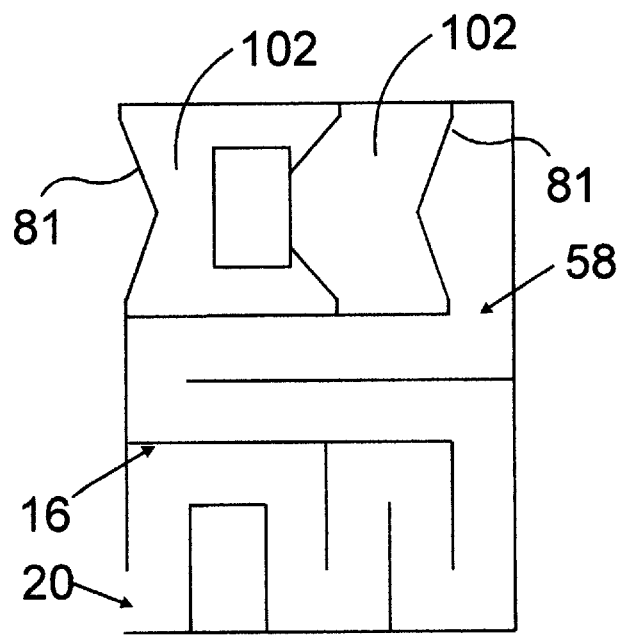
FIG. 118 is a cross-sectional view of the loudspeaker system of FIG. 117, taken along line 118—118 thereof.

FIGS. 117 and 118 show the use of a passive radiator 81 located on the front panel 111 then a speaker 14 in the air volume and an air volume (3) 102 with the use of passive radiator 81 next to the opening waveguides 58 using the embodiments herein. The length of the waveguide 16 is defined by equation (3) and the waveguide area and output port 20 is defined by equations (1 or 5), The length of the waveguide 16 is defined by the passive radiator 81 closest to the start of the waveguide. The waveguide area and output port can be defined by the $S_D$ of the passive radiator 81 using equations (1 or 5) or the speaker 14. With the use of this embodiment there is a reduction of driver cone excursions, and the lower frequencies exit from the output port 20, while the front surface of the passive radiator 81 is radiating sounds into the listening area.

Figure 119:
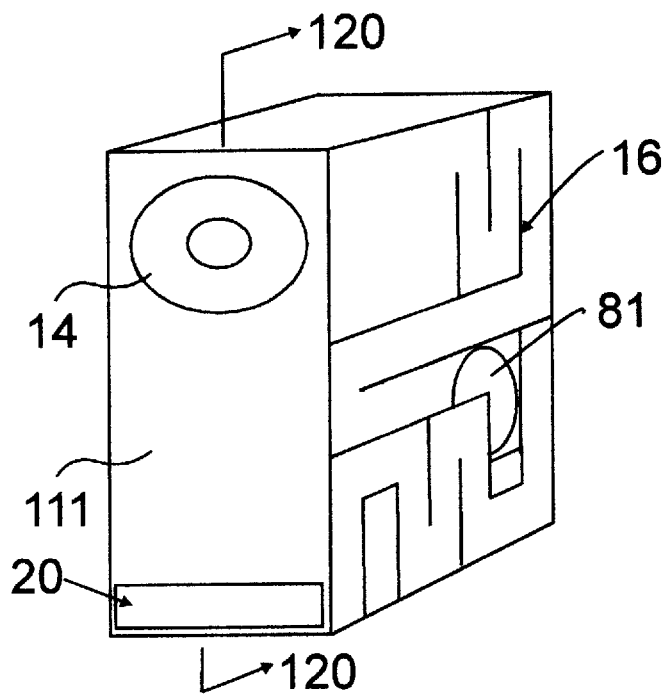
Figure 120:
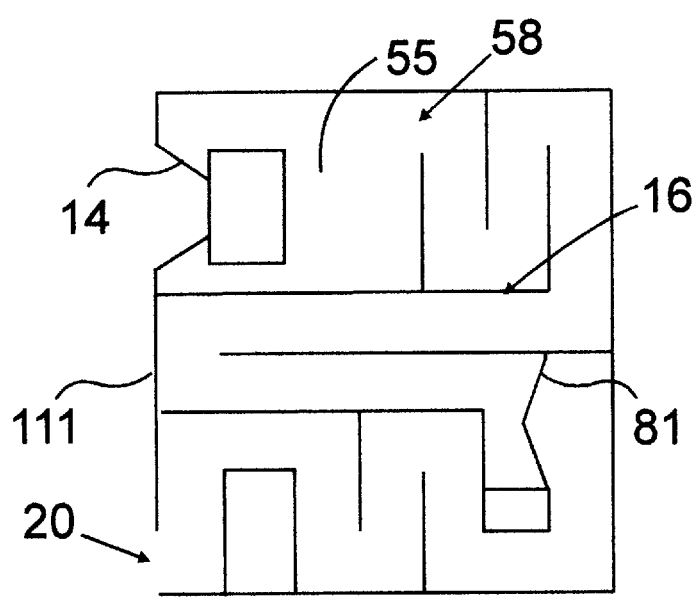

FIGS. 119 and 120 show the use of a passive radiator 81 in the waveguides 16 using the embodiments herein. The length of the waveguide 16 is defined by equation (3) and the waveguide area and output port 20 is defined by equations (1 or 5. The waveguide area and output port 20 can be defined by the $S_D$ of the passive radiator 81 using equations (1 or 5) and not the speaker 14. With the use of this embodiment there is a reduction of driver cone excursions and the lower frequencies exit from the output port 20 and the front surface of the speaker 14 is radiation sounds into the listening area.

Figure 121:
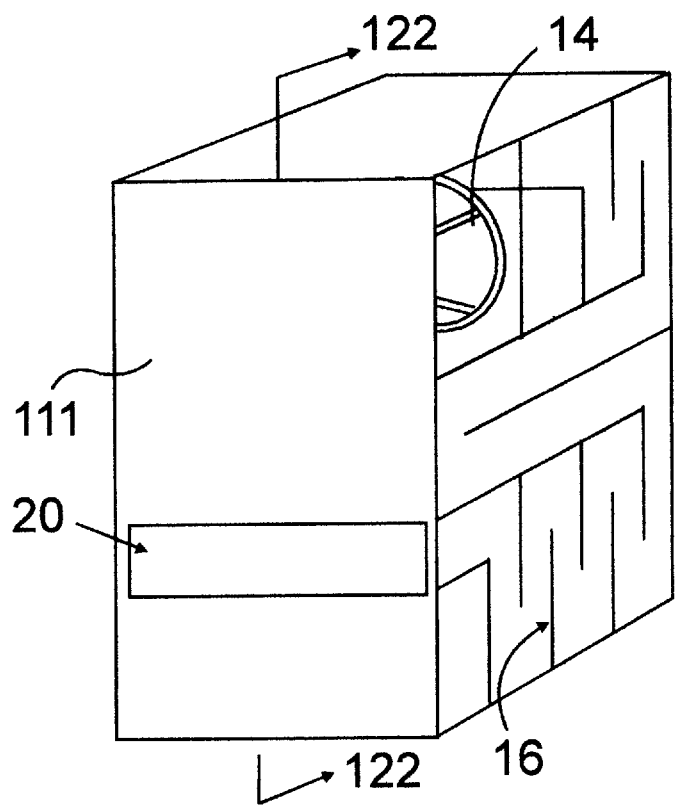
Figure 122:
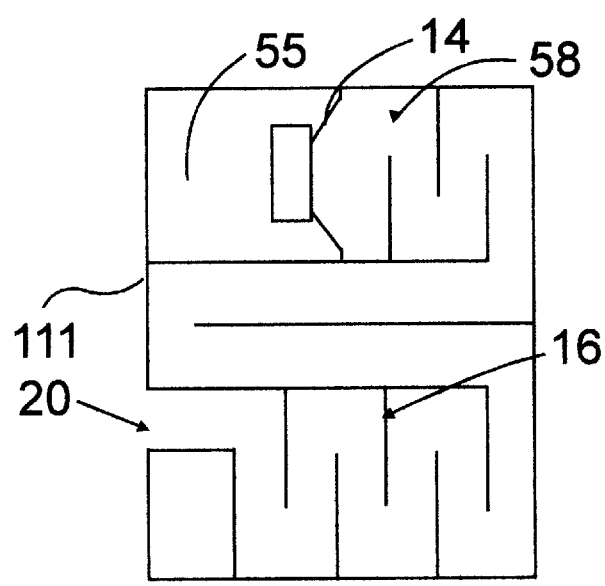

FIGS. 121 and 122 show the use of a speaker 14 in the air volume and with the use of waveguides 16 using the preferred embodiments. The length of the waveguide 16 is defined by equation (3) and the waveguide area and output port 20 is defined by equations (1 or 5. With the use of this embodiment there is a reduction of driver cone excursions and only the lower frequencies exit from the output port 20, and the other surface of the speaker 14 cone is radiating in a closed box.

Figure 123:
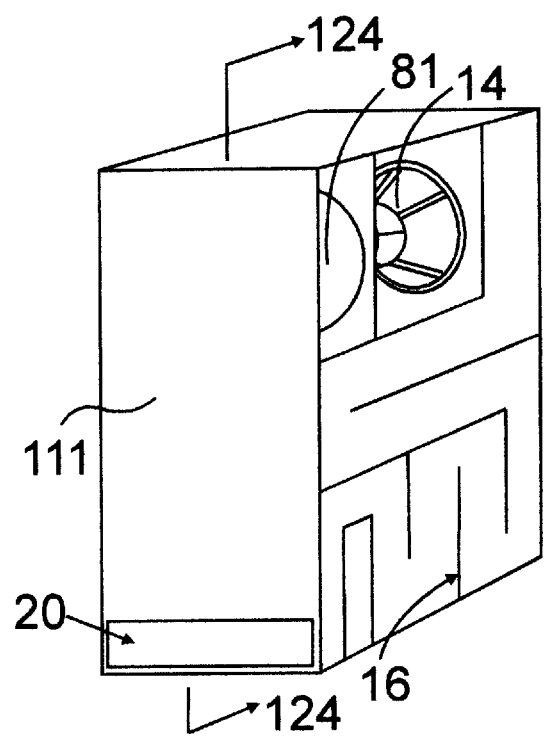
Figure 124:
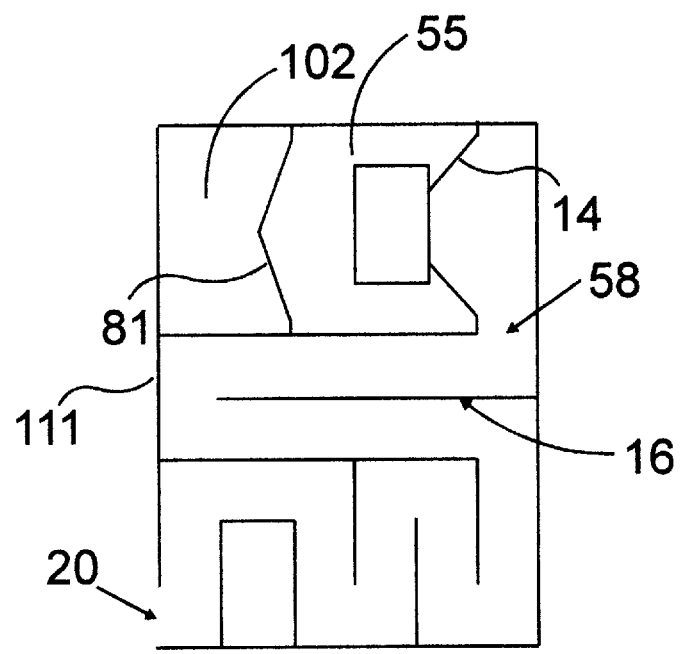

FIGS. 123 and 124 show the use of a passive radiator 81 closest to front panel 111 and a speaker 14 in an air volume with the use of waveguides 16 using the preferred embodiments. The length of the waveguide 16 is defined by equation (3) and the waveguide area and output port 20 is defined by equations (1 or 5). With the use of this embodiment there is reduction of driver cone excursions and the lower frequencies exit from the output port 20, and the other surface of the speaker 14 is radiating sound waves into the sub chamber (3) 102 with the passive radiator 81.

Figure 125:
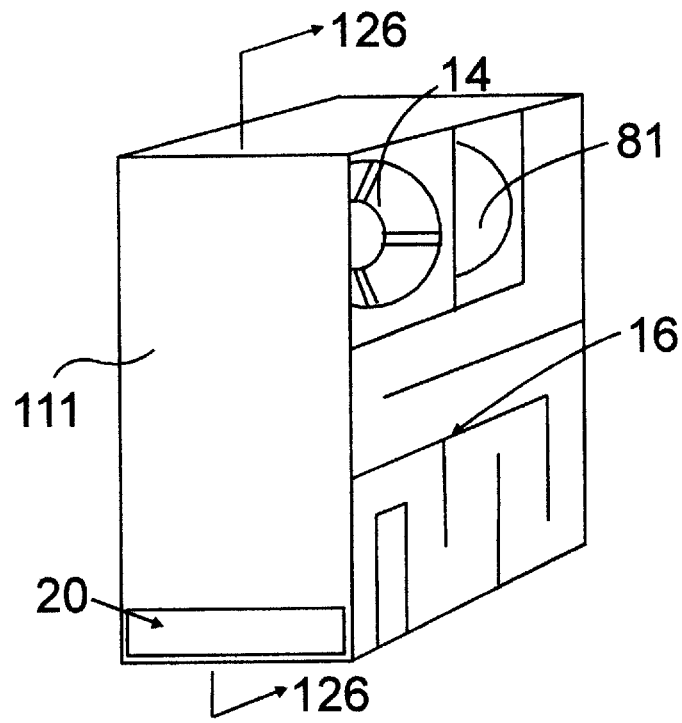
Figure 126:
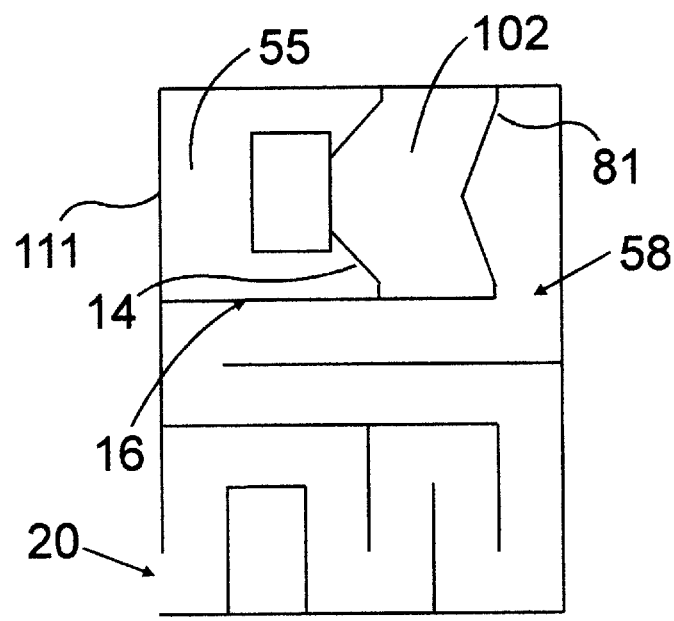

FIGS. 125 and 126 show the use of a speaker 14 in an air volume and another air volume (3) with a passive radiator 81 with the use of waveguides 16 using the preferred embodiments. The length of the waveguide 16 is defined by equation (3) and the waveguide area and output port 20 is defined by equations (1 or 5). The length of the waveguide 16 is to use the passive radiator 81 closest to the start of the waveguide. The waveguide area and the output port can be defined by the $S_D$ of the passive radiator 81 using equation (1 or 5) and not the speaker 14. With the use of this embodiment there is a reduction of driver cone excursions and only the lower frequencies exit from the output port 20.

Figure 127:
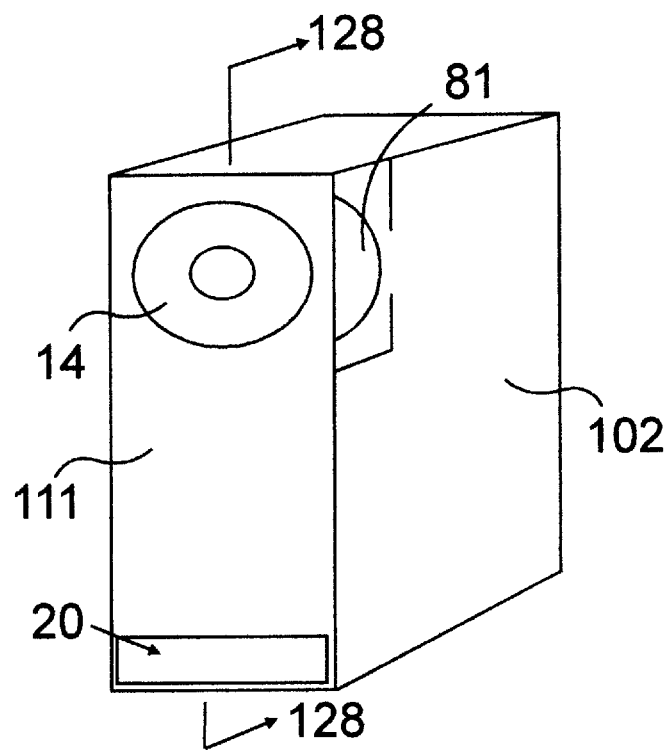
Figure 128:
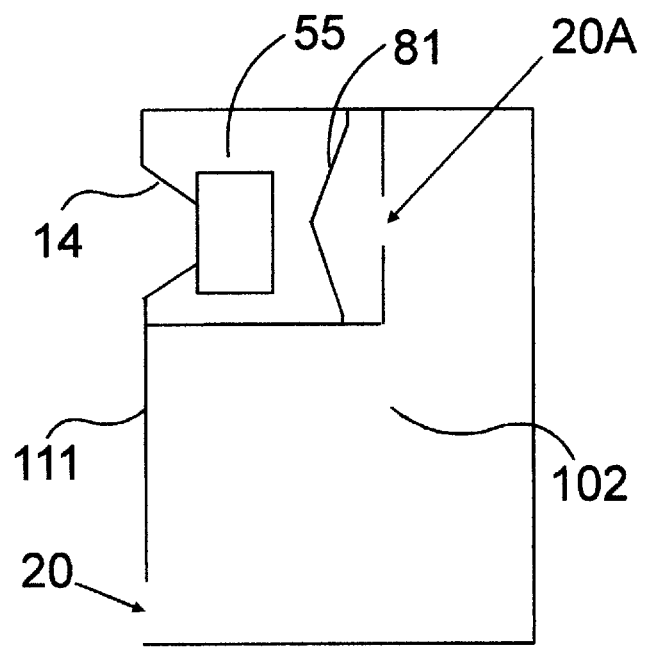

FIGS. 127 and 128 show the use of a speaker and an air volume 102 and a passive radiator 81 without the use of any waveguides. The waveguide area and port 20 can be defined by the $S_D$ of the passive radiator 81 using equations (1 or 5) and not the speaker. With the use of this embodiment there is a reduction of driver cone excursions and only the lower frequencies exit from the output port 20 and the front surface of the speaker cone is radiating into the listening area.

Figure 129:
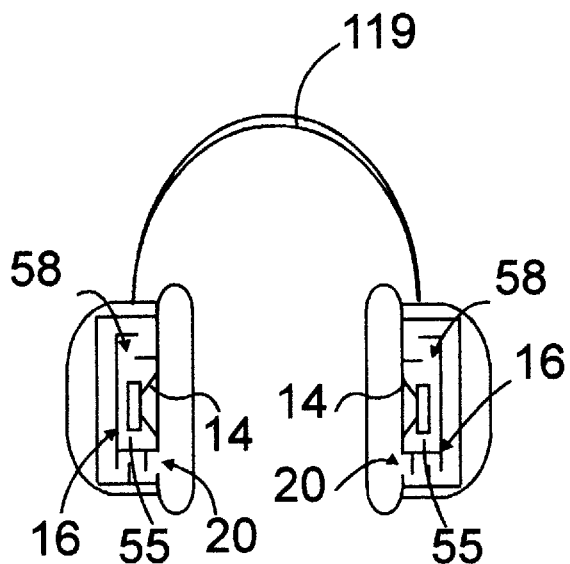

FIG. 129 shows the use of the waveguides 16 includes in headphones 119 using the embodiments herein. With the use of the waveguides 16 it produces deeper bass and a wide frequency of sounds and a compact size.

Figure 130:
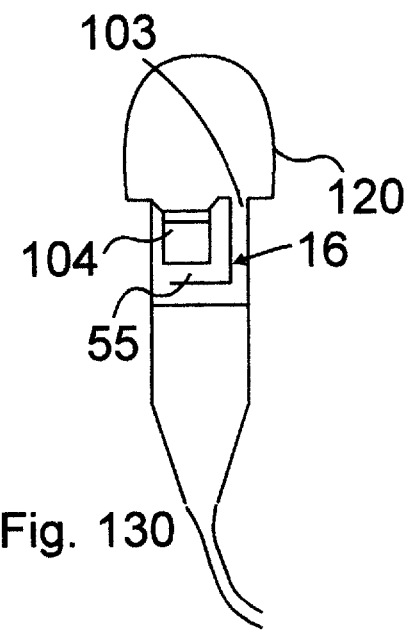

FIG. 130 shows the use of the waveguides 16 in a microphone 120 using the embodiments herein. With the use of the waveguides 16 it supplies a wider frequency of sounds for the microphone to receive. In FIG. 130 the sound waves are picked up by the front of the microphone element 104. The sound waves travel through input port 103 and through the waveguides 16 and into air volume to the rear surface of the microphone receiver. Thus both sides of the microphone receiver are picking up sounds.

FIG. 131 shows the use of waveguides in a microphone 120 to cancel a frequency range using the preferred embodiments. In FIG. 131 the sound waves travel in input port 103 and through the waveguides 16 and are picked up by the receiver element 104. An air volume can be used in the front of the receiver element 104. With the use of the waveguides 16 it cancels the shorter (i.e., higher) frequencies not able to travel through the waveguide to receiver element 104. With the use of this embodiment a desired range of frequencies can be eliminated.

FIG. 132 shows the use of waveguides 16 in a stethoscope 121 to cancel a frequency range using the preferred embodiments. In FIG. 132 the sound waves travel in input port 103 and through the waveguides 16 and to the hearing receiver. An air chamber 55 can be used in the front of the input port 103. With the use of the waveguides 16 it cancels the shorter (i.e.,., higher) frequencies not able to travel through the waveguide 16. With the use of this embodiment some background noise can be reduced or eliminated for a clear sounding stethoscope 121.

FIG. 133 and 134 show the use of the waveguides 16 in a phone 122 using the embodiments herein. With the use of the waveguides 16 it produces a deeper bass and a wide frequency of sounds and a clearer sounding. In FIG. 133 an air volume is used and the output port 20 is close to the speaker. Another embodiment is to use the waveguides for the receiving end 128 of the phone 122 (talking end) like FIG. 130 but smaller in size to fit in a phone.

FIG. 135 shows the use of the waveguides 16 in a ultrasonic 123 and or an ultrasound 123 device using the embodiments herein. In FIG. 135 the frequency waves travel in input port 103 and through the waveguides 16 and to the receiver device 104. An air volume can be used in the front of the receiver element 104. With the use of the waveguides 16 it cancels the shorter (Higher) frequencies not able to travel through the waveguide 16. FIG. 136 shows the use of the waveguides 16 in a noise cancellation device 124 using the embodiments herein. With the use of this embodiment a wider frequency range can be canceled or the lower frequency range for an improvement over the other methods used today.

FIGS. 137 and 138 show the use of the waveguides 16 in a hearing aid device 125 using the embodiments herein. With the use of this embodiment a wider frequency range can be produced and the length of the waveguides 16 cancel the higher frequencies that cause a lot of the high pitch feedback for an improvement in sound quality. In FIG. 138 shows the use of the hearing aid in the ear.

FIGS. 139, 140, and 141 show the use of the waveguides 16 in a muffler for noise cancellation 127 using the embodiments herein. With the use of this embodiment a deeper bass and wider frequency range can be produced to cancel more frequencies of unwanted noise for instance automobile exhaust or machinery noise. FIG. 140 shows the use of one or more output ports, i.e., 20, 20A. FIG. 141 shows the use of a passive radiator 81 instead of an output port 20.

FIGS. 142 and 143 show the use of a frequency trap 106 to prevent unwanted sounds from exiting out the port 20 using the embodiments described herein. In FIG. 143 the opening of the frequency trap 105 is connected to the air volume and travels a defined acoustic serpentine path 18C length noted by dotted lines that is closed at the other end. The length of the frequency trap 106 is defined by equation (8):

$$Ft=3390/F, \qquad (8)$$

where Ft is the length of the frequency trap, F is the unwanted frequency and 3390 is a constant factor. In other embodiments, the number 3390 can be substituted with another more appropriate number. Sound absorbing material 86 can be lined or filled in some of all the length of the frequency trap 106. The frequency trap 106 can also be located anywhere in the waveguide, and there can be multiple frequency traps 106 used also with different unwanted frequencies. With the use of the frequency trap 106 it will prevent unwanted sounds from exiting the output port 20.

FIGS. 144 and 145 show the use of a tweeter driver 85 mounted in the output port 20 using the embodiments described herein. The use of this embodiment the bass frequencies that exit from the output port 20 and the upper or higher frequencies from the tweeter 85 originate from a single location, or a point source (since both the output port 20 and the tweeter driver 85 are located at the same location). For a smother mixing of both the high and low frequencies from a centralized point. FIG. 144 is shows a rectangle output port 20 with a tweeter 85 mounted in the middle. FIG. 145 shows a rectangle output port 20 with a tweeter 85 mounted in the middle.

It should be clear to someone of ordinary skill in the art that the teachings of the embodiments herein may be combined together for various applications. Any one of these embodiments can have a cross-over, notch filter, and/or frequency cut off filter. In the above embodiments the air volumes of numbers 55, 100, and 102 can not be too large to produce an overdamped system and can not be too small to produce a underdamped system.

The preferred waveguide area 58 and output port 20 is $0.50 \times S_D$ in equation (1). The Wga and the area of the output port can vary, for illustration purpose only, from 0.10 to 2.00 multiplied by the speaker or speakers $S_D$. In equation (4) the waveguide length can vary from a small 0.15 to a large $0.95 \times C$. The preferred value is $0.265 \times C$ in equation (4). In equation (2) the preferred air volume is to use the constant number 18. This constant number can vary from a large air volume of number 1 or a small air volume of number 40. The measurement between the center of speaker driver 56 and the center of the output port 20 is set forth in equation (4). This measurement can vary to application designs, wherein the output port 20 can be located right next to the speaker 14, or the spacing can be a great distance, for instance 50 feet apart.

While specific embodiments of the present invention have been illustrated and described in accordance with the present invention, modifications and changes of the apparatus, parameters, and composition, use and operation will become apparent to those skilled in the art, without departing from the scope of the invention.

What is claimed is:

1. An acoustic system comprising in combination:
   an enclosure;
   a speaker acoustically connected to said enclosure, for generating two sound waves, a forward sound wave, and a rearward sound wave;
   a waveguide formed at least partly within said enclosure, and acoustically connected to said speaker, for defining an acoustic path along which said rearward sound wave travels;
   said waveguide including a plurality of inner panels positioned inside said enclosure for lengthening the length of said travel path;
   said plurality of inner panels and said enclosure defining a plurality of inner passageways, and a plurality of inner openings, for causing a selective cancellation of said rearward sound wave traveling along said acoustic path at predetermined frequencies, while allowing sound waves at other frequencies to propagate with minimal attenuation;
   wherein said enclosure includes an output port through which said rearward sound traveling along said acoustic path exits;
   wherein said speaker has a piston area $S_D$;
   wherein the surface area of said output port is equal to a portion of said piston area $S_D$;
   wherein said waveguide and said enclosure define a first compartment adjacent to said speaker;
   wherein said first compartment has a predetermined volume;
   wherein said speaker has a rear surface, at least partly enclosed within said first compartment; and
   wherein said volume loads said rear surface of said speaker with back pressure, in order to reduce a cone excursion of said speaker.

2. The acoustic system according to claim 1, wherein said waveguide has a substantially uniform sectional surface area along generally its entire length.

3. The acoustic system according to claim 2, wherein said inner panels are made of acoustic material; and wherein said acoustic material may be any of: plastic, wood, clay, marble, or metal.

4. The acoustic system according to claim 1, wherein said acoustic path is serpentine.

5. The acoustic system according to claim 1,
   wherein said plurality of inner panels and said enclosure cause a selective cancellation of said rearward sound wave traveling along said acoustic path at high frequencies, while allowing sound waves at lower frequencies to propagate with minimal attenuation.

6. The acoustic system according to claim 1, wherein said uniform sectional surface area of said waveguide is substantially equal to the surface area of said output port.

7. The acoustic system according to claim 1, wherein said speaker is oriented outwardly away from said waveguide.

8. The acoustic system according to claim 1, wherein said forward sound propagates through said speaker; and
   wherein said rearward sound propagates through said waveguide and exits through said output port.

9. The acoustic system according to claim 8, wherein said volume (AV) is defined by the following equation:

$$AV = \frac{1728}{18} \times \sqrt{FS} \times QTS \times VAS$$

where FS represents the free-air resonant frequency of said speaker; QTS represents the Q of said speaker at FS in free air considering both its electrical and mechanical resistance; Q represents the system losses or relative damping ratio of stored to dissipated energy or ratio of reactive to resistive energy); and VAS represents the volume of air having the same compliance as the suspension of said speaker.

10. The acoustic system according to claim 9, wherein said waveguide has a length generally calculated from the center of a voice coil of said speaker, along said acoustic path, up to said output port; and
    wherein said waveguide length (Lwg) is generally defined by the following equation:

$$Lwg = k \cdot FS,$$

where k is a constant and FS is a free-air resonant frequency factor.

11. The Acoustic system according to claim 10, wherein said rearward sounds traveling in said waveguide are reflected by said inner panels to create standing waves within said enclosure;
    wherein a straight line center to center (CTC) measurement is taken between said speaker center V and a center C' of said output port; and
    wherein said CTC is generally proportional to said waveguide length (Lwg), as set forth in the following equation:

$$CTC = m/Lwg,$$

where m is a constant factor.

12. The acoustic system according to claim 1, wherein said inner panels and said enclosure define an air volume compartment in which said speaker is at least partially housed for loading the rear surface of said speaker with back pressure to increase the efficiency of a speaker driver, and to reduce the excursion of said speaker.

13. The acoustics system according to claim 1, wherein said enclosure further includes one or more outputs ports.

14. The acoustic system according to claim 8, wherein said volume (AV) is a function of FS, QTS, and VAS, where FS represents the free-air resonant frequency of said speaker; QTS represents the Q of said speaker at FS in free air considering both its electrical and mechanical resistance; Q represents the system losses or relative damping (ratio of stored to dissipated energy or ratio of reactive to resistive energy); and VAS represents the volume of air having the same compliance as the suspension of said speaker.

15. The acoustic system according to claim 14, wherein said waveguide has a length generally calculated from the center of a voice coil of said speaker, along said acoustic path, to said output port; and wherein said waveguide length (Lwg) is a function of FS, where FS is a free-air resonant frequency factor.

16. The Acoustic system according to claim 15, wherein said rearward sounds traveling in said waveguide are reflected by said inner panels to create standing waves within said enclosure;

wherein a straight line center to center (CTC) measurement is taken between said speaker center V and a center C' of said output port; and wherein said CTC is generally proportional to said waveguide length (Lwg).

17. The Acoustic system according to claim 1, wherein the surface area of said output port is generally equal to one half of said piston area SD.

18. An enclosure for use with a speaker, the enclosure comprising in combination:

the speaker being acoustically connected to said enclosure, for generating two sound waves, a forward sound wave, and a rearward sound wave;

a waveguide formed at least partly within said enclosure, and acoustically connected to the speaker, for defining an acoustic path along which said rearward sound wave travels;

said waveguide including a plurality of inner panels positioned inside said enclosure for lengthening the length of said travel path;

said plurality of inner panels and said enclosure defining a plurality of inner passageways, and a plurality of inner openings, for causing a selective cancellation of said rearward sound wave traveling along said acoustic path at predetermined frequencies, while allowing sound waves at other frequencies to propagate with minimal attenuation;

wherein said enclosure includes an output port through which said rearward sound traveling along said acoustic path exits;

wherein said waveguide and said enclosure define a first compartment adjacent to the speaker;

wherein said first compartment has a predetermined volume;

wherein the speaker has a rear surface, at least partly enclosed within said first compartment; and wherein said volume loads the rear surface of the speaker with back pressure, in order to reduce a cone excursion of the speaker.

19. A method for producing sounds over a broad range of frequencies using a speaker, the method comprising the steps of:

acoustically connecting the speaker to an enclosure for generating two sound waves, a forward sound wave, and a rearward sound wave;

forming a waveguide including a plurality of inner panels, at least partly within said enclosure, and acoustically connecting said waveguide to speaker for defining an acoustic path along which said rearward sound wave travels;

positioning said plurality of inner panels inside said enclosure for lengthening the length of said travel path;

said plurality of inner panels and said enclosure defining a plurality of inner passageways, and a plurality of inner openings, for causing a selective cancellation of said rearward sound wave traveling along said acoustic path at predetermined frequencies, while allowing sound waves at other frequencies to propagate with minimal attenuation;

wherein said enclosure includes an output port through which said rearward sound traveling along said acoustic path exits;

wherein the speaker has a piston area $S_D$;

wherein the surface area of said output port is equal to a portion of said piston area $S_D$;

wherein said waveguide and said enclosure define a first compartment adjacent to the speaker;

wherein said first compartment has a predetermined volume;

wherein the speaker has a rear surface, at least partly enclosed within said first compartment; and wherein said volume loads said rear surface of the speaker with back pressure, in order to reduce a cone excursion of the speaker.

* * * * *